(12) United States Patent
Rahman et al.

(10) Patent No.: US 10,917,800 B2
(45) Date of Patent: Feb. 9, 2021

(54) DATA ANALYTICS MANAGEMENT (DAM), CONFIGURATION SPECIFICATION AND PROCEDURES, PROVISIONING, AND SERVICE BASED ARCHITECTURE (SBA)

(71) Applicants: Mohammad Moshiur Rahman, Ottawa (CA); Remziye Irem Bor-Yaliniz, Ottawa (CA); Nimal Gamini Senarath, Ottawa (CA); Chengchao Liang, Ottawa (CA); Hang Zhang, Nepean (CA)

(72) Inventors: Mohammad Moshiur Rahman, Ottawa (CA); Remziye Irem Bor-Yaliniz, Ottawa (CA); Nimal Gamini Senarath, Ottawa (CA); Chengchao Liang, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/441,940

(22) Filed: Jun. 14, 2019

(65) Prior Publication Data

US 2019/0394655 A1    Dec. 26, 2019

Related U.S. Application Data

(60) Provisional application No. 62/688,603, filed on Jun. 22, 2018, provisional application No. 62/719,363, filed on Aug. 17, 2018.

(51) Int. Cl.
*H04L 12/24* (2006.01)
*H04W 24/02* (2009.01)
*H04W 28/16* (2009.01)

(52) U.S. Cl.
CPC ......... *H04W 24/02* (2013.01); *H04L 41/0823* (2013.01); *H04L 41/142* (2013.01); *H04W 28/16* (2013.01)

(58) Field of Classification Search
CPC .............. H04L 41/142; H04L 41/0823; H04L 41/5054; H04L 41/5058; H04L 41/042; H04L 41/145; H04W 28/16
See application file for complete search history.

(56) References Cited

U.S. PATENT DOCUMENTS

2017/0054595 A1*   2/2017   Zhang ................. H04L 41/12
2017/0359768 A1    12/2017   Byun et al.
(Continued)

FOREIGN PATENT DOCUMENTS

WO    2017080517 A1    5/2017
WO    2017185909 A1    11/2017

OTHER PUBLICATIONS

F. Schmidt, M. Niepert and F. Huici, "Representation Learning for Resource Usage Prediction", arXiv:1808.00673v1 [cs.DC] Feb. 2, 2018.

(Continued)

*Primary Examiner* — Asghar H Bilgrami

(57) ABSTRACT

The present invention provides methods and apparatuses for service based architecture (SBA) for data analytics management (DAM). Configuration specifications are provided for configuring DAM entities for infrastructure management by infrastructure managers (InfMs), customer service managers (CSMs) for network slice subnet instance (NSSI), network slice instance (NSI) and service instance (SI) management, content and forwarding managers (CFM) for content and content cache management. Also provided are methods and apparatus for data analytics service provisioning regardless of DAM architecture.

23 Claims, 31 Drawing Sheets

(56) References Cited

U.S. PATENT DOCUMENTS

| | | | |
|---|---|---|---|
| 2018/0013680 A1 | 1/2018 | Bull et al. | |
| 2018/0287891 A1* | 10/2018 | Shaw | H04W 24/02 |
| 2018/0359337 A1* | 12/2018 | Kodaypak | H04L 43/08 |
| 2020/0052991 A1* | 2/2020 | Kodaypak | H04L 47/2416 |
| 2020/0053834 A1* | 2/2020 | Dahan | H04W 28/16 |

OTHER PUBLICATIONS

Sepp Hochreiter and Jurgen Schmidhuber. 1997. Long Short-Term Memory. Neural Compute. 9, 8 (Nov. 1997), 1735-1780.

Management and orchestration of 5G networks; Performance assurance; 3GPP TS 28.550 V1.2.2 (Aug. 2018).

Aspects;Management and orchestration; 5G end to end Key Performance Indicators (KPI); 3GPP TS 28.554 V16.1.0 (Jun. 2019).

Management and orchestration of networks and network slicing; Performance Management (PM); Stage 2 and stage 3; 3GPP TS 28.551 V0.3.0 (Jul. 2018).

Add Data Analytics Management Service for Network Slice and Network Slice Subnet; 3GPP TSG SA WG5 (Telecom Management) Meeting #119; S5-18xyzr; May 14-18, 2018, San Diego, USA.

Add requirements for data analytics management service; 3GPP TSG SA WG5 (Telecom Management) Meeting #119 S5-18xyzr; May 14-18, 2018, San Diego, USA.

3GPP TS 28530 3GPP Technical Specification Group Services and System Aspects; Telecommunication management, Management of 5G networks and network slicing; Concepts, use cases and requirements (Release 15) v0.7.0., (May 2018).

3GPP TS 28530 3GPP Technical Specification Group Services and System Aspects; System Architecture for 5G System; (Release 15) v15.1.0, (Dec. 2018).

3GPP TS 28550 3GPP Technical Specification Group Services and System Aspects; Management and orchestration of networks and network slicing; Performance Managements; (Release 15) v0.3.0, (May 2018).

* cited by examiner

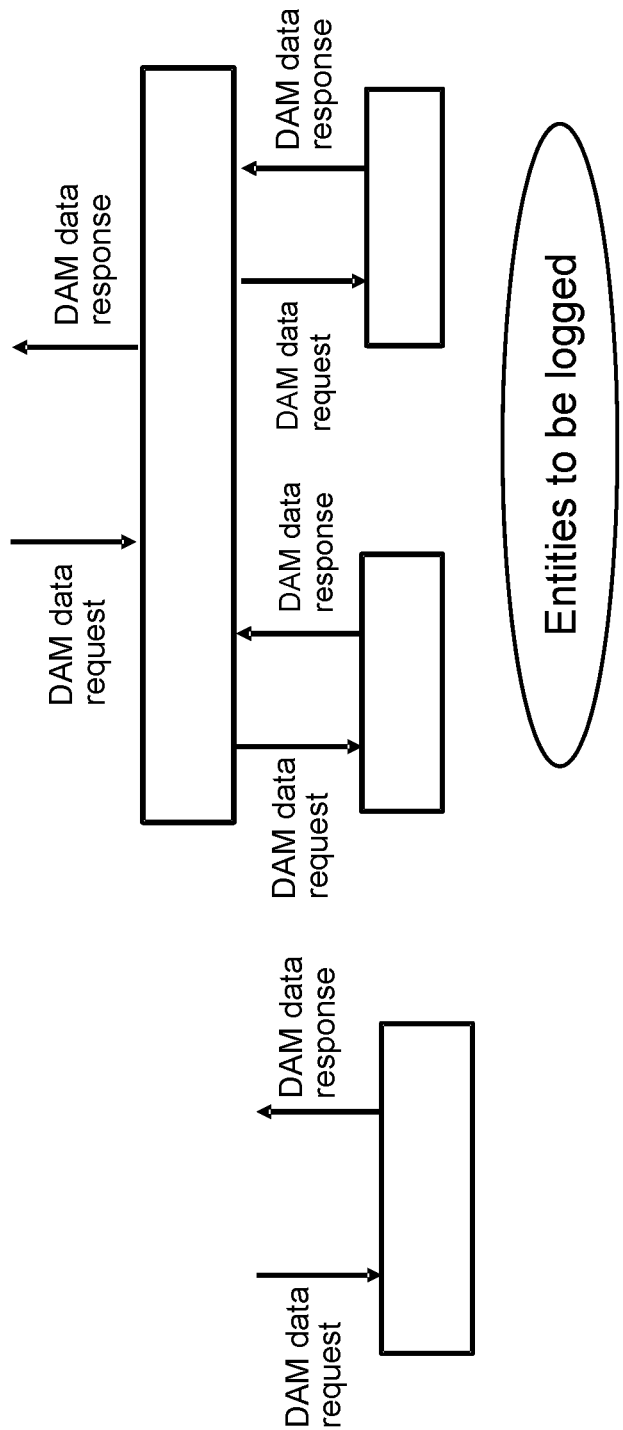

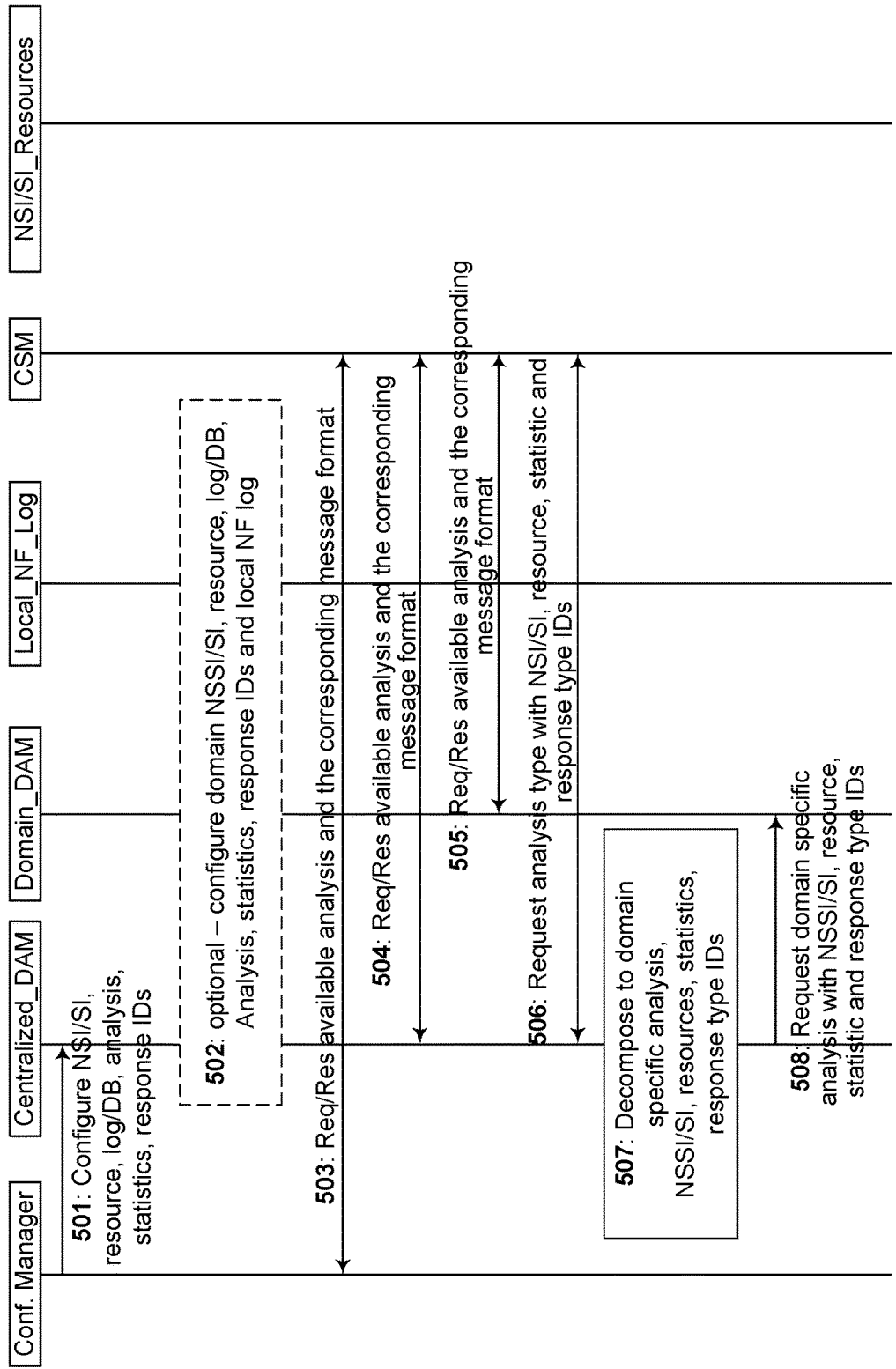

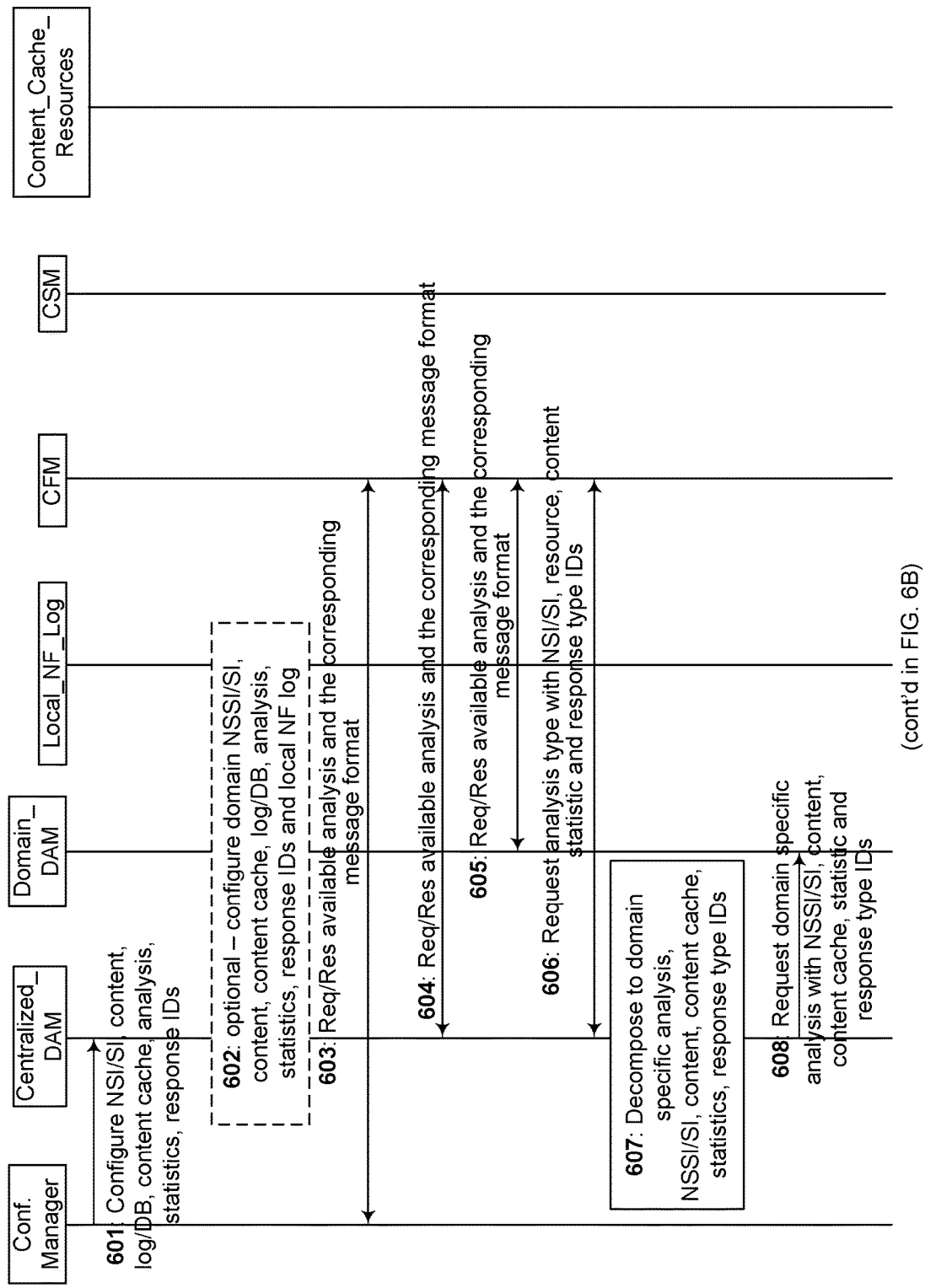

DATA ANALYTICS MANAGEMENT (DAM), CONFIGURATION SPECIFICATION AND PROCEDURES, PROVISIONING, AND SERVICE BASED ARCHITECTURE (SBA)

CROSS-REFERENCE TO RELATED APPLICATIONS

This application claims the benefit of priority from U.S. Provisional Patent Application Ser. No. 62/719,363 filed on Aug. 17, 2018 and entitled "Data Analytics Management (DAM), Configuration Specification and Procedures, Provisioning, and Service Based Architecture (SBA)" and U.S. Provisional Patent Application Ser. No. 62/688,603 filed on Jun. 22, 2018 and entitled "Service Based Architecture (SBA) for Data Analytics Management (DAM), Configuration Specification and Procedures", the contents of each of which are incorporated by reference.

FIELD OF THE INVENTION

The present invention pertains to the field of network communications, and in particular to a method and apparatus for a service-based architecture for data analytic management (DAM), configuration specification and procedures, and methods and apparatus for data analytics service provisioning.

BACKGROUND

Fifth Generation (5G) networks introduce the concepts of network slice instance (NSI) and network slice subnet instance (NSSI). In a dynamic shared deployment, it is desirable to analyze and predict resource usage and resource utilization for physical and virtual infrastructure. It is also desirable to have network slice and network service specific analysis for optimal resource utilization and efficient network performance assurance. Such analysis of network data will facilitate different network management entities to make dynamic network operation decisions.

Making use of data analytics tools in wireless networks and network management is gaining importance due to challenging network requirements and service guarantees. Therefore, creating an efficient environment and methods and associated apparatus for supporting data analytics is required. In the $3^{rd}$ Generation Partnership Project (3GPP) document entitled "3rd Generation Partnership Project; Technical Specification Group Services and System Aspects; Management and Orchestration of 5G Networks; Performance Assurance (Release 15)," August 2018, numbered TS 28.550 v 1.2.2 and hereinafter referred to as TS 28.550, management data analytical services (MDAS) is described and related to performance measurement (PM).

Therefore there is a need for a method and apparatus for flexible and scalable DAM architecture model, as well as for data analytics service provisioning, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for a service-based architecture for data analytic management (DAM), configuration specification and procedures. In accordance with embodiments of the present invention, there is provided an apparatus comprising: a computer processor, a memory and a network interface. The apparatus is configured to receive, via the network interface, configuration instructions. The apparatus is configured to interact, via the network interface, with one or more network devices to obtain network operating information therefrom based on the configuration instructions. The apparatus is configured to perform an analysis, for example as specified in the configuration instructions. Performing the analysis may include, for example, processing, using the computer processor, the obtained network operating information. Performing the analysis can include processing, by the computer processor, the obtained network operating information according to processing operations specified in the received configuration instructions. The apparatus is configured to transmit, via the network interface, results of the processing operations toward one or more network management devices or another networked apparatus, based on the configuration instructions.

In various embodiments of the present invention, the configuration instructions may specify at least: an identification of one or more of network slices; an identification of one or more network devices supporting one or more of the network slices; an aspect of the one or more of network slices for which operating information, for example network operating information (e.g. associated with the network slice), is to be obtained; an analysis (e.g. a type of analysis) to be performed, for example by the processing operations; and a response mode indicative of conditions under which the results of the processing operations are to be transmitted toward the one or more network slice management devices.

In some embodiments, the one or more network devices belong to a single network domain and the results of the processing operations pertain to the single network domain. The single network domain may be one of: a network function domain; a radio access network domain; a transport network domain; and a core network domain. In various embodiments, the configuration instructions are received from a configuration manager apparatus. In some embodiments, the apparatus is further configured to store some or all of the obtained network operating information, some or all of the results of the processing operations, or both, in a database, the database specified by the configuration instructions. In some embodiments, the interacting with one or more network devices to obtain network operating information, the processing of the obtained network operating information, and the transmission of the results of the processing operations toward the one or more network management devices is performed in response to a request by at least one of the one or more network management devices or another entity on behalf thereof.

In some embodiments, the apparatus comprises a plurality of separate sub-apparatuses each comprising a respective computer processor, a respective memory and a respective network interface and operatively coupled via a communication network. Each of the plurality of sub-apparatuses is configured to interact, via the respective network interface, with some or all of the one or more network devices to obtain respective network operating information therefrom based directly or indirectly on the configuration instructions. Each sub-apparatus is further configured to process, by the respective computer processor, the obtained respective network operating information according to respective processing operations based directly or indirectly on the configuration instructions. Each sub-apparatus is further configured to transmit, via the respective network interface, results of the respective processing operations toward another one of the sub-apparatuses, or one or more network management devices, based directly or indirectly on the configuration instructions.

In some such embodiments, a first one of the sub-apparatuses is configured to generate and transmit further configuration instructions to a second one of the sub-apparatuses, and wherein the second one of the sub-apparatuses is configured to: interact with some or all of the one or more network devices to obtain a portion of the network operating information therefrom based on the further configuration instructions; process the obtained portion of the network operating information according to further processing operations specified in the received further configuration instructions; and transmit results of the further processing operations toward the first one of the sub-apparatuses, based on the further configuration instructions, In some such embodiments, the first one of the sub-apparatuses receives and handles said results of the further processing operations as the obtained respective network operating information. In some such embodiments, a first one of the sub-apparatuses is configured to obtain and process respective network operating information pertaining to a first network domain, network slice instance or network slice subnet instance, and a second one of the sub-apparatuses is configured to obtain and process respective network operating information pertaining to a second, different network domain, network slice instance or network slice subnet instance. In some further such embodiments, a third one of the sub-apparatuses is configured to obtain and process the results of the respective processing operations from the first one of the sub-apparatuses and the second one of the sub-apparatuses.

In accordance with other embodiments of the present invention, there is provided a configuration manager apparatus comprising: a computer processor, a memory and a network interface. The apparatus is configured to generate configuration instructions using the computer processor and transmit configuration instructions via the network interface to a separate apparatus. The configuration instructions cause the separate apparatus to: interact with one or more network devices to obtain network operating information therefrom based on the configuration instructions; process the obtained network operating information to perform an analysis, for example according to processing operations specified in the received configuration instructions; and provide results of the processing operations to one or more network management devices or another networked apparatus, based on the configuration instructions.

In accordance with other embodiments of the present invention, there is provided a system comprising the apparatus configured to receive and execute configuration instructions as set forth above, a configuration manager apparatus having another computer processor, memory and network interface and configured to generate and transmit the configuration instructions to the apparatus, and a network management device configured to receive the results of the analysis (e.g. due to processing operations) from the apparatus and perform one or more network management actions based on the received results of the analysis (e.g. associated processing operations).

In some such embodiments, the one or more network management actions include one or more of: resource scaling; network slice admission control; predicting scalability of physical and virtual network resources; fault recovery for infrastructure, network slice instance or service instance; network slice provisioning; network slice modification; mobility management in a network slice instance; mobility management for users belonging to a service instance; cross-PLMN mobility analysis; traffic steering in a network slice instance or service instance; load balancing in a network slice instance or service instance; network slice-specific performance assurance; QoS analysis; content cache instantiation for a network slice instance, service instance or user; and content cache migration for a network slice instance, service instance or user.

In accordance with embodiments of the present invention, there is provided a method in a communication network. The method includes receiving configuration instructions, for example specifying the information as listed above. The method includes configuring one or more networked analytics functions based on the configuration instructions. The method includes receiving a request message, from a network management device, for a specified resource analysis which the one or more networked analytics functions are configured to provide due to the configuration instructions. The method includes obtaining, by the one or more networked analytics functions, network operating information from one or more network devices, based on the configuration instructions for implementing the specified resource analysis. The method includes processing, by the one or more networked analytics functions, the obtained network operating information to implement the specified resource analysis. In some embodiments, the processing may be performed according to processing operations specified in the configuration instructions for implementing the specified resource analysis. The method includes transmitting, via the network interface, results of the processing operations toward the network management device.

Some embodiments provide a method in a communication network, comprising: receiving configuration instructions; and configuring one or more networked analytics functions based on the configuration instructions. The configuring causes the one or more network analytics functions to subsequently: accept a request message, from a network management device, for a specified resource analysis which the one or more networked analytics functions are configured to provide due to the configuration instructions; obtain, by the one or more networked analytics functions, network operating information from one or more network devices, based on the configuration instructions for implementing the specified resource analysis; process, by the one or more networked analytics functions, the obtained network operating information according to processing operations specified in the configuration instructions for implementing the specified resource analysis; and transmit, via the network interface, results of the processing operations toward the network management device.

Some embodiments provide a method in a communication network, comprising: configuring one or more networked analytics functions with specific configuration parameters to implement one or more network analytics operations related to resources used by a network slice; receiving a request message, from a network management device, for a specified resource analysis which the one or more networked analytics functions are configured to provide; obtaining, by the one or more networked analytics functions, network operating information from one or more network devices for implementing the specified resource analysis; processing, by the one or more networked analytics functions, the obtained network operating information according to processing operations for implementing the specified resource analysis; and transmitting, via the network interface, results of the processing operations toward the network management device. Some or all of the receiving, obtaining, processing and transmitting operations may be configured and performed based on the configuration parameters, which may be received from another device.

An object of the present invention is to provide a method and apparatus for data analytics service provisioning, for a variety of DAM architectures. In accordance with embodiments of the present invention, there is provided a method of creating and performing a Data Analytics Management (DAM) job. The method includes performing the following operations by a first DAM device, which may be a DAM provider (DAM_P) apparatus, a central or coordinating sub-apparatus of the DAM_P apparatus, or a domain DAM apparatus. The method includes receiving a request message indicative of the DAM job. The method optionally includes generating and transmitting a response to the request message based on an evaluation of contents of the request message by the first DAM device, the response indicative whether the DAM job can be accommodated. The method includes, if an analysis of contents of the request message indicates that existing DAM configurations are insufficient for accommodating the DAM job: interacting with one or more other network devices to cause said other network devices to obtain and transmit additional information toward the first DAM device, the additional information for accommodating the DAM job according to determined requirements; and collecting data from the one or more other network entities to perform the DAM job. The method includes producing and transmitting one or more report messages comprising results of an analysis of the collected data in furtherance of performing the DAM job.

In some such embodiments, the method further includes, by the first DAM device, querying the one or more other network devices to obtain an indication of data available from said one or more other network devices for performing the DAM job. In further such embodiments, the querying includes one or more of: querying one or more other DAM entities to obtain an indication of provided DAM services, databases containing relevant data, or a combination thereof, querying one or more network management service providers or network slice management service providers, or fault management, configuration management or performance management entities thereof, to obtain an indication relevant data; and querying one or more databases to obtain an indication of data, remaining capacity, or a combination thereof, available therefrom. In other further such embodiments, the one or more other DAM entities include one or more of: domain DAM entities; network function (NF) DAM entities; and $3^{rd}$ party DAM entities. In other further such embodiments, the method includes analyzing query responses to determine whether a reconfiguration of the one or more other network devices is required for providing data for performing the DAM job. In other further such embodiments, the method further includes querying the one or more other network devices to obtain configuration information usable for interacting with the one or more other network devices and organizing and interpreting data provided thereby. In other further such embodiments, the relevant data includes configuration information, measurements, reports, or a combination thereof.

In accordance with embodiments of the present invention, there is provided a method of creating a Data Analytics Management (DAM) job. The method includes, by a DAM provider apparatus or sub-apparatus thereof, receiving and processing one or more of: a RequestDAM( ) message; a DAMList( ) message; a NFDAMReport( ) message; a PMJobReportO message; a DAMList( ) message; a DataReport( ) message; and a SendReport( ) message. These messages are described in the description below.

In accordance with embodiments of the present invention, there is provided a method of creating a Data Analytics Management (DAM) job. The method includes, by a DAM provider apparatus or sub-apparatus thereof, generating and transmitting one or more of: a ResponseDAMRequest( ) message; a QueryDAM( ) message; a QueryNFDAM( ) message; a QueryPMjobO message; a QueryAnalysis( ) message; a QueryData( ) message; a RequestReport( ) message; and a MDASReport( ) message. These messages are described in the description below.

In accordance with embodiments of the present invention, there is provided an apparatus comprising a computer processor, a memory and a network interface and configured to carry out one or more of the above-described methods.

For example, the apparatus may be configured to create and perform a Data Analytics Management (DAM) job, the apparatus being a first DAM device operating as a DAM provider (DAM_P) apparatus, a central or coordinating sub-apparatus of the DAM_P apparatus, or a domain DAM. The apparatus is accordingly be configured to: receive a request message indicative of the DAM job. The apparatus is configured, if an analysis of contents of the request message indicates that existing DAM configurations are insufficient for accommodating the DAM job, to: interact with one or more other network devices to cause said other network devices to obtain and transmit additional information toward the first DAM device, the additional information for accommodating the DAM job according to determined requirements; and collect data from the one or more other network entities to perform the DAM job. The apparatus is further configured to produce and transmit one or more report messages comprising results of an analysis of the collected data in furtherance of performing the DAM job. In some embodiments, the apparatus is further configured to generate and transmit a response to the request message based on an evaluation of contents of the request message by the first DAM device, the response indicative whether the DAM job can be accommodated.

BRIEF DESCRIPTION OF THE FIGURES

Further features and advantages of the present invention will become apparent from the following detailed description, taken in combination with the appended drawings, in which:

FIGS. 1A and 1B are schematic diagrams illustrating a single DAM architecture and a hierarchical DAM architecture in 5G network, respectively, in accordance with embodiments of the present invention.

FIGS. 5A and 5B show a flow diagram illustrating a method of DAM configuration for customer service management (CSM) in accordance with embodiments of the present invention.

FIGS. 6A and 6B show a flow diagram illustrating a method of DAM configuration for content and forwarding service management (CFM) in accordance with embodiments of the present invention.

It will be noted that throughout the appended drawings, like features are identified by like reference numerals.

DETAILED DESCRIPTION

Definitions

Figure 1C:
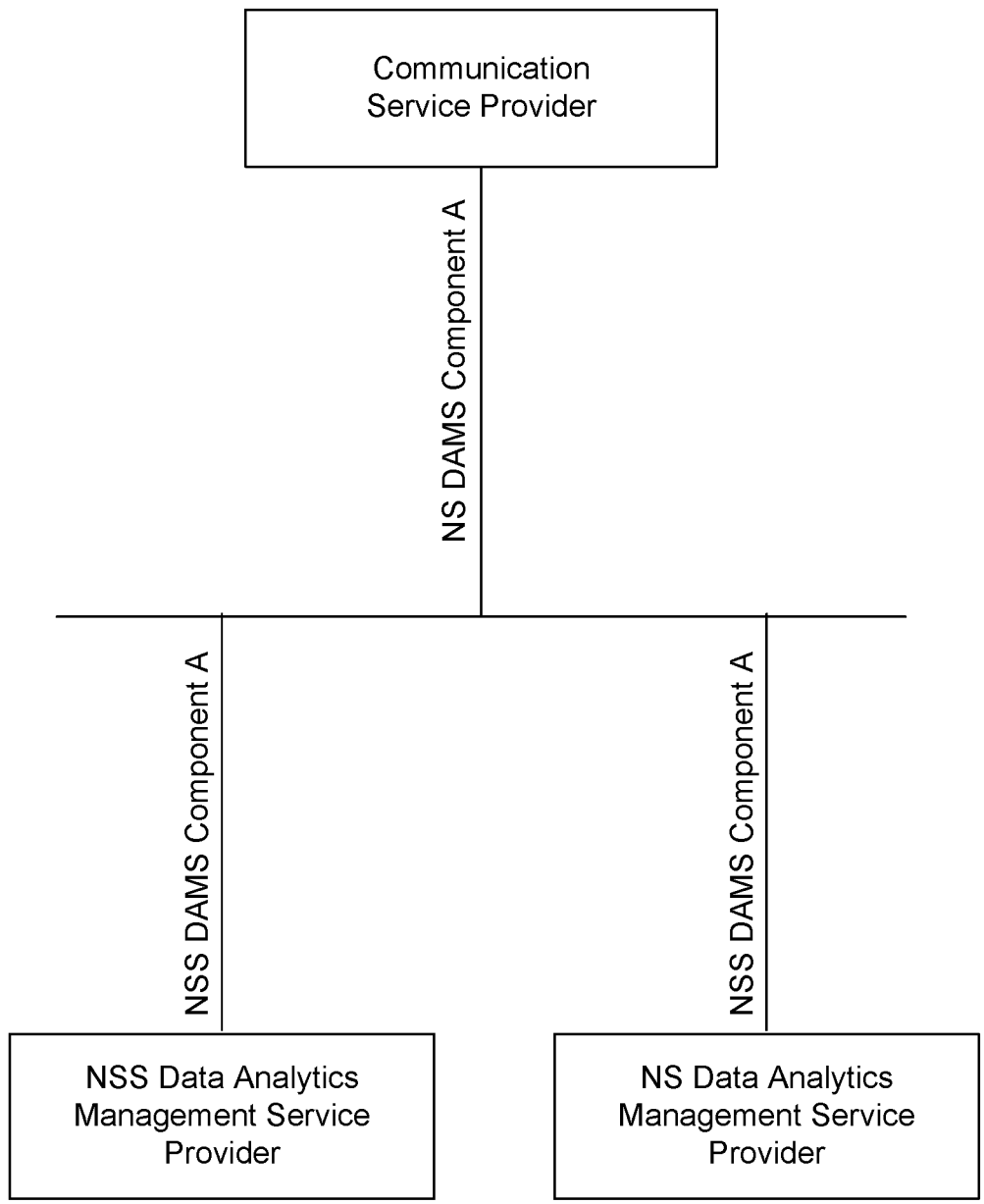
FIG. 1C is a schematic diagram illustrating a connection between a Network slice (NS) DAM, a Network slice subnet (NSS) DAM, and a communication service provider, in accordance with embodiments of the present invention.

The term "network function (NF)" refers to any physical and virtual network functions (PNFs, VNFs) that can perform data plane and/or control plane and/or management plane functionalities.

The term "SI" refers to any communication service instance (CSI) provided by different vertical industries for example Internet of Things (IoT), Vehicle to everything (V2X), etc.

The term "DAM Service" refers to any service provided, delivered, operated or performed by DAM or DAM entities. The DAM services may be related to data analytics management.

The terms "DAM" and "DAM entity/entities" refer to network entities performing data analytic management or data analytic management related work. The terms may be interchangeably used in this application where appropriate.

Unless defined otherwise, all technical and scientific terms used herein have the same meaning as commonly understood by one of ordinary skill in the art to which this invention belongs.

The present invention provides a flexible and scalable DAM model for analyzing infrastructure, network slice and service resources and operations for optimal resource utilization and efficient network performance assurance. The present invention also defines specification for configuring DAM for Infrastructure Management (InfM), Customer Service Management (CSM) and Content and Forwarding Management (CFM), and procedures for communication among the different involved network entities. The DAM can be configured using a configuration interface, which is used to pass configuration instructions from a configuration manager (or higher-level DAM) to the DAM. These and other network entities may be existing network entities defined for example by relevant 5G standards documents.

Embodiments of the present invention provide for the resource usage calculation and prediction for Network Function (NF), Network Slice Subnet (NSS) and Network Slice (NS). Embodiments of the present invention provide analysis of network operations in support of optimization of resource utilization and network performance assurance of NSI, NSSI and the infrastructure on which they are provisioned.

To have analysis that supports different network management entities making dynamic network operation decisions, embodiments of the present invention provide for a data analytics management (DAM) framework for networks such as 5G networks. Data analytics management (DAM) service for different network entities e.g., network slice subnet instances (NSSIs), network slice instances (NSIs) can be used for efficient network management and orchestration. For example, the availability of runtime resource usage prediction information about a network entity supports taking action for proper operation of that network entity. The actions for proper operation of that network entity may include resource scaling, admission control, on-demand resource acquisition, congestion-avoidance load balancing (i.e. load balancing of traffic), service uninterrupted mobility management and etc. Embodiments of the present invention provide for the analysis of various dynamic network operation related parameters (e.g. mobility, quality of service (QoS), content, charging, etc.) or network data (e.g. NSI, service instance (SI), user quality of service (QoS), mobility patterns, content demand probability, etc.) for efficient network operation.

The present invention is applicable to various communication networks including 5G and other telecommunication (e.g. cellular) networks such as data center networks, wireless networks and enterprise networks.

Generally speaking, DAM provides functions in relation to data log and analytics, but does not necessarily make decisions with respect to network operation. Rather, DAM receives and fulfills requests for data analytics information from a requester. Upon receiving the requests, the DAM may collect various data from different network entities. The collected data may include one or more of attributes of log data (e.g. information in relation to network slice instance, service instance, customer, device, application, etc.) NSI/SI specification, log data type, information type (from raw data), log period, reporting types and etc. Once the DAM collects the data, it may consolidate the collected network data and function to produce the data analytics information that will satisfy the request. Then, the DAM will respond to the requester with the requested data analytics information. The information provided to the requester may include attributes of log data and/or list of information data.

A network may include a single DAM as shown in FIG. 1A. This is a basic service model. The DAM in the basic service model may simply receive requests from the requesters (e.g. various network entities) and provides the requested network information (e.g. data analytics information) to the requesters.

On the other hand, a network may include a hierarchical DAM (logical) architecture when such DAM architecture is needed. The hierarchical DAM architecture comprises a plurality of DAM entities. Each DAM entity functions similarly to the DAM entity in the aforementioned basic service model. The DAM entities receive DAM data request from a requester and respond to requester with the requested information. The DAM entities are communicatively connected to each other with a hierarchical structure as shown in FIG. 1B. While there are only two hierarchical tiers shown in FIG. 1B, there may be more than two tiers in this type of DAM architectures.

Referring to FIG. 1B, the DAM entity at the upper tier in FIG. 1B receives and responds to requests from a requester, which is a network entity that is not a DAM entity. The upper-tier DAM entity then sends requests to one of the bottom-tier DAM entities or both of the bottom-tier DAM entities depending on the requests. The two bottom-tier DAM entities may collect data related to the requested information and may also analyze the collected data to produce the data analytics information that will satisfy the request. The bottom-tier DAM entities then send the requested information to the upper-tier DAM entity. Upon receipt of the information, the upper-tier DAM entity may further analyze the received information, if necessary, and respond to the original requester (i.e. network entity that is not a DAM entity) with the data analytics information that will satisfy its original request. Some or all of the DAM entities may process information received thereby in response to requests. Some or all of the DAM entities may process the requests in order to generate further requests to transmit to lower-level DAM entities or other devices from which data is to be retrieved.

According to embodiments, a DAM service for a network slice provides slice related data analytics (e.g., resource usage prediction of a network slice) to its authorized consumer. A slice-supporting DAM service may consume (receive and process) corresponding data analytics results (e.g., resource usage prediction of a NSS) from its constituent NSS. As shown in FIG. 1C, the NS DAM service requests a NSS DAM service from its constituent NSS by using the NSS DAM service component A (e.g. NSSRUPredictionReq). The NSS DAM service responds using the NSS DAM service component A (e.g. NSSRUPredictionRes). Similarly, when an authorized communication service provider requests a NS data analytics service using a NS DAM service component A (e.g. NSRUPredictionReq), the NS DAM service responses using a NS DAM service component A (e.g., NSRUPredictionRes).

FIGS. 2A to 2E illustrate various service based architectures (SBA) for DAM. The DAM architectures illustrated in FIGS. 2A to 2E provide flexible and scalable deployment models for DAM in 5G networks for efficient management and operation of physical networks, virtual networks, or a combination thereof. The flexible and scalable DAM model is provided for analyzing infrastructure, network slice and service resources, operation for optimal resource utilization, and efficient performance assurance.

Figure 2A:
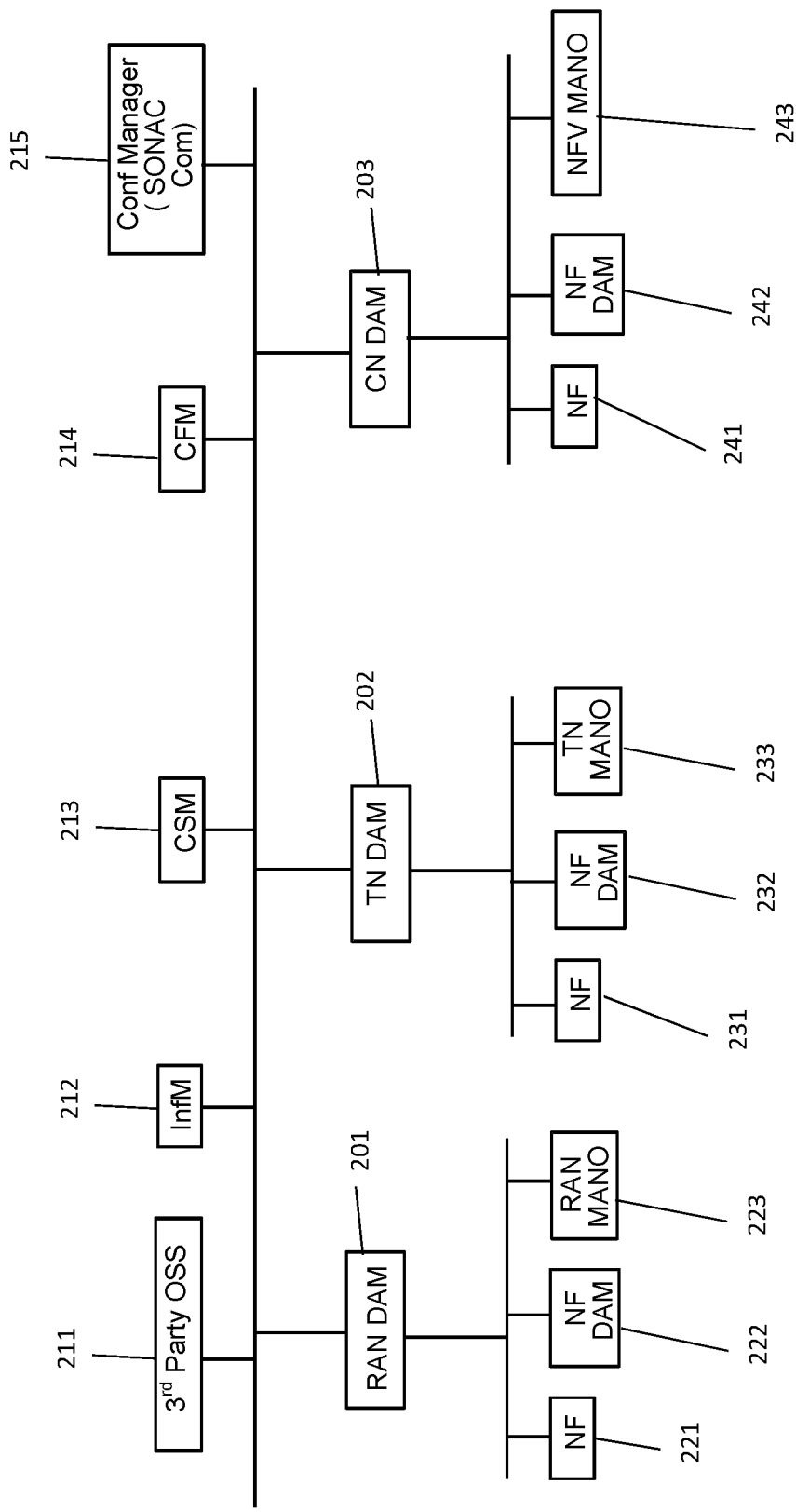
FIGS. 2A to 2E are schematic diagrams illustrating flexible and scalable deployment models for service based architectures (SBA) for DAM in accordance with embodiments of the present invention.

FIG. 2A is a block diagram illustrating an example/ embodiment of a SBA for domain-specific DAM. Referring to FIG. 2A, the network includes several DAM entities in each domain. The DAM entities in each domain are shown as the Radio Access Network (RAN) DAM 201, Transport Network (TN) DAM 202, and Core Network (CN) DAM 203. The RAN DAM 201 is communicatively connected to various network entities, for example the Network Function(s) (NF) 221, the NF DAM 222 and the RAN Management and Orchestration (MANO) 223. Although various figures illustrate only a single NF per domain, it can be understood that there may be one or more NFs to which the corresponding domain DAM is communicatively coupled. Similarly, the TN DAM 202 is communicatively connected to various network entities, for example the Network Function(s) (NF) 231, the NF DAM 232 and the TN Management and Orchestration (MANO) 233; and the CN DAM 203 is communicatively connected to various network entities, for example the Network Function(s) (NF) 241, the NF DAM 242 and the Network Function Virtualization (NFV) Management and Orchestration (MANO) 243. According to embodiments, the RAN DAM 201, the TN DAM 202 and the CN DAM 203 may collect and log data from different network entities that are communicatively connected to them (e.g. NF 221, 231, 241; NF DAM 222, 232, 242; RAN MANO 223, TN MANO 223, NFV MANO 243). Upon collecting data, logging data, or both, each DAM entity may analyze one or more types of data to provide information to one or more network entities that sent requests (e.g. requesters) according to the nature of each request. Each of the domain-specific DAM entities may analyze the data collected from network entities in the specific domain that each DAM entity belongs to. The requesters may include the Infrastructure Management (InfM) entities 211, the Customer Service Management (CSM) entities 212, and/or the Content and Forwarding service Manager (CFM) entities 213. The requester may also include the third party Operational Support System (OSS) 214. The configuration manager 215 may initially send configuration instructions to each DAM, causing it to self-configure to be responsive to requests from other requester entities.

When the DAM entities complete analysis of the collected data and produce the data analytics information that will satisfy the received requests, each DAM entity may provide the data analysis services to the respective consumers (e.g. network entities that will consume the DAM data analysis services). For example, each of the DAM entities, i.e. the RAN DAM 201, the TN DAM 202 and the CN DAM 203, may provide their respective consumers with the requested network information or data analytics information in response to requests of the respective consumers. The respective consumers may include some or all of the InfM entities 211, the CSM entities 212, the CFM entities 213, the third party OSS 214. To implement this, each of the RAN DAM 201, the TN DAM 202 and the CN DAM 203 are communicatively connected to the InfM entities 211, the CSM entities 212, the CFM entities 213 and the third party OSS 214.

Figure 2B:
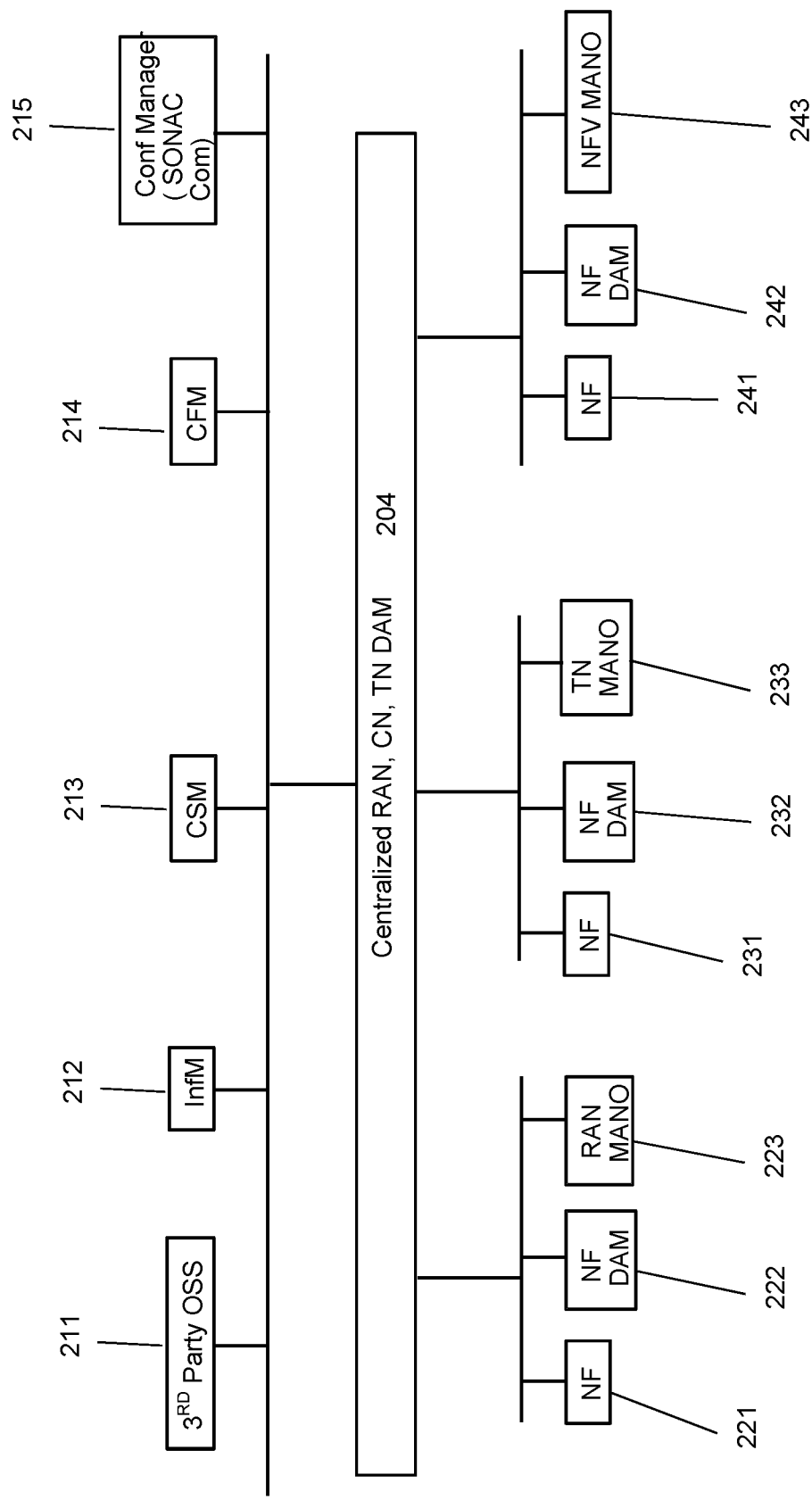

FIG. 2B is a block diagram illustrating an example/embodiment of a SBA for common or centralized DAM. Referring to FIG. 2B, the network includes only one common or centralized DAM entity, the centralized DAM 204. Unlike the domain-specific DAM entities (e.g. the RAN DAM 201, the TN DAM 202, the CN DAM 203), the centralized DAM 204 may collect and log data from different network entities in two or more different domains. To implement this, the centralized DAM 204 is communicatively connected to various network entities in multiple domains. For example, the centralized DAM 204 is communicatively connected to the NF 221, 231, 241; the NF DAM 222, 232, 242; the RAN MANO 223, the TN MANO 223, the NFV MANO 243. Due to the communicative connections with these network entities, the centralized DAM 204 is able to collect and log data from them. Upon collecting data, logging data, or both, from each network entities, the centralized DAM 204 may consolidate and analyze different types of data to provide information to different network entities that sent requests (e.g. requesters) according to the nature of each request. The requesters may include one or more of: the Infrastructure Management (InfM) entities 211, the Customer Service Management (CSM) entities 212, and the Content and Forwarding service Manager (CFM) entities 213. The requester may also include the third party Operational Support System (OSS) 214. The DAM 204 may be configured according to instructions received from the Configuration Manager 215 (e.g. Service Oriented Network Auto Creation Composition (SONAC-Com)).

When multiple DAMs, e.g. centralized, domain-specific, and NF DAMs, are present, they may be viewed as communicatively coupled sub-apparatuses of an overall DAM apparatus (or MDAF). Alternatively, the different DAM apparatuses may be viewed as a system of DAM apparatuses (or MDAFs) which are coupled together in such a way that higher-level DAMs request and obtain information from lower-level DAMs, and higher-level DAMs can provide configuration instructions to lower-level DAMs.

When the centralized DAM 204 completes analysis of the collected data and produces the data analytics information that will satisfy the received requests, the centralized DAM 204 may provide the data analysis services to the respective consumers (e.g. network entities that will consume the DAM data analysis services). For example, the centralized DAM 204 may provide its respective consumers with the requested network information or data analytics information in response to requests of the respective consumers. Similar to the domain-specific DAM model shown in FIG. 2A, the respective consumers may include one or more of: the InfM entities 211, the CSM entities 212, the CFM entities 213, and the third party OSS 214. To implement this, the centralized DAM 204 is communicatively connected to some or all of the respective consumers, for example the InfM entities 211, the CSM entities 212, the CFM entities 213, and the third party OSS 214.

Figure 2C:
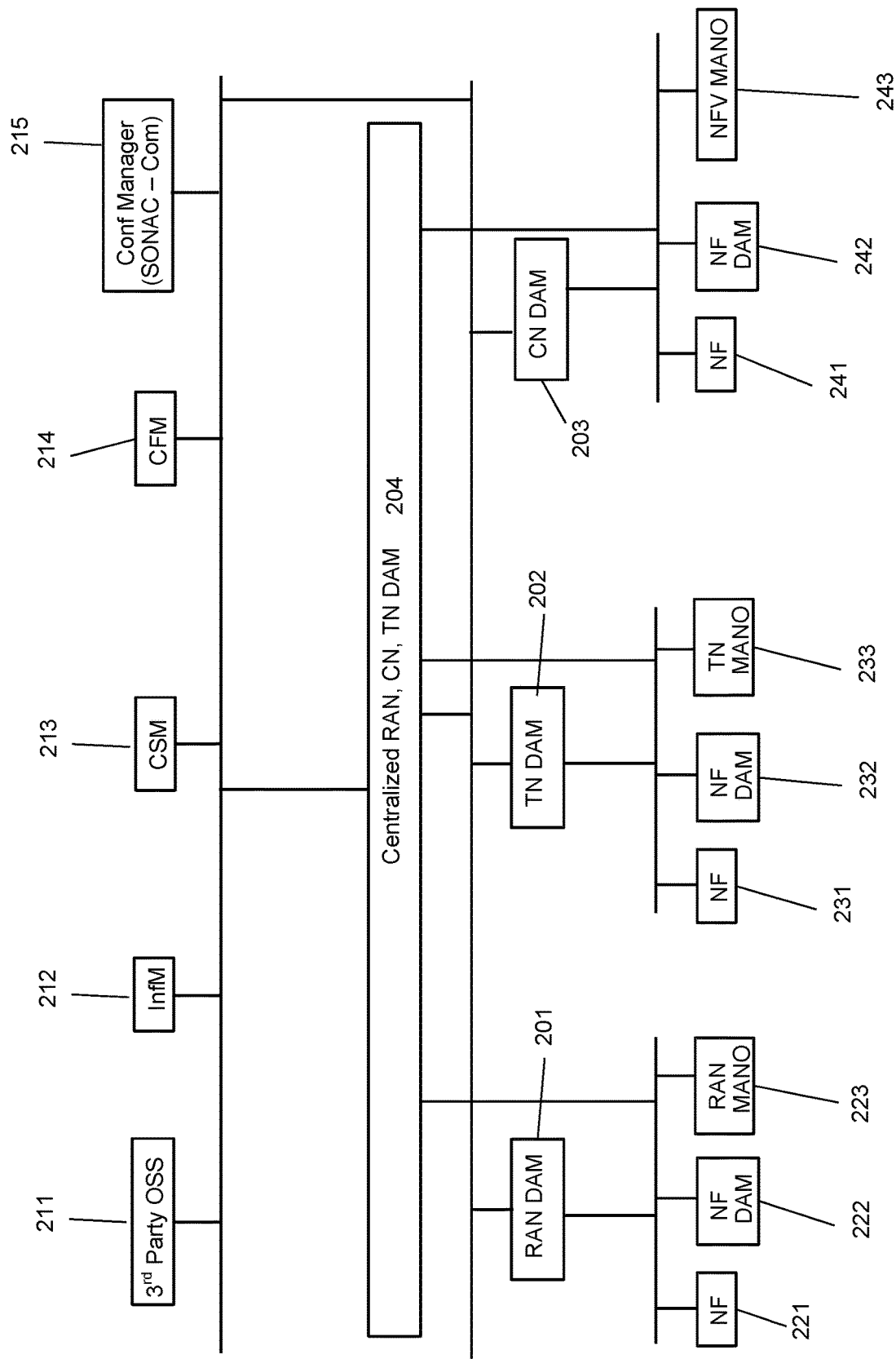

FIG. 2C is a block diagram illustrating an example/embodiment of a SBA for domain-specific and centralized DAM. This model is a combination of the domain-specific DAM model and the common/centralized DAM model. In this type of SBA for DAM, there are three types of DAM entities, i.e. the domain-specific DAM entities, the common/centralized DAM entity, and the NF DAM entities. The domain-specific DAM entities may include the RAN DAM 201, the TN DAM 202, the CN DAM 203 and the common/centralized DAM entity is the centralized DAM 204. As shown in FIG. 2C, each of the RAN DAM 201, the TN DAM 202 and the CN DAM 203 is communicatively connected to the centralized DAM 204. The embodiment of FIG. 2C is an implementation of the embodiment of FIG. 1B.

Referring to FIG. 2C, each of the domain-specific DAM entities and the common/centralized DAM entity is communicatively connected to various network entities. The RAN DAM 201 is communicatively connected to the NF 221, the NF DAM 222 and the RAN MANO 223. Similarly, the TN DAM 202 is communicatively connected to various network entities, for example the Network Function (NF) 231, the NF DAM 232 and the TN Management and Orchestration (MANO) 233; and the CN DAM 203 is communicatively connected to various network entities, for example the Network Function (NF) 241, the NF DAM 242 and the Network Function Virtualization (NFV MANO 243. In case of the common/centralized DAM entity, the centralized DAM 204 is communicatively connected to various network entities in multiple domains (e.g. NF 221, 231, 241; the NF DAM 222, 232, 242; the RAN MANO 223, the TN MANO 223, the NFV MANO 243).

According to embodiments, each of the domain-specific DAM entities and the common/centralized DAM entity may collect and log data from different network entities that are communicatively connected to them. For example, the RAN DAM 201 may collect and log data from network entities in RAN domain (e.g. the NF 221, the NF DAM 222 and the RAN MANO 223). Similarly, the TN DAM 202 may collect and log data from network entities in TN domain (e.g. the NF 231, the NF DAM 232 and the TN MANO 233); and the CN DAM 203 may collect and log data from network entities in CN domain (e.g. the NF 241, the NF DAM 242 and the NFV MANO 243). In case of the common/centralized DAM, the centralized DAM 204 can do both domain specific and cross domain analysis. In one case, the centralized DAM 204 may collect and log data from different network entities in all domains (e.g. NF 221, 231, 241; the NF DAM 222, 232, 242; the RAN MANO 223, the TN MANO 223, the NFV MANO 243). In another case, the centralized DAM 204 may collect and log data from one or some of the domain DAM entities, the RAN DAM 201, the TN DAM 202 and the CN DAM 203. Collecting and logging data from the RAN DAM 201, the TN DAM 202 and/or the CN DAM 203 are possible due to the communicative connection between these domain-specific DAM entities and the centralized DAM 204. In some embodiments, the centralized DAM 204 only directly collects and logs data from the domain DAMs. In this case, collection of data from other entities such as NFs is performed indirection, through domain DAMs. In other embodiments, the centralized DAM 204 also directly collects and logs data NF DAMs. In other embodiments, the centralized DAM 204 also directly collects and logs data from non-DAM entities such as NFs and MANOs.

Upon the collection of data, logging of data, or both, each DAM entity may analyze different types of data to provide information to different network entities that sent requests (e.g. requesters) according to the nature of each request. The requesters may include the Infrastructure Management (InfM) entities 211, the Customer Service Management (CSM) entities 212, and/or the Content and Forwarding service Manager (CFM) entities 213. The requester may also include the third party Operational Support System (OSS) 214.

According to embodiments, each of the domain-specific DAM entities may analyze the data collected from network entities in the specific domain that each DAM entity belongs to. For example, the RAN DAM entity may (only) analyze the data from the NF 221, the NF DAM 222 and the RAN MANO 223). On the other hand, according to embodiments, the centralized DAM 204 can perform both domain specific and cross-domain network data analysis. Depending on the nature of the requests, the centralized DAM 204 may consolidate and analyze different types of data from all domains or the centralized DAM 204 may only analyze data collected from network entities in a specific domain.

When the DAM entities complete analysis of the collected data and produce the data analytics information that will satisfy the received requests, one or more of the domain-specific DAM entities and the centralized DAM entities may provide the data analysis services to the respective consumers (e.g. network entities that will consume the DAM data analysis services). According to embodiments, each of the domain-specific DAM entities (e.g. the RAN DAM 201, the TN DAM 202 and the CN DAM 203) and the centralized DAM 204 may provide their respective consumers with the requested network information or data analytics information in response to requests of the respective consumers. The respective consumers may include one or more of: the InfM entities 211, the CSM entities 212, the CFM entities 213, and the third party OSS 214. To implement this, each of the RAN DAM 201, the TN DAM 202 and the CN DAM 203 are communicatively connected to the InfM entities 211, the CSM entities 212, the CFM entities 213, and the third party OSS 214. The DAMs 201, 202, 203 are also coupled to the Configuration Manager 215 which, in the present and other embodiments, provides configuration instructions to the DAMs.

Figure 2D:
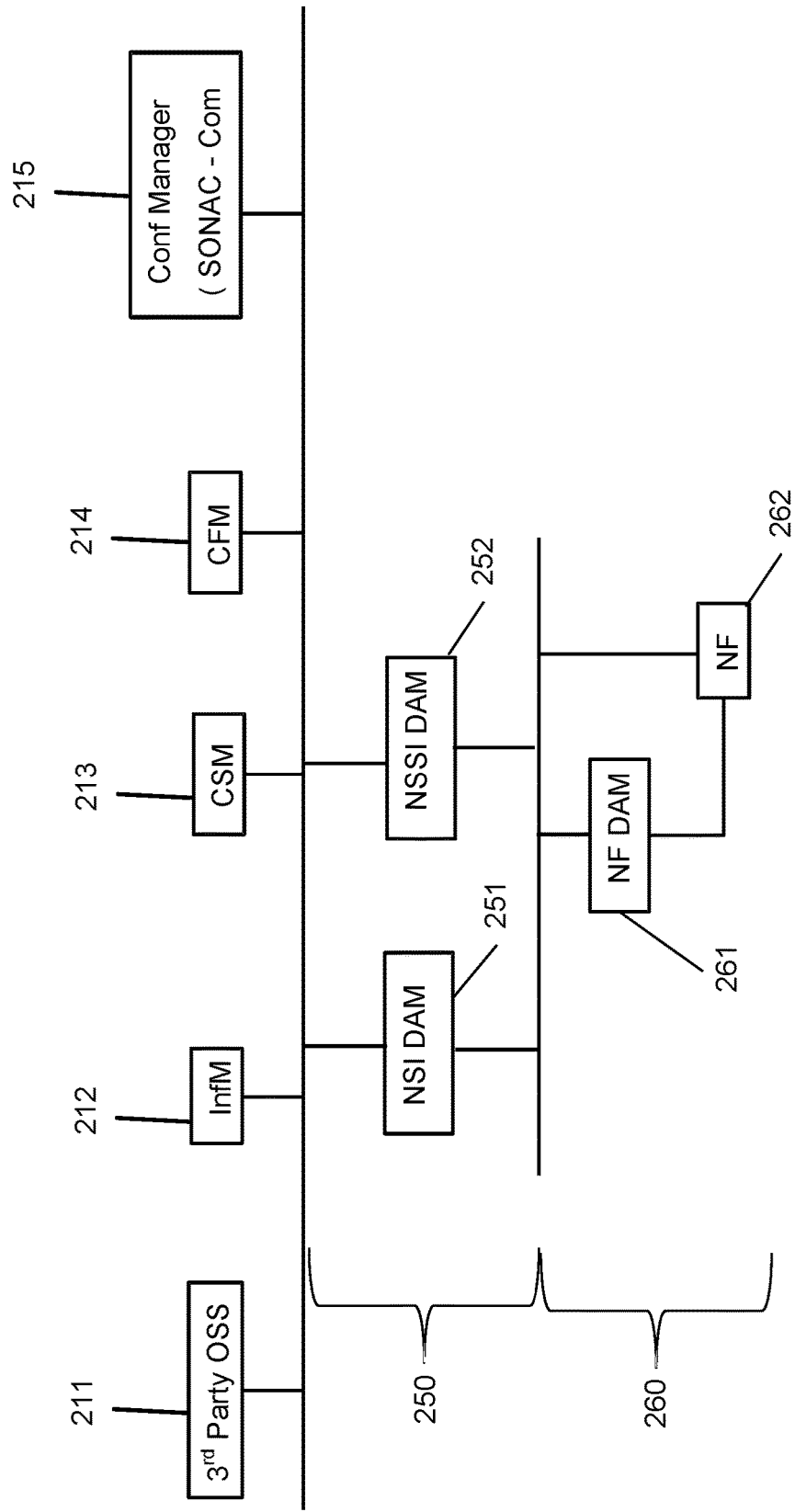

FIG. 2D is a block diagram illustrating an example/embodiment of a SBA for a layered DAM architecture. Referring to FIG. 2D, the network includes two network layers, namely the network slice layer 250 and the network function (NF) layer 260. The network includes the NSI DAM entity 251 (i.e. DAM for NSI) and the NSSI DAM entity 252 (i.e. DAM for NSSI) in the network slice layer; and includes the NF DAM entity 261 (i.e. DAM for NF) in the network function (NF) layer. The network in FIG. 2D also includes the NF 262 in the network function layer. Multiple NFs can be present. Multiple NF DAMs can also be present, with each NF DAM associated with one or more NFs. According to embodiments, each of the NSI DAM entity 251 and the NSSI DAM entity 252 is communicatively connected to the NF DAM 261 and the NF 262. The NF DAM 261 and the NF 262 are communicatively connected to one another.

According to embodiments, each of the DAM entities in the two network layers may collect and log data for the particular network layer that each DAM entity belongs to. For example, the NSI DAM 251 and the NSSI DAM 252 may (only) collect and log data for the network slice layer 250. In some embodiments, the NSSI DAM 252 may (only) collect and log data for a particular network slice subnet. The NF DAM entity 261 may (only) collect and log data for the network function (NF) layer 260.

Upon the collection of data, each DAM entity may analyze one or more types of data to provide analyzed information that satisfy the request of different network entities (e.g. requesters) according to the nature of each request and the prior configuration of the DAM. The requesters may include some or all of: the Infrastructure Management (InfM) entities 211, the Customer Service Management (CSM) entities 212, and/or the Content and Forwarding service Manager (CFM) entities 213. The requester may also include the third party Operational Support System (OSS) 214. The DAMs may be configured by the Configuration Manager 215 (e.g. Service Oriented Network Auto Creation Composition (SONAC-Com)).

According to embodiments, each DAM entity may analyze the data collected for the particular network layer which that DAM entity belongs to. For example, the NSI DAM 251 and the NSSI DAM 252 may (only) analyze the data collected for the network slice layer 250. On the other hand, the NF DAM entity 261 may (only) analyze the data collected for the network function (NF) layer 260.

When the DAM entities complete analysis of the collected data and produce the data analytics information that will satisfy the received requests, each of the DAM entities may provide the data analysis services (i.e. to the respective consumers, network entities consuming the DAM services). According to embodiments, only DAM entities in the network slice layer 250 provide their respective consumers with the requested network information or data analytics information in response to requests of the respective consumers. The respective consumers may include some or all of: the InfM entities 211, the CSM entities 212, the CFM entities 213, and the third party OSS 214. The respective consumers may further include Network Slice Management Functions (NSMF) entities, Network Slice Subnet Management Functions (NSSMF) entities, etc.

According to some embodiments, the NF DAM 261 does not directly respond to respective consumers as the NF DAM entity is not directly communicatively connected to those consumers. Instead, the data analytics information for the network function layer 260 provided by the NF DAM 261 may be consumed by the DAM entities in the network slice layer 250. The analyzed network data or data analytics information from the NF DAM 261 may be provided to one or more of the NSI DAM 251 and the NSSI DAM 252. Thus, when the respective consumer requests some data analytics information for the network function layer 260, then one or more of the DAM entities in the network slice layer 250 (e.g. NSI DAM 251 and NSSI DAM 252) may respond to the consumers based on the data analytics information or services provided by the NF DAM 261.

Figure 2E:
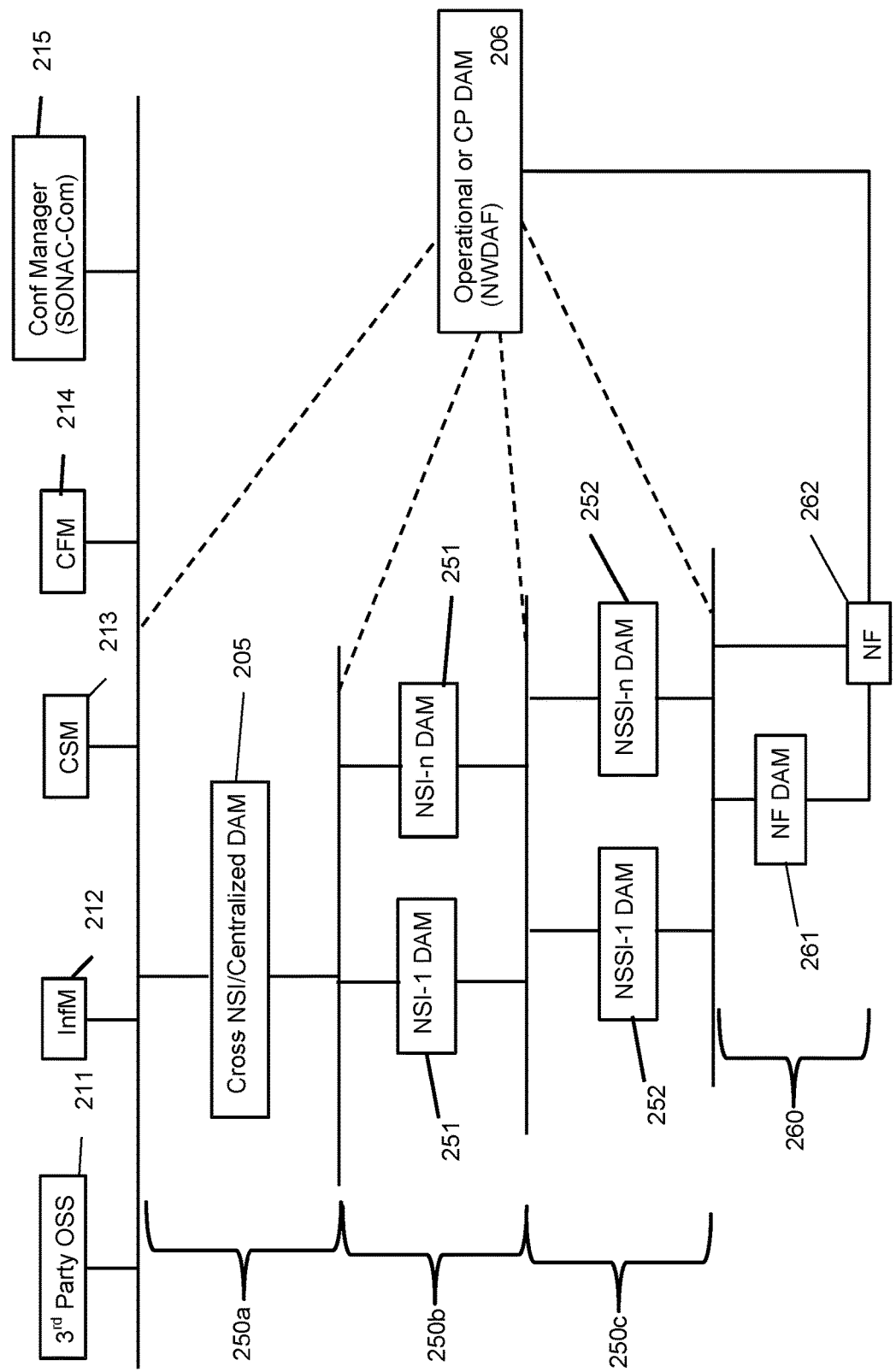

FIG. 2E is a block diagram illustrating another example/embodiment of a SBA for layered DAM. Referring to FIG. 2E, the network includes four network layers, namely the network slice instance (cross-NSI) or centralized DAM layer 250*a*, the network slice instance (NSI) layer 250*b*, the network slice subnet instance (NSSI) layer 250*c* and the network function (NF) layer 260. The network includes the cross-NSI/centralized DAM 205 in the cross-NSI layer 250*a*; one or more of the NSI DAM entities 251 (i.e. DAM for NSI) in the NSI layer 250*b*; one or more of the NSSI DAM entities 252 (i.e. DAM for NSSI) in the NSSI layer 250*c*; and the NF DAM entity 261 (i.e. DAM for NF) and the NF 262 in the network function (NF) layer 260. The NF layer 260 can include plural NFs, plural NF DAM entities, or both. The network also includes another network entity, the Operational or Control Plane (CP) DAM 206. The CP DAM 206 is the Network Data Analytics Function (NWDAF) and does not necessarily belong to any particular network layer. The NWDAF can operate as specified in $3^{rd}$ Generation Partnership Project (3GPP) standards documents, for example.

According to embodiments, various network entities are communicatively connected to each other in compliance with the defined hierarchical network layer as shown in FIG.

2E. The Cross-NSI/Centralized DAM 205 is communicatively connected to the NSI DAM entities 251; and the NSI DAM entities 251 are communicatively connected to the NSSI DAM entities 252. The NSSI DAM entities 252 are communicatively connected to the NF DAM 261 and the NF 262. The NF DAM 261 and the NF 262 are communicatively connected to one another. The NF 262 is also communicatively connected to the CP DAM 206. Additionally, the CAP DAM 206 can be communicatively connected to one or more network entities in one or more network layers (e.g. Cross-NSI/Centralized DAM 205, NSI DAM entities 251, NSSI DAM entities 252, NF 262). DAM entities that are not directly communicatively coupled can pass information (e.g. configuration instructions or collected operating data) to one another via one or more intermediate DAM entities, which may process such information as it is passed.

According to embodiments, each of the DAM entities may collect and log data for the particular network layer that each DAM entity belongs to. For example, the cross-NSI/centralized DAM 205 may (only) collect and log data for the cross-NSI layer 250a; the NSI DAM entities 251 may (only) collect and log data for the NSI layer 250b; the NSSI DAM entities 252 may (only) collect and log data for the NSSI layer 250c; and the NF DAM entity 261 and the NF 262 may (only) collect and log data for the network function (NF) layer 260.

According to embodiments, each DAM entities may analyze (process according to a predetermined routine) the data collected for the particular network layer that each DAM entity belongs to. For example, the cross-NSI/centralized DAM 205 may (only) analyze the data collected for the cross-NSI layer 250a; the NSI DAM entities 251 may (only) analyze the data collected for the NSI layer 250b; the NSSI DAM entities 252 may (only) analyze the data collected for the NSSI layer 250c; and the NF DAM entity 261 and the NF 262 may (only) analyze the data collected for the network function (NF) layer 260.

According to embodiments, when the DAM entities complete analysis of the collected data and produce the data analytics information in response to a received requests, each of the DAM entities may respond to the network entities that consumes their data analysis services. The NSSI DAM entities 252 consume the data analytics information and/or services provided by the NF DAM entity 261. The NSI DAM entities 251 consume the data analytics information and/or services provided by the NSSI DAM entities 252. The cross-NSI/centralized DAM 205 consumes the data analytics information and/or services provided by the NSI DAM entities 251. The cross-NSI/centralized DAM 205 provides other network entities (e.g. respective consumers such as NSMF, InfM, CSM, CFM) with its cross-NSI services and/or NSI DAN services that it consumed. In further, the cross-NSI/centralized DAM 205 may provide their respective consumers with the network information, analyzed data, and/or data analytics information in response to requests of the respective consumers. The respective consumers may include some or all of: the InfM entities 211, the CSM entities 212, the CFM entities 213, and the third party OSS 214. The respective consumers may further include Network Slice Management Functions (NSMF) entities, Network Slice Subnet Management Functions (NSSMF) entities, etc.

According to embodiments, the Operational or Control Plane (CP) DAM 206 (e.g. NWDAF) may consume the data analytics information and/or services provided by various network entities shown in FIG. 2E. The network entities providing services may include the cross-NSI/centralized DAM 205, the NSI DAM 251, NSSI DAM 252, and the NF 262. On the other hand, the CP DAM 206 may provide dynamic operational analytic services to the CSM entities 212 (e.g. NSMF) or other respective consumer network entities.

Figure 2F:
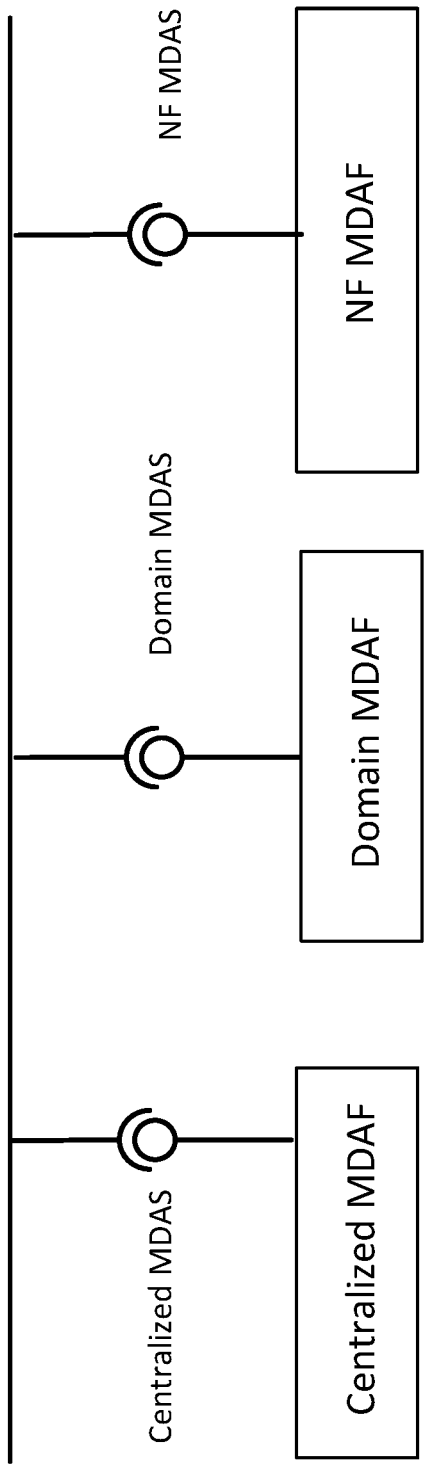
FIG. 2F is a schematic diagram illustrating an example of a Management Data Analytics Service (MDAS) architecture in accordance with embodiments of the present invention.

Considering that 5G networks have capability to support a variety of services, increasing flexibility of the networks may cause management challenges. To overcome the management challenges, 5G network management system can benefit from Management Data Analytics Services (MDAS) and can make the network more efficient in responding to various requests. MDAS is specified in various 3GPP standardization documents. The management data analytics utilize the network management data collected from the network and make the corresponding data analytics for the network based on the collected information. For example, the information provided by Performance Management (PM) data analytics services can be used to optimize network performance, and the information provided by Fault Management (FM) data analytics services can be used to predict and prevent failures of the network. For 5G networks with slicing, a network slice data analytics service can consume performance measurements and fault measurements data for its constituent network slice subnets. FIG. 2F illustrates an example of a service based Management Data Analytics Service (MDAS) architecture in accordance with embodiments of the present invention. According to various embodiments of the present invention, an MDAS may be provided by an MDAF, which may be implemented partially or fully by a DAM entity as described herein. However, while a DAM entity may operate as a MDAF, a DAM is not necessarily limited to providing management services.

Figure 2G:
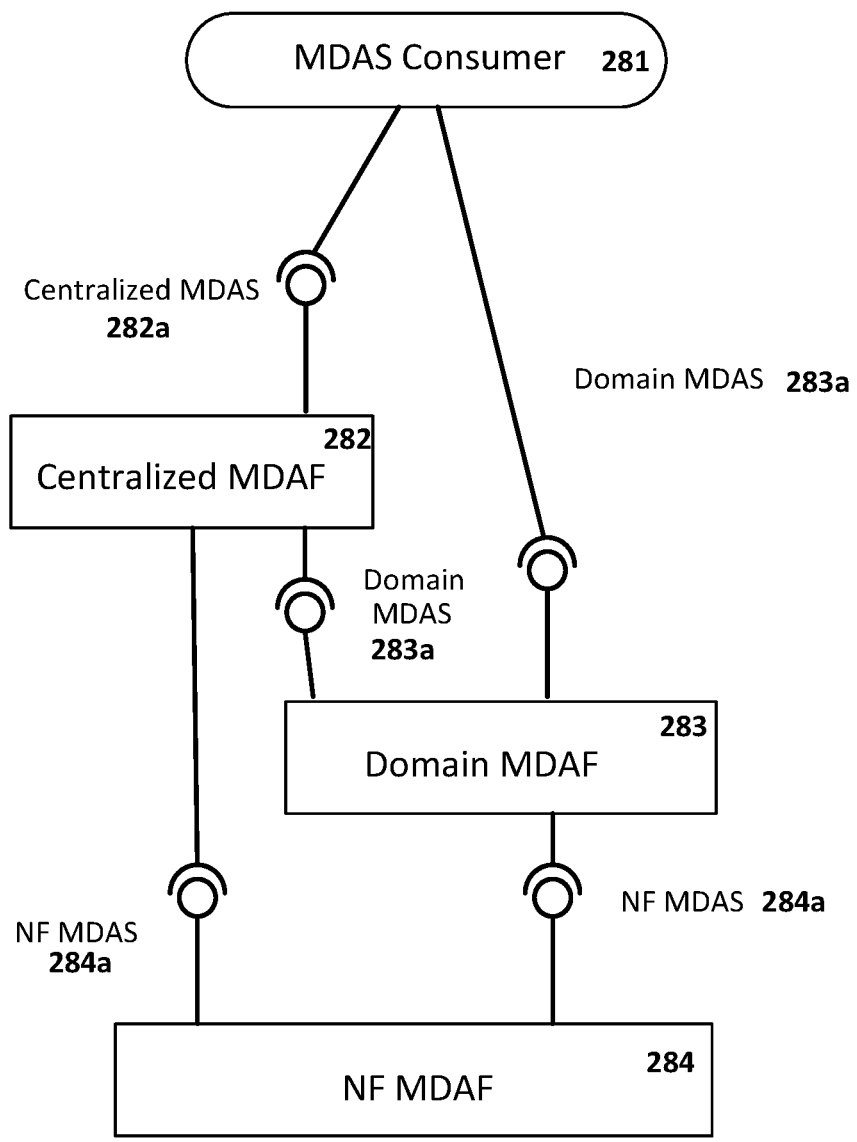
FIG. 2G is a schematic diagram illustrating another example of Management Data Analytics Service (MDAS) architecture in accordance with embodiments of the present invention.

FIG. 2G illustrates a multi-level Management Data Analytics Service (MDAS) architecture in accordance with embodiments of the present invention. MDAS provides data analytics for the network. FIG. 2G illustrates the deployment model of the MDAS at different levels. According to embodiments, MDAS can be deployed at different levels, for example, at network function (NF) level or at domain level (e.g., RAN, CN, NSSI) or in a centralized manner (e.g., in a PLMN level). An MDAS at NF-level provides NF related analytics e.g., prediction of resource usage in a predefined future time. A domain-level MDAS provides domain specific analytics, e.g., resource usage prediction in a CN or failure prediction in a NSSI, etc. A centralized MDAS can provide end-to-end or cross-domain analytics service, e.g., resource usage or failure prediction in an NSI, optimal CN node placement for ensuring lowest latency in the connected RAN, etc.

Referring to FIG. 2G illustrating MDAS deployed at different levels, the network in FIG. 2G includes the Management Data Analytics Services (MDAS) consumer 281, the Centralized Management Data Analytics Function (MDAF) 282, the Domain MDAF 283 and the NF MDAF 284. Each MDAF produces the corresponding MDAS. In FIG. 2G, the Centralized MDAF 282 produces the Centralized MDAS 282a; the Domain MDAF 283 produces Domain MDAS 283a; and the NF MDAF 284 produces NF MDAS 284a.

Each Management Data Analytics Services (MDAS) may be consumed by other network entities at different level, i.e. authorized MDAS consumers or other MDAFs. According to FIG. 2G, the NF MDAS 284a is consumed by the Domain MDAF 283 and/or the Centralized MDAF 282. The Domain MDAS 283a is consumed by the Centralized MDAF 282 and the other authorized MDAS Consumers (e.g. infrastructure manager, network manager, slice manager, slice subnet manger, other 3rd party OSS, etc.). The Centralized MDAS 282*a* is consumed by different authorized MDAS Consumers 281.

For efficient network operation and assurance of optimal network resource utilization, especially in case of the 3rd Generation Partnership Project (3GPP) network, it is important to have management network analytical Key Performance Indicators (KPIs). For this, an authorized MDAS consumer (e.g. the MDAS Consumers 281) may be allowed and required to collect management analytical KPIs for the network.

In one example, to allow the authorized MDAS consumer's collection of management analytical KPIs, there may be an authorized consumer of network management data analytics service, producer(s) of network MDAS, producer(s) of measurement task control service for NF(s) and producer(s) of performance data file reporting service for NF(s) in the deployed 3GPP network. The network MDAS producer(s) may be in operation.

The process of collecting management analytical KPIs begins when the authorized MDAS consumer subscribes to the service of management analytical KPI(s) for the network. Then, the network MDAS producer determines what performance measurements of NF(s) are needed to generate the subject network management analytical KPI(s). The MDAS producer checks whether the required network performance measurements can be collected by one or more existing measurement tasks for NF(s). If one or more new measurement tasks for the constituent NF(s) are required, the management data analytics service producer consumes the NF measurement task control service to create the new measurement task(s) for the NF(s). The creation of measurement tasks for one or more NFs may be performed in compliance with relevant standards. When the required network performance measurements can be collected by either existing measurement task(s) or the newly created measurement task(s), the MDAS producer consumes the performance data reporting related services to collect the required performance measurements for NF(s). Upon collecting the required performance measurements, the MDAS producer generates the management analytical KPI(s) based on the collected performance measurements.

In various embodiments, including those illustrated in FIGS. 2A to 2E, DAM service consumers such as Configuration Managers, Centralized DAM entities, Domain DAM entities, Local NF log and CSM, NSI/SI resources are provided. These DAM service consumers can be mapped to different 3GPP standard entities as shown in Table 1 below. For example, in some embodiments, the Configuration Manager 215 in FIGS. 2A to 2E may correspond to some 3GPP standard entities such as NSMF, NSSMF or Network Function Management Functions (NFMF) depending on the configured entity; or NSI management service provider, NSSI management service provider, NF management service provider depending on the management architecture. In some embodiments, the Centralized DAM 204 in FIGS. 2B and 2C may correspond to some 3GPP standard entities such as NSI MDAS or NSSI MDAS or a data analytics service provider for the whole public land mobile network (PLMN) run by a telecommunication operator. In some other embodiments, the Centralized DAM 204 in FIGS. 2B and 2C may also correspond to some other 3GPP standard entities such as, depending on management type, NS(S)I PM mgmt. service provider MDAS, NS(S)I FM mgmt. service provider MDAS, NS(S)I CM mgmt. service provider MDAS or NS(S)I provisioning (create, allocate, modify etc.) services provider MDAS. The domain DAM may also correspond to a data analytics service provider for a particular technological domain (e.g., RAN, CN, TN) run by an operator. Other DAM service consumers in Table 1 can be mapped to different 3GPP standard entities as described in the Table 1, similarly as above. The first column of Table 1 refers to entities described in the present description, while the second column refers to 3GPP-defined entities which may act as the corresponding entities in the first column.

TABLE 1

Actors/Consumers and corresponding 3GPP standard entities

| Actors/consumers | Corresponding 3GPP standard entities |
| --- | --- |
| Configuration Manager | Depending on the configured entity-<br>NSMF, NSSMF, NFMF;<br>depending on the mgmt. architecture-<br>NSI mgmt. service provider, NSSI mgmt. service provider, NF mgmt. service provider |
| Centralized DAM | NSI MDAS, NSSI MDAS;<br>Depending on mgmt. type-<br>NS(S)I PM mgmt. service provider MDAS,<br>NS(S)I FM mgmt. service provider MDAS,<br>NS(S)I CM mgmt. service provider MDAS,<br>NS(S)I provisioning (create, allocate, modify etc.) services provider MDAS<br>Note: PM mgmt. services producer include NS(S)I and NF measurement task service producers. |
| Domain DAM | NSSI MDAS;<br>Depending on mgmt. type-<br>NS(S)I PM mgmt. service provider MDAS,<br>NS(S)I FM mgmt. service provider MDAS,<br>NS(S)I CM mgmt. service provider MDAS,<br>NS(S)I provisioning (create, allocate, modify etc.) services provider MDAS |
| Local NF log | Database (unspecified)<br>SA2-UDM, UDR, UDSF |
| CSM | NSMF, NSSMF, CSMF;<br>NSI mgmt. service provider, NSSI mgmt. service provider;<br>depending on role-<br>NSI configuration mgmt. service consumer,<br>NSSI configuration mgmt. service consumer, |
| NSI/SI resources | Management, information and infrastructure resources |

Figure 3:
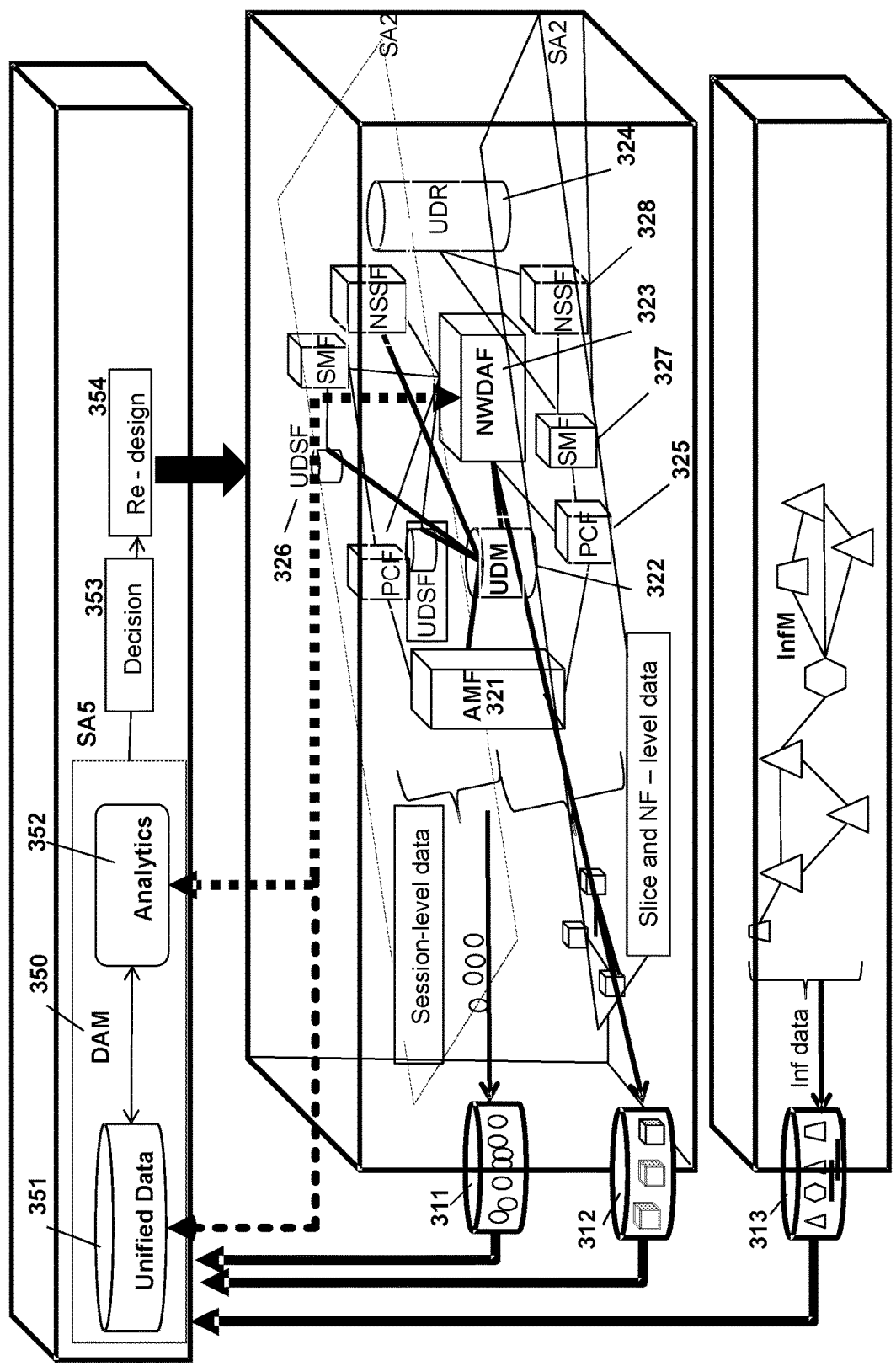
FIG. 3 is a schematic diagram illustrating a logical flow of various data between network entities/functions in a 3GPP network comprising DAM in accordance with embodiments of the present invention.

FIG. 3 illustrates an example of a network mechanism 300 for the 3GPP network comprising a DAM (e.g. DAM 350). FIG. 3 depicts logical flow of raw and analyzed data between network nodes and functions. The connections between network nodes and functions in FIG. 3 are not necessarily limited to direct physical connections. FIG. 3 illustrates a potential role of DAM in a feedback control loop implemented in a service based network. The DAM collects information from network entities, processes the information, and outputs results of the processing to a decision making entity. The decision making entity may then adjust operating parameters of the network, and the process may repeat.

Referring to FIG. 3, the network mechanism 300 may comprise service-based network system architectures for Infrastructure Management (InfM), the 3GPP-defined Service and Systems Aspects (SA) 2 and SA5.

The network system architecture for SA2 may comprise, for example, some or all of: the Access and Mobility Management function (AMF) 321, the Unified Data Management Function (UDM) 322, the Network Data Analytics Function (NWDAF) 323, the User Data Repository (UDR) 324, the Policy Control Function (PCF) 325, the Unstructured Data Storage network Function (UDSF) 326, the Service Management Function (SMF) 327 and the Network Slice Selection Function (NSSF) 328.

Each network entities/functions for the system architecture SA2 may be communicatively connected to each other as needed (e.g. as shown in FIG. 3). The communicative connections between these network entities/functions are not necessarily limited to direct physical connections.

According to embodiments, the NWDAF 323 may be responsible for providing network data analytics information upon request from network functions/entities (in SA2). For this, in some embodiments, the NWDAF 323 is directly or indirectly communicatively connected to all network functions/entities in SA2.

According to embodiments, the NWDAF 323 may also monitor the status of the load of a network slice or look at performance of different network entities. The NWDAF 323 may collect various network (raw) data from different network entities in SA2. The network data may be log data of various network entities in SA2. The collected various network (raw) data may be saved in local databases in SA2, such as the databases 311 and 312, depending on the type of data. Session level data may be stored in the database 311 and slice and NF-level data may be stored in the database 312. The collected data stored in the database 311 and 312 may be transferred to the Unified Database (DB) 351 of the DAM 350.

According to embodiments, the NWDAF 323 may receive request from one or more network functions/entities in SA2. For example, the NWDAF 323 may receive a request from the PCF 325 for network data analytics for a specific network slice. Upon receipt of such requests, the NWDAF 323 may inform other network functions/entities regarding the available data analytics services and the corresponding request message format. Further, the NWDAF 323 may send the request to the DAM 350 to obtain the network data (e.g. network data analytics results and/or raw network data) from the DAM 350. The NWDAF 323 may receive network information from the Unified DB 351 and/or the Analytics component 352 of the DAM 350. The network data may be raw network data, network data analytics information or combination of the two. Upon receipt of the network information from the DAM 350, the DAM 350 may provide network data analytics service(s) to the network entities/functions (i.e. consumer). In some embodiments, the DAM 350 may simply deliver the received network information to the consumer network entities/functions. In some embodiments, the DAM 350 may perform further network data analysis based on the information received from the DAM 350.

According to embodiments, the Infrastructure network system may comprise various network functions/entities. Each network entities/functions for the Infrastructure network system may be communicatively connected to each other as needed (e.g. as shown in FIG. 3). The communicative connections between these network entities/functions may not be limited to direct physical connections.

The infrastructure level data may be collected from these network functions/entities and may be saved at local databases such as the database 313. The data saved at the database 313 may be log data of the infrastructure network entities. The collected data stored in the database 313 may be conveyed to the Unified DB 351 of the DAM 350.

According to embodiments, the network system architecture for SA5 may comprise the DAM 350 and network entities for decision and re-design for SA2 (e.g. the decision entity 353 and the Re-design entity 354, respectively). Each network entities/functions for SA5 may be communicatively connected to each other as needed (e.g. as shown in FIG. 3). The DAM 350 may be communicatively connected to the NWDAF 323 to provide consolidated data in the Unified DB 351 and/or the data analytics information requested by the NWDAF 323. The communicative connections between these network entities/functions are not necessarily limited to direct physical connections. The DAM 350 may comprise one or more databases (e.g. the Unified DB 351) that unify various data collected from network entities. The DAM 350 may further comprise one or more components (e.g. the Analytics component 352) that analyze collected network data to produce the data analytics information.

According to embodiments, the DAM 350 may collect data (e.g. raw data) from various network entities. The DAM 350 may collect infrastructure data from InfM entities and session-level data and slice and NF-level data from network entities in SA2 (e.g. UDM 322). In some embodiments, the DAM 350 does not necessarily directly receive network data from InfM entities or network entities in SA2 (e.g. UDM 322) but may retrieve information from databases storing various network data. For example, according to some embodiments, the database 311 may store session-level data; database 312 may store slice and NF-level data; database 313 may store infrastructure related data; and data stored in each database may be transferred and consolidated into the Unified DB 351 of the DAM 350. The data stored in the Unified DB 351 would be used by the Analytics component 352 of the DAM 350 to produce data analytics information. The Analytics component 352 may retrieve and process data according to predetermined processing routines, for example configured into the Analytics component during configuration of the DAM by a configuration manager.

The Unified DB 351 and the Analytics component 352 may be communicatively connected with the NWDAF 323. The Analytics component 352 may perform analytic functions using data stored in the Unified DB 351 may produce data analytics information (e.g. feedback) that will satisfy the request from the requester (e.g. the NWDAF 323).

According to embodiments, the decision entity (e.g., InfM, CSM, CFM) 353 may make dynamic network operation decisions, management decisions, or both, based on various network data analytics information generated by the DAM 350. The decision may be related to as to whether any re-design of (physical and/or virtual) network system architecture (e.g. reallocation of network resources) is required. Based on the network operation and/or management decisions, the Re-design entity 354 may generate feedbacks regarding the current network system architecture, for example how (limited) network resources may be allocated between different network management entities. The generated feedbacks regarding the current network system architecture may be provided to different network entities in SA2 directly or indirectly through the NWDAF 323. Re-design may comprise resource re-allocation, adjustments affecting traffic engineering, admission control, policy implementation, etc.

According to embodiments, a network may include a configuration manager that configures the DAM for InfM related analytics, CSM related analytics and CFM related analytics, as shown in FIGS. 2A to 2E. The configuration manager may configure the DAM for InfM, CSM and CFM in terms of the infrastructure type, resources detail in a particular infrastructure domain, log/database location information for both raw and analyzed data, analysis algorithms to be performed on the specified data, output format of the analysis and the response mode for the analyzed data. The configuration manager may specify details of information required to configure the DAM for providing analyzed service for InfM, CSM and CFM. The configuration manager passes configuration details through a configuration interface (between the configuration manager and the DAM). The configuration interface may refer to a communication link between the DAM and other entities such as the configuration manager, or possibly the InfM, CSM, or CFM.

Messages transmitted through the configuration interface may be formatted according to a certain specification. The specification indicates what configuration information is to be transmitted to the DAMs to enable the DAM to provide certain analytics output. The specification may include types of information, type of algorithms, types of statistic and type of responses output the DAM can provide. The configuration manager can transmit messages that are formatted according to the configuration interface specification.

In some embodiments, the configuration manager may configure DAM entities using several configuration parameters such as the infrastructure type ID or service type ID, the resource ID, the log or database ID, the analysis type ID, the statistics type ID and the response mode ID. The infrastructure type ID and the service type ID identify the domain and/or the type of network service (e.g. whether the service is for NSI or SI). According to embodiments, the resource ID identifies network components; the log or database ID identifies database in the network; the analysis type ID indicates the methodology or algorithm used for data analysis; the statistics type ID specifies analysis output type; and the response mode ID specifies mode of response in time (e.g. when the consumer wants the result, how frequently the consumer wants the result, and/or under what condition the consumer wants the result). Here, ID specifies a type of the aforementioned parameters.

In some embodiments, the configuration details may be specified by the configuration manager with respect to the following information: an identification of one or more of network slices; an identification of one or more network devices supporting one or more of the network slices; an aspect of the one or more of network slices for which operating information (e.g. network operating information, for example associated with the network slice) is to be obtained; an analysis (e.g. a type of analysis) to be performed by the processing operations; and a response mode indicative of conditions under which the results of the processing operations are to be transmitted toward the one or more network slice management devices.

In various embodiments, in the case of configuring the DAM for infrastructure related analytics (for supporting the InfM), the configuration manager may provide the DAM with configuration information so that the DAM can perform some or all of the following functions:
  i. Configure log and analytics (location id of log, information id, log mode, reporting mode);
  ii. Configure processing routines to analyze periodic performance monitoring of infrastructure network (DC, MEC, DC link, access link, spectrum allocation, etc.);
  iii. Configure processing routines to analyze periodic monitoring of infrastructure available/remaining resources (DC, MEC, DC link, access link, spectrum allocation, etc.);
  iv. Configure processing routines to analyze periodic analysis of infra. resource utilization;
  v. Configure processing routines to analyze optimal infra modification (e.g., turn on/off BSs, wireless BH configuration, etc.); and/or
  vi. Configure processing routines for relevant analysis and prediction.

In various embodiments, in the case of configuring the DAM for CSM related analytics, the configuration manager may provide the DAM with configuration information so that the DAM can perform some or all of the following functions:
  i. Configure the slice instance information (NSI ID, SI ID, device ID, customer ID, application ID, received signal strength at user equipment (UE), interference statistics, self-interference for full duplex (FD) wireless networks, UE mobility statistics, etc.), log location id, log data type, log period, reporting mode etc.;
  ii. Configure processing routines to analyze NSI resource utilization;
  iii. Configure processing routines to analyze slice traffic load variation with time and geographic location;
  iv. Configure processing routines to analyze slice QoS (for slice and service performance assurance);
  v. Configure processing routines to analyze required NSI resource modification;
  vi. Configure processing routines to analyze per SI performance;
  vii. Configure processing routines to analyze per user performance;
  viii. Configure processing routines to analyze multi-level (e.g., per NSI, SI, user) charging; and/or
  ix. Configure processing routines to perform relevant analysis and prediction.

In various embodiments, in the case of configuring the DAM for CFM related analytics, the configuration manager may provide the DAM with configuration information so that the DAM can perform some or all of the following functions:
  i. Configure the slice instance information (NSI ID, SI ID, device ID, customer ID, application ID, etc.), log location id, log data type, log period, reporting mode etc.;
  ii. Configure processing routines to analyze probability of content request by users of different NSIs; and/or
  iii. Configure processing routines for predicting probability of content.

Table 2 specifies what configuration information may be transmitted from the configuration manager to the DAMs (e.g. DAMs for InfM, CSM and/or CFM) to enable the DAM to provide certain analytics output. Table 2 is indicative of the configuration interface specification, in that it specifies the configuration information to be transmitted to the DAMs. As illustrated in the table, the configuration manager may specify the type of infrastructure/service, location of resources, the location of log or database, the type of analysis, the type of statistic and the type/mode of response output (i.e. the response that the DAM will provide) through a configuration interface (e.g. the communication link between the DAM and other entities). In case the configuration manager configures DAM entities for InfM (i.e. when the consumer is InfM), the configuration manager may configure the DAM entities for InfM with infrastructure management specific data analytics information. For example, the configuration manager may configure the DAM entities with the infrastructure type ID that identifies (network) domain. The infrastructure type ID may specify whether the network is a radio access network (RAN), core network (CN), transport network (TN) or a combination of the RAN, CN and TN. The configuration manager may also configure the DAM entities with the resource ID that specifies location of the infrastructure(s). (E.g. location of data center (DC), mobile edge computing (MEC) platform, intra and inter-DC link bandwidth (BW), base stations (BSs), etc.) or location of device(s) (e.g. DC and MEC geographical location or regional ID, BSs' ID, etc.). Other information in the Table 2 may be understood in a similar manner as aforementioned.

Based on all the above-mentioned configuration information, the DAM(s) analyzes the mobility pattern of the UE(s) in the NSI which can be computed by analyzing the tracking

TABLE 2

Specification for DAM configuration

| CONSUMER | INFRA-TYPE/ SERVICE-TYPE ID | RESOURCE ID | LOG/DB ID | ANALYSIS TYPE ID | STATISTICS TYPE ID | RESPONSE MODE ID |
|---|---|---|---|---|---|---|
| InfM | RAN; CN; TN; Combination of RAN, CN and TN | Location ID; Device ID | Location ID (for raw data and analyzed result); Log data type; Log mode | Available resources; Resource utilization; Periodic monitoring; Resource activity status/statistics; Optimal infra. Resource modification | Average/Mean; Maximum; Minimum; Sigma; Customized | Request-Response (on-demand); Subscribe-notify (periodical); Threshold-based alarm; |
| CSM | NSI; SI | Location ID; Device ID; NSI ID; SI ID; Customer ID; Application ID; Received signal strength at user equipment (UE); Interference statistics; Self-interference for full duplex (FD) wireless networks; UE mobility statistics | Location ID (for raw data and analyzed result); Log data type; Log mode | NSI resource utilization; NSI QoS; SI QoS; User QoS; NSI packet count; SI packet count; Application packet count; User packet count | Average/Mean; Maximum; Minimum; Sigma; Customized | Request-Response (on-demand); Subscribe-notify (periodical); Threshold-based alarm; |
| CFM | NSI; SI | Location ID; Device ID; NSI ID; SI ID; Customer ID Application ID; Content ID; Content cache ID | Location ID (for raw data and analyzed result); Log data type; Log mode | Probability of content request in NSIs; Probability of content request in SIs; Probability of content request by users in NSI; Content provisioning delay; Content miss probability in NSIs | Average/Mean; Maximum; Minimum; Sigma; Customized | Request-Response (on-demand); Subscribe-notify (periodical); Threshold-based alarm |

As an illustration of how the (centralized and/or domain-specific) DAM configuration specification can be leveraged for producing a particular communication network analytics, the case of configuring the DAM(s) for analyzing the optimal placement of content cache for UE(s) in an NSI can be considered. The configuration manager, through the configuration interface, configures the NSI ID for which the analysis is required. It also configures the NSI constituent detail, for example, its location ID(s) of the NSI deployment area, communication device ID(s) belonging to the NSI, ID of the UE(s) served by the NSI, link capacity/bandwidth among the different devices in the NSI, signal strength of the communication links among the UE(s) and the device (serving node) they are connected to, the location of the log/database where the context information of the UE(s) and usage status information of the communication devices (if any) is stored, the location of the log/database where the analyzed output should be stored, the statistics type of the output and the response mode for the analyzed data.

area (the geographical areas where the presence of the UE(s) are detected) updates of the UE(s). The DAM(s) also analyzes the most popular (i.e., mostly demanded) contents requested in the NSI and also the popular content requested by each UE served by the NSI. Using the above mentioned analysis information, the DAM can compute the probability of content requests by UE(s) for a particular geographical location. Also, the DAM can compute the optimal placement strategy of content cache at different parts of the NSI, so that, it optimizes the NSI bandwidth capacity, minimizes the content delivery delay to the UE(s). The DAM then sends this analysis result to its consumer, e.g., a CFM. Based on the analysis, the CFM can take decision on placement of contents in the NSI.

Figure 4A:
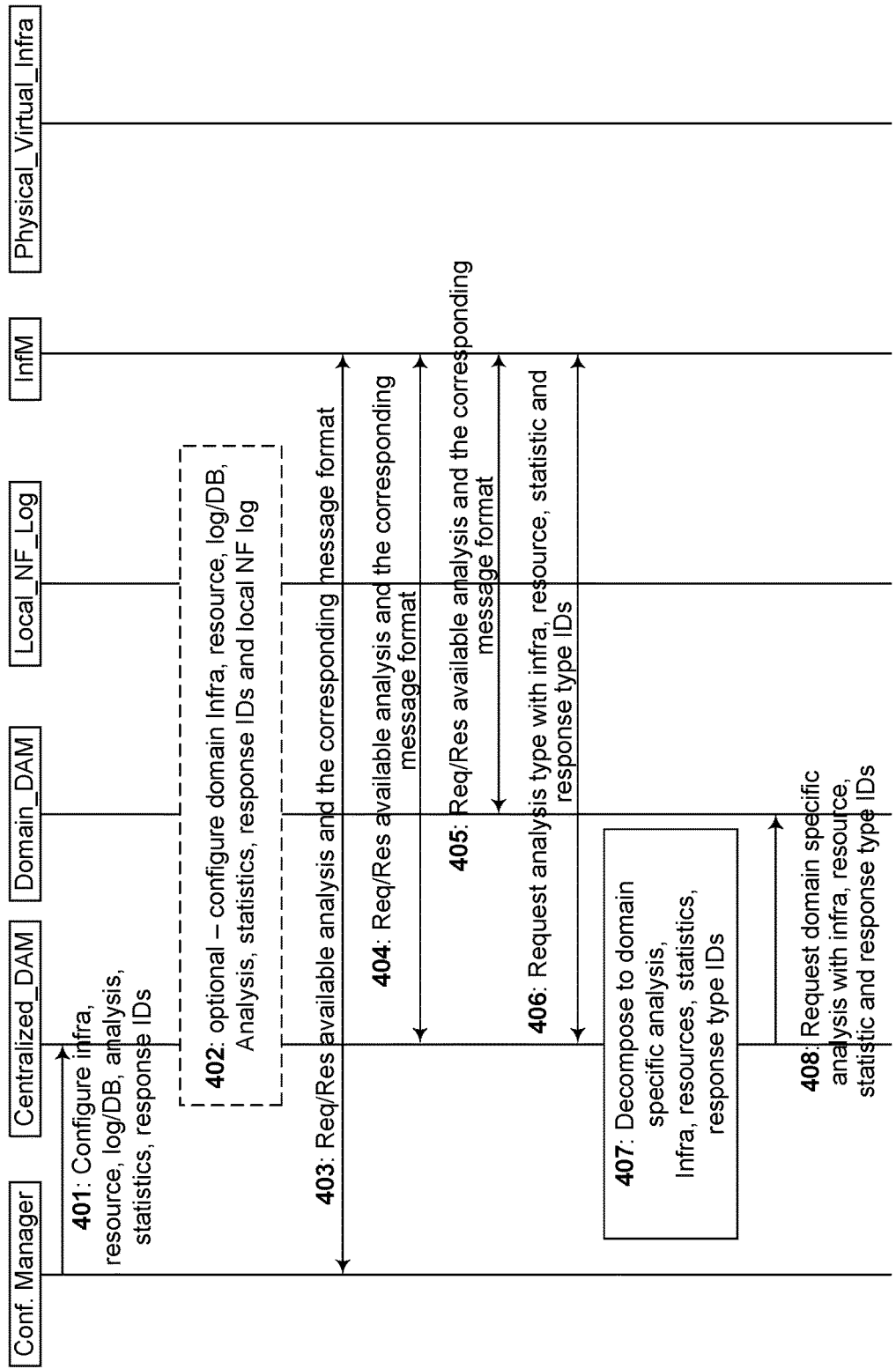
FIGS. 4A and 4B show a flow diagram illustrating a method of DAM configuration for infrastructure management (InfM) in accordance with embodiments of the present invention.
Figure 4B:
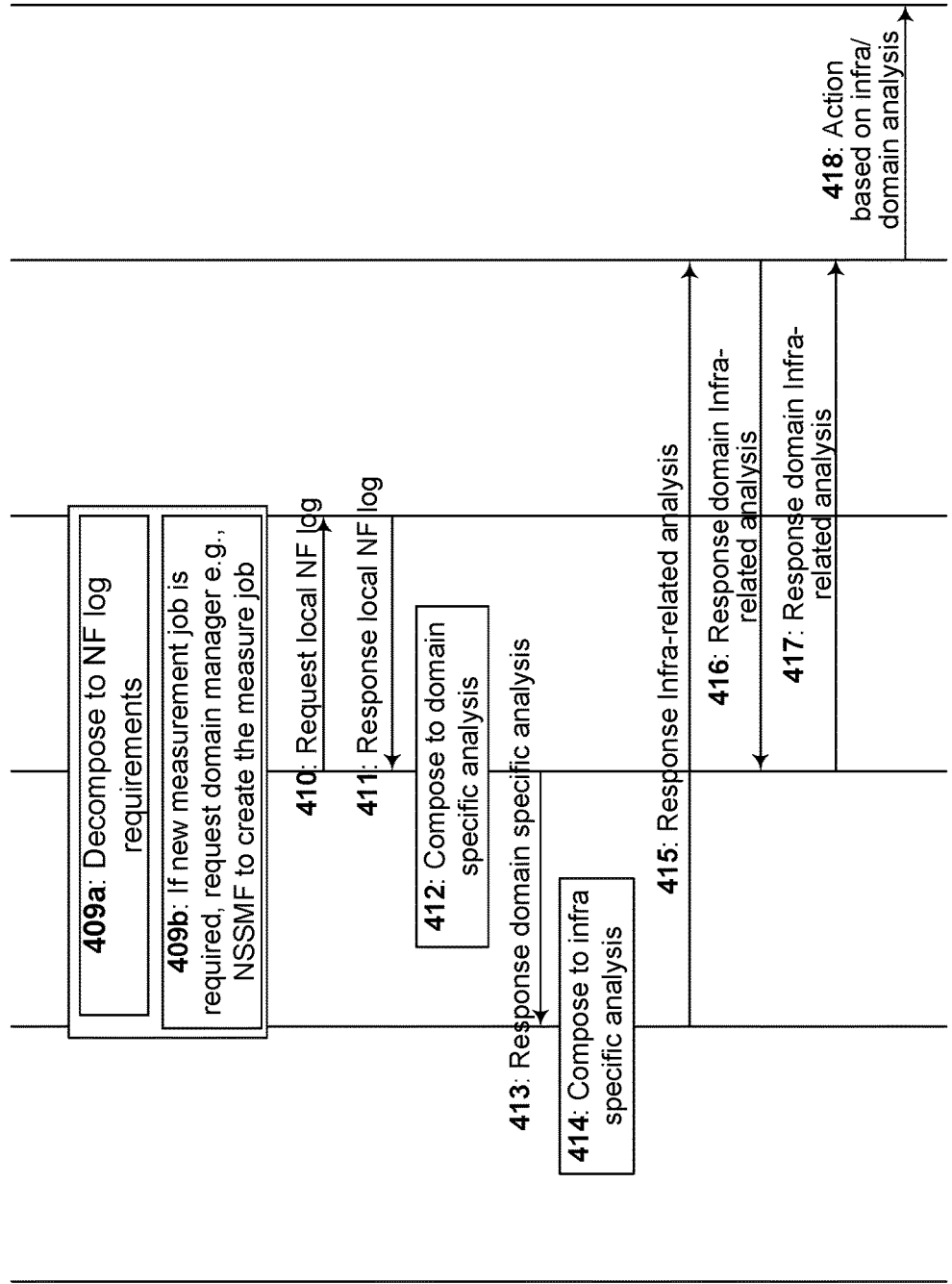

FIG. 4 illustrates a method of DAM configuration for supporting infrastructure management (InfM). The configuration procedure for infrastructure management gives detail of information exchange required among different entities for providing DAM service to the InfM. The method includes at step 401 that a configuration manager (CM; e.g. SONAC-Com) configures the centralized DAM entity with the infrastructure management specific data analytics details. The configuration parameters include the infrastructure type ID, the resource ID, the log or database ID, the analysis type ID, the statistics type ID and the response mode ID.

The infrastructure type ID identifies the domain. The infrastructure type ID may specify whether the network is a radio access network (RAN), core network (CN), transport network (TN) or a combination of the RAN, CN and TN.

The resource ID identifies the network components. The resource ID may specify location of the infrastructure(s) (e.g. location of data center (DC), mobile edge computing (MEC) platform, intra and inter-DC link bandwidth (BW), base stations (BSs), etc.) or location of device(s) (e.g. DC and MEC geographical location or regional ID, BSs' ID, etc.)

The log or database ID identifies the log or database in the network. The log or database ID may specify location of the log or database that a particular data/record is to be saved as well as location of the raw data and/or the analyzed results. The log or database ID also may demonstrate the log data type and/or the log mode (i.e. where to put the analyzed data and how to store them) of the particular log or database.

The analysis type ID indicates the methodology or algorithm used for the data analysis. The analysis type ID may specify the kind of analysis required on the specified infrastructure resources. For example, the kind of analysis required may be:
  i. determining available resources for: data center (DC), mobile edge computing (MEC) platform, intra and inter-DC link bandwidth (BW), transport network (TN) bandwidth, spectrum availability in particular geographic location at particular time period, etc.;
  ii. analyzing resource utilization for: data center (DC), mobile edge computing (MEC) platform, intra and inter-DC link bandwidth (BW), transport network (TN) bandwidth, spectrum in particular geographic location at particular time period, etc.
  iii. periodic monitoring of: available/remaining resource for data center (DC), mobile edge computing (MEC) platform, intra and inter-DC link bandwidth (BW), transport network (TN) bandwidth, spectrum availability in particular geographic location at particular time period, etc.; and/or
  iv. analysis of optimal infra modification/management: turn on/off base stations (BSs), wireless backhaul (BH) reconfiguration, virtual machine (VM) migration, on demand integration of private DC or wireless (e.g. WiFi) hotspots, etc.

The statistics type ID may indicate the desired type of data analysis output. The statistics type ID may demonstrate the kind of statistics needed on the analysis results. The needed statistics may be average/mean; maximum; minimum; sigma (i.e. standard deviation) and/or any other customized statistics.

The response mode ID may specify mode of response in time, for example when the consumer (network management device) wants the result, how frequently the consumer wants the result, and/or under what condition the consumer wants the result. The response mode ID may include different kinds of response modes such as 'on demand', 'subscribe-notify' and 'threshold-based alarm'. The 'on demand' mode may represent a request-based response mode. In the 'on demand' mode, the DAM may provide an analysis whenever it receives a corresponding request from the InfM. The 'subscribe-notify' mode may represent a subscription-based response mode. In the 'subscribe-notify' mode, the DAM may provide periodical analysis results as specified by the InfM. The 'threshold-based alarm' mode may represent a threshold-based response mode. The 'threshold-based alarm' mode, the DAM may continuously perform the specified analysis and monitor the analysis output. If the output crosses a certain threshold it may send an alarm to the InfM.

The method further includes at step 402 that the centralized DAM may optionally configure the domain-specific DAMs with the corresponding data analytics results as specified in the step 401. The domain-specific DAMs may be also configured by the configuration manager. The centralized DAM may additionally configure other network entities.

At step 403, the CM informs the InfM regarding the available data analytics services and the corresponding request message format. At step 404, the centralized DAM also may inform the InfM regarding the available data analytics services and the corresponding request message format. At step 405, the domain DAMs also may inform the InfM regarding the available data analytics services and the corresponding request message format. One, some or all of steps 403, 404, 405 may be performed.

At step 406, the InfM requests the centralized DAM for a specific resource analysis. In the request, the InfM specifies the resource ID, desired statistics ID and the response type ID. At step 407, the centralized DAM may decompose the requested analysis ID to its analysis type IDs of the constituent infrastructure domains.

At step 408, the centralized DAM sends the decomposed analysis requests to the corresponding domain DAMs. The request includes domain infrastructure ID, resource ID, Log/DB ID, analysis type ID, statistics type ID and response type ID. At step 409*a*, the domain DAM decomposes the request to determine the log requirements from the constituent NFs. At step 509*b*, if a new measurement job is required, the DAM requests the corresponding domain manager (e.g., RAN, CN NSSMF, TN manager) to create the measurement job.

At step 410, the domain DAM request local logs from the corresponding NFs. At step 411, the NFs responses with the log detail. The NF log may be either local to the NF or it may be stored in a separate location. Domain DAM is aware of the NF log distribution model and collects the log information accordingly. After collecting all the constituent NFs' log, at step 412, the domain DAM performs the domain-specific analysis via computation. At step 413, the domain DAM then sends the domain-specific analysis to the centralized DAM.

At step 414, the centralized DAM received all the domain-specific analysis and composes the infrastructure-specific analysis. At step 415, the centralized DAM sends the infrastructure-specific analysis to the InfM. At step 416, InfM may also request domain-specific analysis from the domain DAMs directly. At step 417, the domain DAM calculates the analysis as specified in steps 406, 407, 408 and 409. It then sends the analyzed result to the InfM according to the response ID specified in the analysis request.

The method further includes at step 418 that the InfM may take appropriate actions on the physical and virtual infrastructure based on the received analysis result from the DAMs. Some examples of the actions that the InfM can take include resource scaling, network slice admission control, scalability prediction of physical and virtual resources and infrastructure fault recovery. The resource scaling may include scaling VM resources (e.g. CPU, Memory, BW), Uplink/Downlink (UL/DL) spectrum and/or TN BW.

Figure 5B:
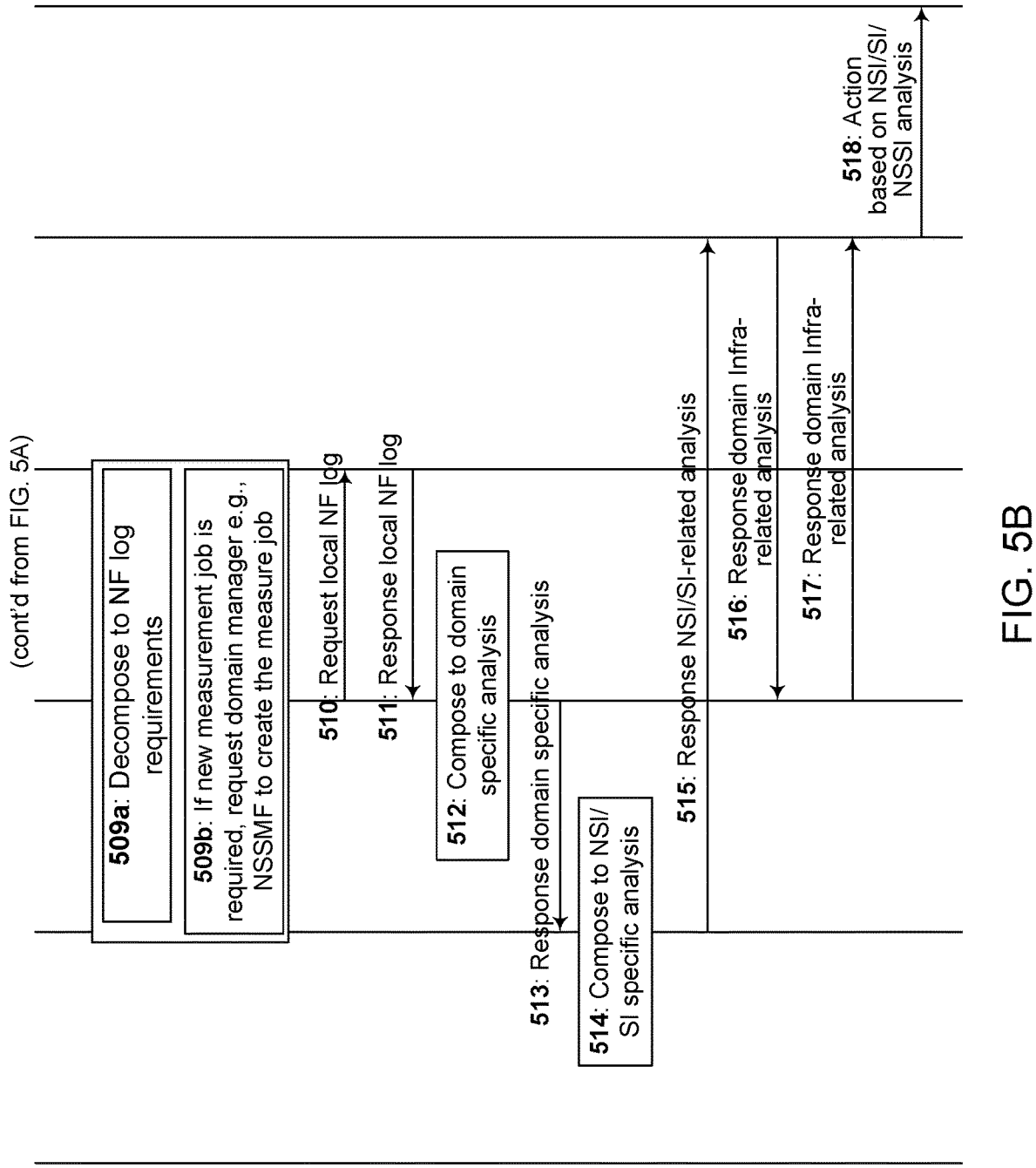

FIG. 5 illustrates a method of DAM configuration for customer service management (CSM). The configuration procedure for customer services (e.g., NSI, NSSI, SI) management gives detail of information exchange required among different entities for providing analyzed service for CSM. The method includes at step 501 that a configuration manager (CM; e.g. SONAC-Com) configures the centralized DAM entity with the customer service management specific data analytics details. The configuration parameters include the service type ID, the resource ID, the log or database ID, the analysis type ID, the statistics type ID and the response mode ID.

The service type ID identifies the type of service. The service type ID may demonstrate whether the service is for NSI or SI.

The resource ID identifies the network components. The resource ID may specify location(s) of resource(s). The resource ID may demonstrate location of the customer service (e.g. location of data center (DC), mobile edge computing (MEC) platform, intra and inter-DC link bandwidth (BW), base stations (BSs), etc.), location of device(s) (e.g. DC and MEC geographical location or regional ID, BSs' ID, etc.), location of NSI, location of SI and/or location of Application (in case that the data is those of an application). The resource ID may also specify received signal strength at user equipment (UE), interference statistics, self-interference for full duplex (FD) wireless networks, UE mobility statistics, and etc.

The log or database ID identifies the log or database in the network. The log or database ID may specify location of the log or database that a particular data/record is to be saved as well as location of the raw data and/or the analyzed results. CSM may indicate raw data stored in database and request to do analysis of the raw data. For example, CSM may request to perform mobile location prediction using historic location tracking data from entities like AMF (Access and Mobility Management Function) or may request to execute Access MAP (aMAP) tracking area (TA) field computation by using historic TA data from aMAP manager.

The log or database ID also may also demonstrate the log data type and/or the log mode (i.e. where to put the analyzed data and/or the storage of the particular log or database.

The analysis type ID indicates the methodology or algorithm used for the data analysis. The analysis type ID may specify the kind of analysis required on the specified NSI and/or SI. For example, the kind of analysis required may be:
 i. NSI resource utilization analysis: resource utilization for the constituent RAN, CN, TN NSSIs;
 ii. Periodic monitoring of NSI: available or remaining resources for RAN, CN, TN NSSIs;
 iii. NSI QoS analysis: for example, NSI loading information, delays that packets encounter in the NSI, throughput of NSI, etc.;
 iv. SI QoS analysis: SI loading information, delays that packets encounter belonging to the SI, throughput of the SI, etc.;
 v. NSI packet count;
 vi. SI packet count;
 vii. Application packet count; and/or
 viii. Per user packet count.

The statistics type ID may indicate the desired type of data analysis output. The statistics type ID may demonstrate the kind of statistics needed on the analysis results. The needed statistics may be average/mean; maximum; minimum; sigma (i.e. standard deviation) and/or any other customized statistics.

The response mode ID may specify mode of response in time, for example when the consumer wants the result, how frequently the consumer wants the result, and/or under what condition the consumer wants the result. The response mode ID may include different kinds of response modes such as 'on demand', 'subscribe-notify' and 'threshold-based alarm'. The 'on demand' mode may represent a request-based response mode. In the 'on demand' mode, the DAM may provide an analysis whenever it receives a corresponding request from the CSM. The 'subscribe-notify' mode may represent a subscription-based response mode. In the 'subscribe-notify' mode, the DAM may provide periodical analysis results as specified by the CSM. The 'threshold-based alarm' mode may represent a threshold-based response mode. The 'threshold-based alarm' mode, the DAM may continuously perform the specified analysis and monitor the analysis output. If the output crosses a certain threshold it may send an alarm to the CSM.

The method further includes at step 502 that the centralized DAM may optionally configure the domain-specific (NSSI/SI) DAMs with the corresponding data analytics results as specified in the step 501. The domain-specific DAMs may be also configured by the configuration manager. The centralized DAM may additionally configure other network entities.

At step 503, the CM informs the CSM regarding the available data analytics services and the corresponding request message format. At step 504, the centralized DAM also may inform the CSM regarding the available data analytics services and the corresponding request message format. At step 505, the domain DAMs also may inform the CSM regarding the available data analytics services and the corresponding request message format.

At step 506, the CSM requests the centralized DAM for a specific resource analysis. In the request it specifies the NSI/SI ID, desired statistics ID and the response type ID. At step 507, the centralized DAM may decompose the requested analysis ID to its analysis type IDs of the constituent NSSI domains.

At step 508, the centralized DAM sends the decomposed analysis requests to the corresponding domain DAMs. The request includes domain (NSSI) ID, resource ID, Log/DB ID, analysis type ID, statistics type ID and response type ID. At step 509*a*, the domain DAM decomposes the request to determine the log requirements from the constituent NFs. At step 509*b*, if new measurement job is required, the DAM requests the corresponding domain manager (e.g., RAN, CN NSSMF, TN manager) to create the measurement job.

At step 510, the domain DAM request local logs from the corresponding NFs. At step 511, the NFs responses with the log detail. The NF log may be either local to the NF or it may be stored in a separate location. Domain DAM is aware of the NF log distribution model and collects the log information accordingly. After collecting all the constituent NFs' log, at step 512, the domain DAM computes the domain-specific analysis. At step 513, the domain DAM then sends the domain-specific analysis to the centralized DAM.

At step 514, the centralized DAM has received all the domain-specific analysis and composes the NSI/SI-specific analysis. At step 515, the centralized DAM sends the NSI/SI-specific analysis to the CSM. At step 516, CSM may also request domain-specific analysis from the domain DAMs directly. At step 517, the domain DAM calculates the analysis as specified in steps 506, 507, 508 and 509. It then sends the analyzed result to the CSM according to the response ID specified in the analysis request.

The method further includes at step 518 that the CSM can take appropriate action on the NSI/SI based on the received analysis result from the DAMs. Some examples of the actions that the CSM can take include:
  a. Slice provisioning/admission control;
  b. Slice modification/re-design;
  c. Mobility management in a NSI;
  d. Mobility management for users belonging to a SI;
  e. Cross-PLMN mobility analysis;
  f. Traffic steering/load balancing in a NSI;
  g. Traffic steering/load balancing in a SI;
  h. Slice-specific performance assurance;
  i. QoS analysis: for example loading, delay, throughput analysis in NSIs, SIs; and/or
  j. Fault recovery handling for NSIs and SIs.

Figure 6B:
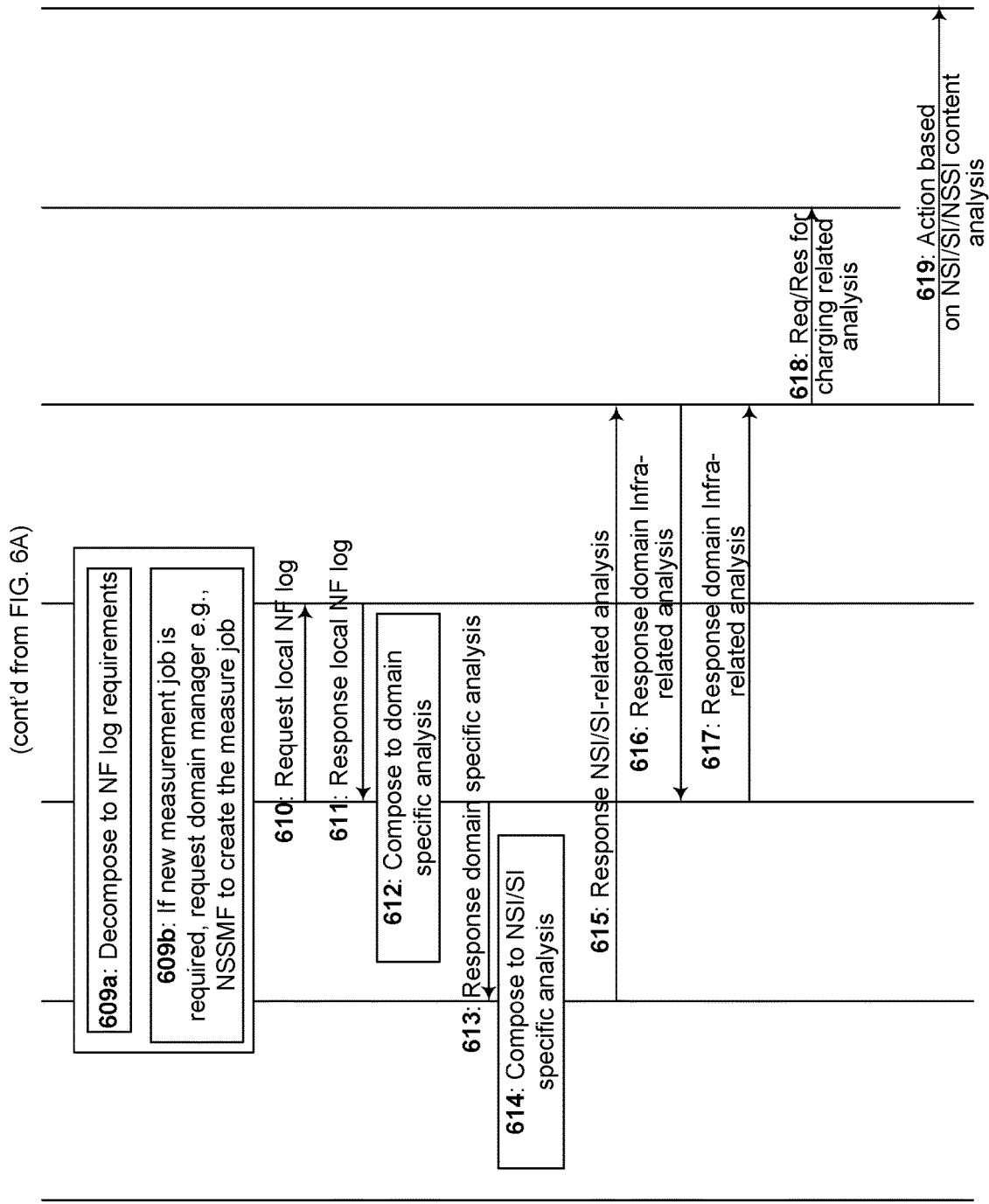

FIG. 6 illustrates a method of DAM configuration for content and forwarding service management (CFM). The configuration procedure for content and content cache management gives detail of information exchange required among different entities for providing content related analysis service for CFM and CSM. The method includes at step 601 that a configuration manager (CM; e.g. SONAC-Com) configures the centralized DAM entity with the content and forwarding service management specific data analytics details. The configuration parameters include the service type ID, the resource ID, the log or database ID, the analysis type ID, the statistics type ID and the response mode ID.

The service type ID identifies the type of service. The service type ID may specify whether the service is for NSI or SI.

The resource ID identifies the network components. The resource ID may specify location(s) of resource(s). The resource ID may demonstrate location of the content and forwarding service (e.g. location of data center (DC), mobile edge computing (MEC) platform, intra and inter-DC link bandwidth (BW), base stations (BSs), etc.), location of device(s) (e.g. DC and MEC geographical location or regional ID, BSs' ID, etc.), location of NSI, location of SI, location of Application (in case that the data is those of an application), location of content and/or location of content cache.

The log or database ID identifies the log or database in the network. The log or database ID may specify location of the log or database that a particular data/record is to be saved as well as location of the raw data and/or the analyzed results. The log or database ID also may also demonstrate the log data type and/or the log mode (i.e. where to put the analyzed data and how to store them) of the particular log or database.

The analysis type ID indicates the methodology or algorithm used for the data analysis. The analysis type ID may specify the kind of analysis required on the specified NSI/SI. For example, the kind of analysis required may provide:
  i. probability of content request in NSIs;
  ii. probability of content request in SIs;
  iii. probability of content request by a user;
  iv. content provisioning delay;
  v. probability content cache miss in NSIs;
  vi. probability content cache miss in SIs; and/or
  vii. probability content cache miss by a user.

The statistics type ID may indicate the desired type of data analysis output. The statistics type ID may demonstrate the kind of statistics needed on the analysis results. The needed statistics may be average/mean; maximum; minimum; sigma (i.e. standard deviation) and/or any other customized statistics.

The response mode ID may specify mode of response in time, for example when the consumer wants the result, how frequently the consumer wants the result, and/or under what condition the consumer wants the result. The response mode ID may include different kinds of response modes such as 'on demand', 'subscribe-notify' and 'threshold-based alarm'. The 'on demand' mode may represent a request-based response mode. In the 'on demand' mode, the DAM may provide an analysis whenever it receives a corresponding request from the CFM. The 'subscribe-notify' mode may represent a subscription-based response mode. In the 'subscribe-notify' mode, the DAM may provide periodical analysis results as specified by the CFM. The 'threshold-based alarm' mode may represent a threshold-based response mode. The 'threshold-based alarm' mode, the DAM may continuously perform the specified analysis and monitor the analysis output. If the output crosses a certain threshold it may send an alarm to the CFM.

The method further includes at step 602 that the centralized DAM may optionally configure the domain-specific (NSSI/SI) DAMs with the corresponding data analytics results as specified in the step 601. The domain-specific DAMs may be also configured by the configuration manager. The centralized DAM may additionally configure other network entities.

At step 603, the CM informs the CFM regarding the available data analytics services and the corresponding request message format. At step 604, the centralized DAM also may inform the CFM regarding the available data analytics services and the corresponding request message format. At step 605, the domain DAMs also may inform the CFM regarding the available data analytics services and the corresponding request message format.

At step 606, the CFM requests the centralized DAM for a specific content analysis. In the request it specifies the NSI/SI ID, content ID, content cache ID, desired statistics ID and the response type ID. At step 607, the centralized DAM may decompose the requested content analysis ID to its analysis type IDs of the constituent NSSI domains.

At step 608, the centralized DAM sends the decomposed analysis requests to the corresponding domain DAMs. The request includes domain (NSSI) ID, resource ID, content ID, content cache ID, Log/DB ID, analysis type ID, statistics type ID and response type ID. At step 609*a*, the domain DAM decomposes the request to determine the log requirements from the constituent NFs. At step 609*b*, if new measurement job is required, the DAM requests the corresponding domain manager (e.g., RAN, CN NSSMF, TN manager) to create the measurement job.

At step 610, the domain DAM request local logs from the corresponding NFs. At step 611, the NFs responses with the log detail. The NF log may be either local to the NF or it may be stored in a separate location. Domain DAM is aware of the NF log distribution model and collects the log information accordingly. After collecting all the constituent NFs' log, at step 612, the domain DAM computes the domain-specific analysis. At step 613, the domain DAM then sends the domain-specific analysis to the centralized DAM.

At step 614, the centralized DAM received all the domain-specific analysis and composes the NSI/SI-specific analysis. At step 615, the centralized DAM sends the NSI/SI-specific analysis to the CFM. At step 616, the CFM can also request domain-specific analysis from the domain DAMs directly. At step 617, the domain DAM calculates the analysis as specified in steps 606, 607, 608 and 609. It then sends the analyzed result to the CFM according to the response ID specified in the analysis request. At step 618, CSM can request CFM for analytical services required for charging related analysis.

The method further includes at step 619 that the CFM can take appropriate actions on the content cache resources based on the received analysis result from the DAMs. Some examples of the actions that the CFM can take include:
 i. instantiating new content cache for a NSI, SI or a user(s);
 ii. migrating existing content cache for a NSI, SI or a user(s);
 iii. proactive content prediction and cashing for NSI and/or SI;
 iv. placement of content cashes on predicted user mobility; and/or
 v. optimal content cache placement for performance assurance of applications.

Figure 7:
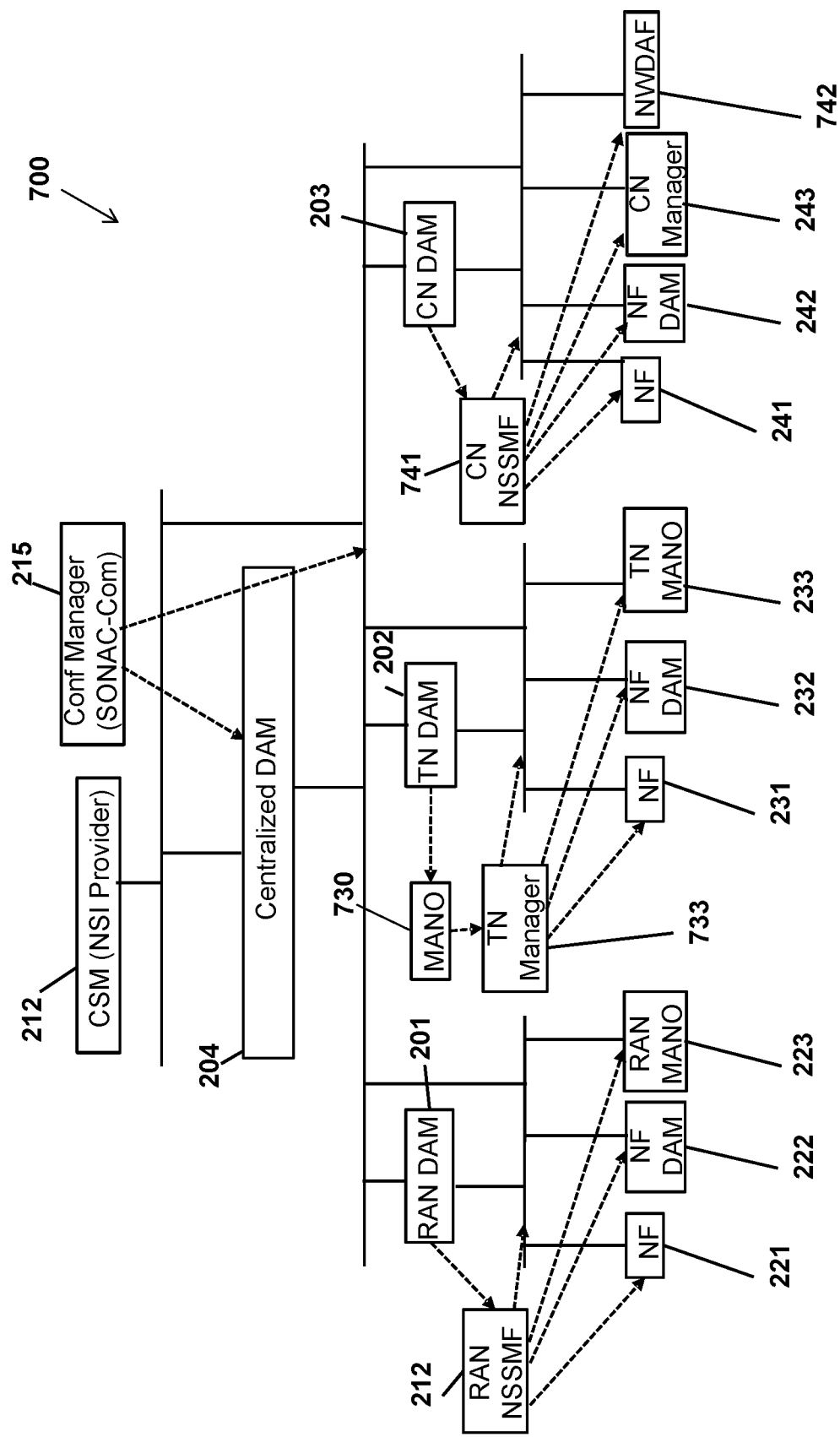
FIG. 7 is a schematic diagram illustrating another example/embodiment of a SBA for domain-specific and centralized DAM in accordance with embodiments of the present invention.

FIG. 7 illustrates another SBA for domain-specific and centralized DAM in accordance with embodiments of the present invention. FIG. 7 also depicts logical flow of raw and analyzed data between network nodes and entities. Each network entity in FIG. 7 is communicatively connected to each other as shown in the figure. The connections between network nodes and entities in the figure are not necessarily limited to direct physical connections. The architecture of FIG. 7 can be used for various network data analytics. Examples of data analytics usages include Network slice instance (NSI) delay analysis, NSI throughput analysis, and Content cache management analysis. Some examples of such data analyses are described below referring to the service based architecture described in FIG. 7.

In one case of Network slice instance (NSI) delay analysis, the NSI provider 212 initiates analysis of the end-to-end delay of the NSIs it provides to its customer to ensure that the quality of service (QoS)/quality of experience (QoE) is maintained as per the service level agreement (SLA) with its customers.

To support the analysis, the configuration manager 215 configures the centralized DAM with the NSI information (e.g., NSI ID, the resources ID belong to the NSI, corresponding resources' log detail, the detail of the log for the analyzed results, analysis statistics, response mode, etc.). The configuration manager 215 transmits a request to the centralized DAM 204 to perform the desired analysis, including configuration details, if required.

The centralized DAM 204 in turn, decomposes the end-to-end NSI delay analysis request to domain (NSSI)-specific delay analysis requirements and sends the analysis request the corresponding domain-specific DAMs (e.g., RAN DAM 201, TN DAM 202, CN DAM 203).

The domain-specific DAMs (e.g., RAN DAM 201, TN DAM 202, CN DAM 203) may be configured based on the received analysis requests or they may be previously configured. The domain-specific DAMs collect the delay measurement data for the NFs in the domain and perform the relevant delay analysis for the domain. For performing this analysis, a domain specific DAMs may consume delay analysis data from the NF-DAMs (e.g. NF-DAM 222, NF-DAM 232, NF-DAM 242) or it may compute the analysis by consuming the raw delay data of the NFs (e.g. NF 221, NF 231, NF 241) and the delay of the connecting link among the NFs.

If delay analysis or measurement data is not readily available, a domain-specific DAM (e.g., RAN DAM 201, TN DAM 202, CN DAM 203) may request the corresponding domain manager to create the delay measurement job for the constituent NFs (e.g. NF 221, NF 231, NF 241). The RAN DAM 201 requests the corresponding RAN Network Slice Subnet Management Function (NSSMF) (e.g. RAN NSSMF 721) to create delay measurement jobs for the constituent NFs e.g., UE, mobile base stations (gNBs, eNBs, etc.). The RAN NSSMF 721 can also configure the constituent NF-DAMs (e.g. NF-DAM 222) for NF delay analysis. The TN DAM 202 requests the MANO 730 for the delay measurements of the TN segment. The MANO 730 in turn requests the TN manager 733 to create relevant measurement jobs for the constituent NFs (e.g. NF 231). The CN DAM 203 requests corresponding CN NSSMF (e.g. CN NSSMF 741) to create delay measurement jobs for the constituent NFs (e.g. user plane functions (UPFs), control plane functions (CPFs)). The CN NSSMF 741 can also configure the domain data analytic function (e.g., NWDAF 742) for CN delay analysis calculation.

The centralized DAM 204 prepares the end-to-end NSI delay analysis after receiving the analysis results from the domain DAMs (it can also collect data/analysis from the constituents of the domain as well) and sends the result to the NSI provider 212. The feedback to the NSI provider 212 might also contain the delay analysis for the individual domains as well. Also, the NSI provider 212 might receive delay analysis from individual domains by requesting them for the analysis exclusively.

Upon reception of the delay analysis the NSI provider 212 can identify if there is any potential problem in any of the domains or a segment therein that might be compromising the QoS/QoE of the NSIs. In case a problem is detected the NSI provider 212 takes appropriate actions, for example, adding more computing resources to the affected NFs or increasing spectrum or changing a spectrum band, increasing the transport network bandwidth, etc.

The NSI provider 212 might also communicate with the infrastructure manager (InfM) if it needs additional resources to handle the end-to-end delay of the affected NSI(s).

In one case of Network slice instance (NSI) throughput analysis, the NSI provider 212 wants to analyze the throughput of the NSIs it provides to its customer to ensure that the quality of service (QoS)/quality of experience (QoE) is maintained as per the service level agreement (SLA) with its customers.

The configuration manager 215 configures the centralized DAM 204 with the NSI information (e.g., NSI ID, the resources ID belong to the NSI, corresponding resources' log detail, the detail of the log for the analyzed results, analysis statistics, response mode, etc.).

The centralized DAM 204 in turn, decomposes the NSI throughput analysis request to domain-specific throughput analysis requirements and sends the analysis request the corresponding domain-specific DAMs (e.g., RAN DAM 201, TN DAM 202, CN DAM 203).

The domain-specific DAM (e.g., RAN DAM 201, TN DAM 202, CN DAM 203) collects the throughput measurement data for the NFs in the domain and performs the relevant throughput analysis for the domain. For performing this analysis, it can consume throughput analysis data from the NFs in the domain or it can compute the analysis by consuming the raw throughput data (processing capacity) of the NFs and the throughput of the connecting link among the NFs.

If throughput analysis or measurement data is not readily available, a domain-specific DAM (e.g., RAN DAM 201, TN DAM 202, CN DAM 203) may request the corresponding domain manager to create the throughput measurement job for the constituent NFs and the links between the NFs.

The RAN DAM 201 requests the corresponding RAN NSSMF (e.g. RAN NSSMF 721) to create throughput measurement jobs for the constituent NFs (e.g. UE, mobile base stations (gNBs, eNBs, etc.)). The RAN NSSMF 721 can also configure the constituent NF-DAMs (e.g. NF-DAM 222) for NF throughput analysis. The TN DAM 202 requests the MANO 730 for the throughput measurements of the TN segment. The MANO 730 in turn requests the TN manager 733 to create relevant measurement jobs for the constituent NFs (e.g. NF 231). The CN DAM 203 requests corresponding CN NSSMF (e.g. CN NSSMF 741) to create throughput measurement jobs for the constituent NFs (e.g. user plane functions (UPFs), control plane functions (CPFs)). The CN NSSMF 741 can also configure the domain data analytic function (e.g., NWDAF 742) for CN throughput analysis calculation.

The centralized DAM 204 prepares the NSI throughput analysis after receiving the analysis results from the domain DAMs (e.g. RAN DAM 201, TN DAM 202, CN DAM 203) and sends the result to the NSI provider 212. The feedback to the NSI provider 212 might also contain the throughput analysis for the domains as well. Also, the NSI provider might receive throughput analysis from individual domains by requesting them for the analysis exclusively.

Upon reception of the throughput analysis, the NSI provider 212 can identify if there is any potential problem in any of the domains or a segment therein that might be compromising the QoS/QoE of the NSIs. In case a problem is detected the NSI provider 212 takes appropriate actions, for example, adding more computing resources to the affected NFs or increasing spectrum or changing a spectrum band, increasing the transport network bandwidth, etc.

The NSI provider 212 might also communicate with the infrastructure manager (InfM) if it needs additional resources to handle the agreed (in the SLA) throughput of the affected NSI(s).

In one case of content cache management analysis, a service provider (e.g., NSI provider 212, over the top (OTT) service provider, etc.) may initiate obtaining an indication of the optimal placement of contents and optimized bandwidth allocation for the NSI/SI/applications or users that it is providing service to.

The configuration manager 215 configures the centralized DAM 204 with the NSI/SI/applications or users information (e.g. ID, the resources ID, corresponding resources' log detail, the detail of the log for the analyzed results, analysis statistics, response mode, etc.).

The configuration manager 215 also configures the centralized DAM 204 for analyzing the contents used by the NSI, SI, applications or users.

The NSI provider 212 might also want to configure the centralized DAM 204 to correlate the content information with the user mobility pattern for NSI(s)/SI(s).

The centralized DAM 204 in turn, decomposes the content cache analysis request to domain-specific content cache analysis requirements and sends the analysis request the corresponding domain-specific DAMs (e.g., RAN DAM 201, TN DAM 202, CN DAM 203).

The domain-specific DAM (e.g., RAN DAM 201, TN DAM 202, CN DAM 203) collects the content related data for the NFs (e.g. NF 221, NF 231, NF 241) in the domain for example, UE mobility data from access and mobility management function (AMF) and performs the relevant throughput analysis for the domain. If any new measurement job is required for the analysis, the DAM requests the corresponding domain manager (e.g., RAN NSSMF 721, TN Manager 733, CN NSSMF 741) to create the measurement job.

After receiving the content analysis results from the centralized DAM 204 and/or domain-specific DAM (e.g., RAN DAM 201, TN DAM 202, CN DAM 203) the service provider can take optimal placement strategy/decisions for the contents requested by the NSI, SI, applications or users. It can also optimize the bandwidth allocation for the content delivery.

Other content cache related analytics might include proactive caching of popular data where a service provider tracks and proactively caches contents for NSI, SI, applications or users that it is providing service to.

Figure 8:
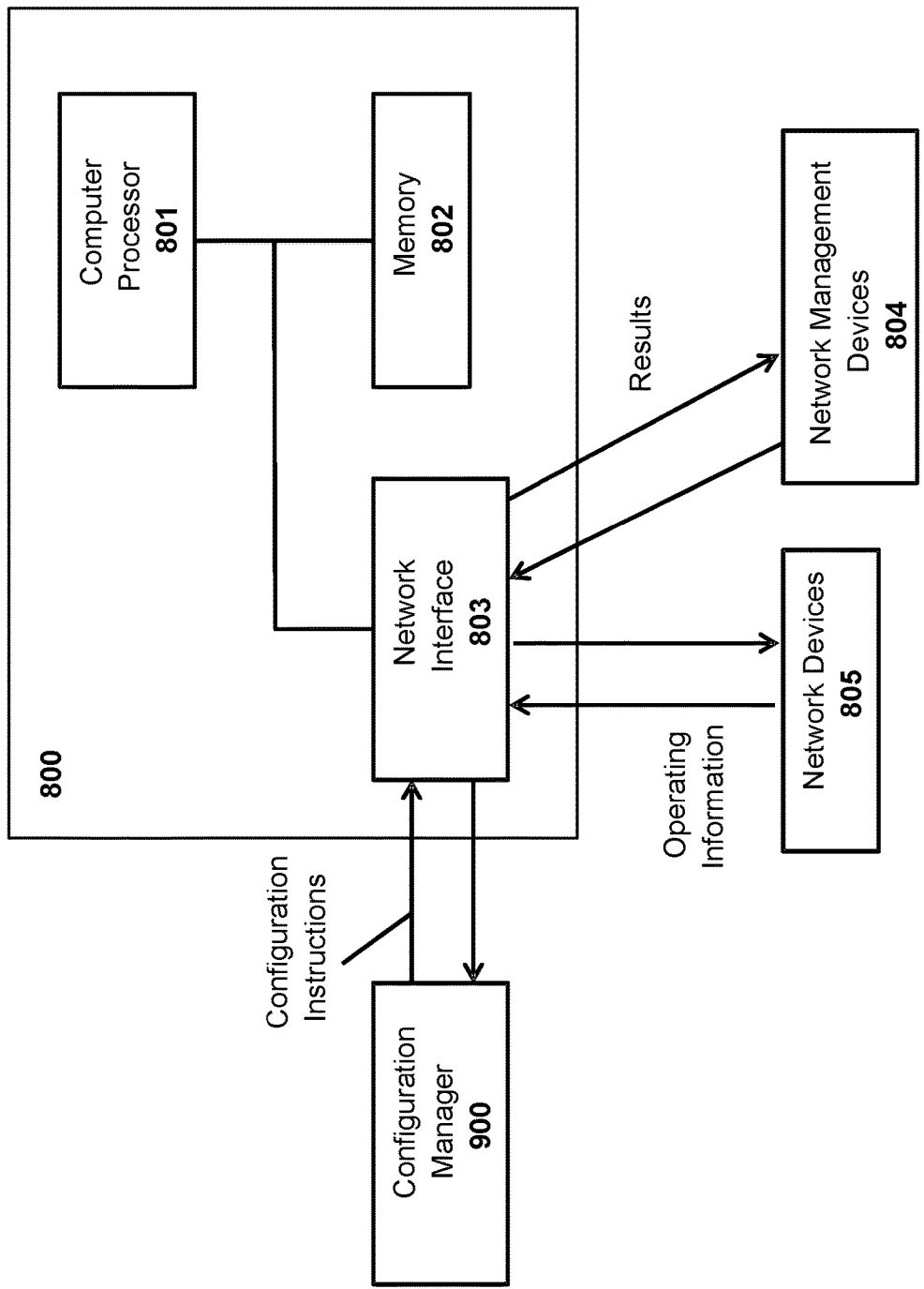
FIG. 8 is a schematic diagram illustrating a network apparatus for data analytic management in a communication network in accordance with embodiments of the present invention.

FIG. 8 illustrates a network apparatus 800 for data analytic management in a communication network in accordance with embodiments of the present invention. The apparatus 800 can be an instance of a DAM apparatus. The network apparatus 800 may comprise a various components such as a computer processor 801, a memory 802 and a network interface 803. Each component of the network apparatus 800 may be communicatively connected to each other. The connections between the components of the network apparatus 800 are not necessarily limited to direct physical connections. The connections may be logical communicative connections. According to embodiments, the network apparatus 800 may communicate (e.g. transmitting, receiving) with a configuration manager 900 via the network interface 803. The connection between the network apparatus 800 and the configuration manager 900 is not necessarily limited to direct physical connections. If the apparatus 800 is a lower-level DAM apparatus (e.g. a domain-DAM) in a hierarchical structure, the configuration manager 900 may be replaced with a higher-level DAM apparatus (e.g. a centralized DAM) which acts to configure the lower-level DAM.

According to embodiments, the network apparatus 800 may be configured to receive various configuration instructions from the configuration manager 900 via the network interface 803. In some embodiments, the configuration instructions may at least specify: an identification of one or more of network slices; an identification of one or more network devices supporting one or more of the network slices; an aspect of the one or more of network slices for which operating information (e.g. network operating information, for example associated with the network slice) is to be obtained; a type of analysis to be performed by the processing operations; and a response mode indicative of conditions under which the results of the processing operations are to be transmitted toward one or more network management devices 804. Network management devices can include an InfM, CFM, CSM, 3rd party OSS, etc. If the apparatus is a lower-level DAM, a network management device 804 may be replaced with a higher-level DAM. However, because the higher-level DAM performs further processing of the transmitted results and forwarding of the results of further processing, it can still be considered that the results of processing operations are transmitted toward network management devices. It is noted that the apparatus may be configured according to configuration instructions a limited number of times, e.g. once, after which the apparatus may function to respond to repeated requests from network management devices.

According to embodiments, the network apparatus 800 may be further configured to interact with one or more network devices 805 via the network interface. The network devices 805 may include NFs, lower-level DAMs (e.g. NF DAMs), domain-level MANOs, etc. The purpose of the interaction may be to obtain network operating information therefrom based on the configuration instructions. According to embodiments, the network apparatus 800 may be further configured to process, using the computer processor 801, the obtained network operating information according to processing operations specified in the received configuration instructions. According to embodiments, the network apparatus 800 may be further configured to transmit results of the processing operations toward one or more network management devices or another networked apparatus (e.g. higher-level DAM). The results of the processing operations may be transmitted to the network management devices or other networked apparatus via the network interface 803 and may be transmitted based on the configuration instructions.

Figure 9:
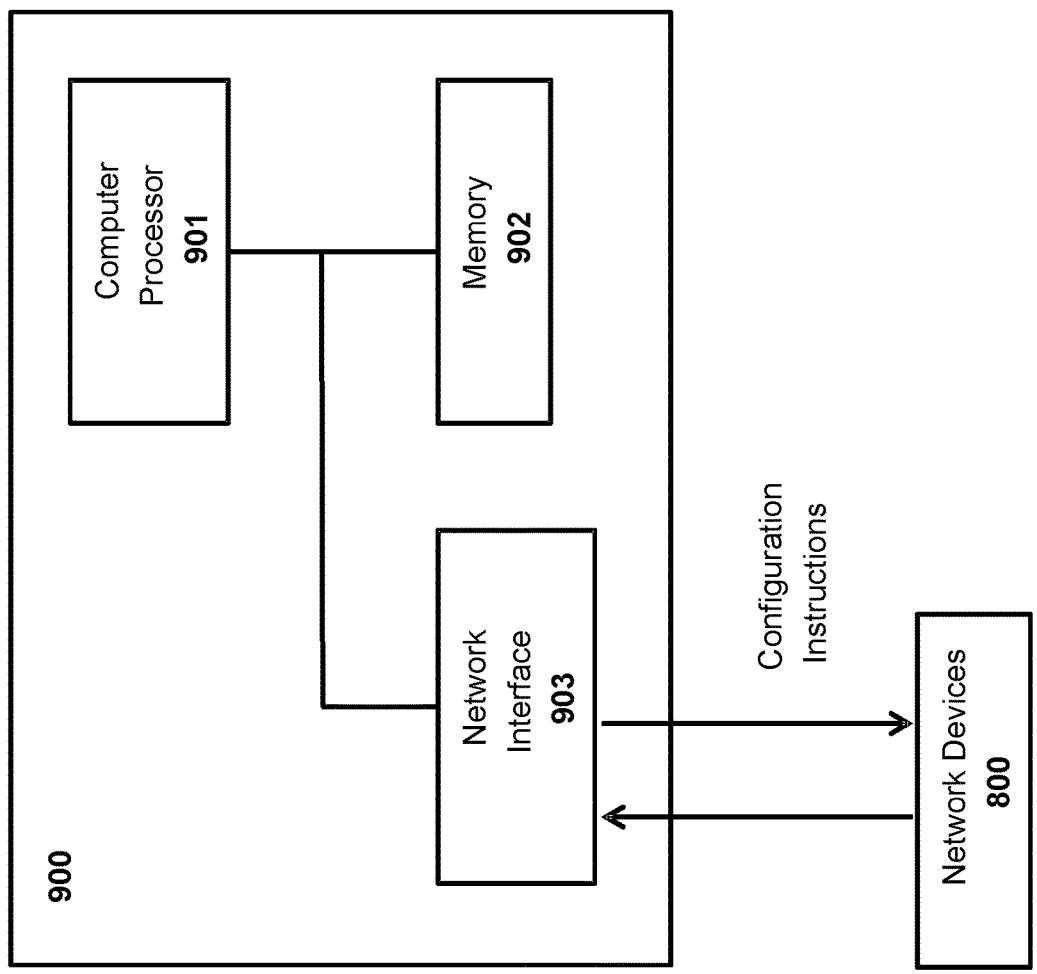
FIG. 9 is a schematic diagram illustrating a configuration manager for data analytic management in a communication network in accordance with embodiments of the present invention.

FIG. 9 illustrates a configuration manager 900 for data analytic management in a communication network in accordance with embodiments of the present invention. The configuration manager apparatus 900 may comprise a various components such as a computer processor 901, a memory 902 and a network interface 903. Each component of the configuration manager apparatus 900 may be communicatively connected to each other. The connections between the components in FIG. 9 are not necessarily limited to direct physical connections. The connections may be logical communicative connections.

According to embodiments, the configuration manager apparatus 900 may be configured to generate configuration instructions using the computer processor 901 and transmit configuration instructions via the network interface 903 to a separate network apparatus 800, for example configured as a DAM. According to embodiments, the configuration instructions may cause the aforementioned separate apparatus to interact with one or more network devices to obtain network operating information therefrom based on the configuration instructions. According to embodiments, the configuration instructions may further cause the separate apparatus to process the obtained network operating information according to processing operations specified in the received configuration instructions. According to embodiments, the configuration instructions may further cause the separate apparatus to provide results of the processing operations to one or more network management devices or another networked apparatus, based on the configuration instructions.

Figure 10:
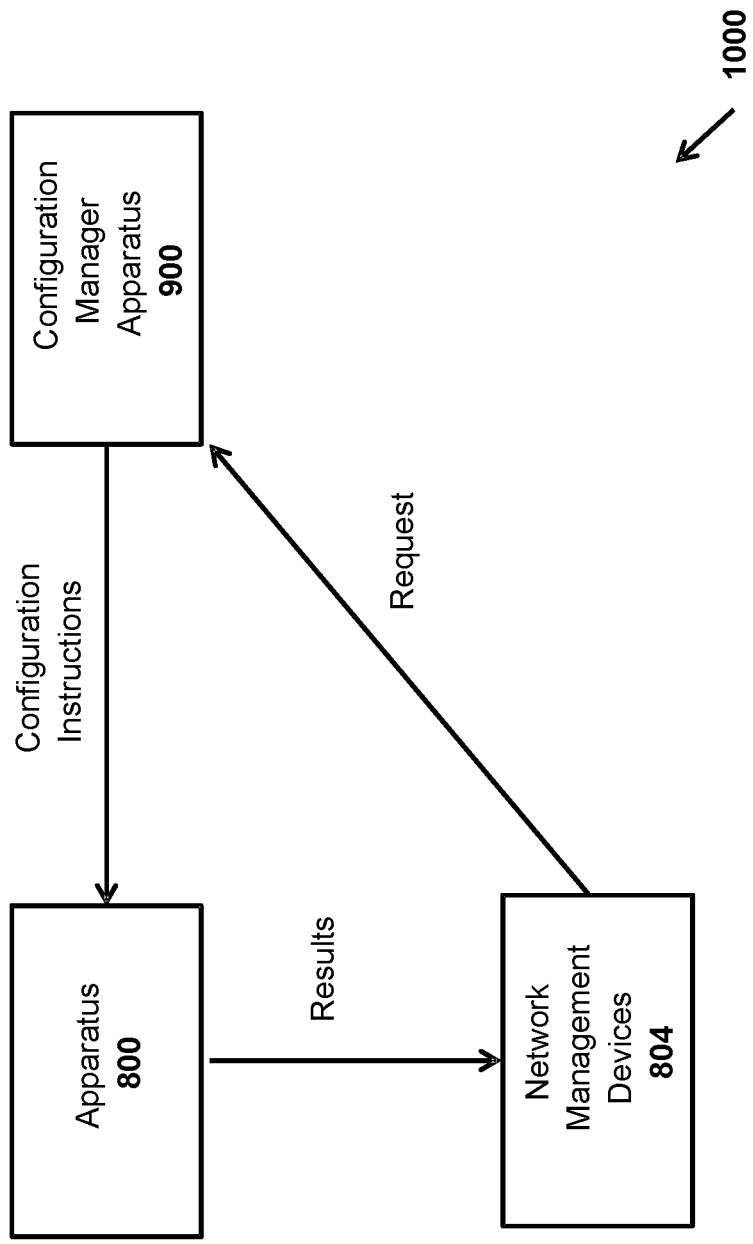
FIG. 10 is a schematic diagram illustrating a system for data analytics management in a communication network in accordance with embodiments of the present invention.

FIG. 10 illustrates a system 1000 for data analytic management in a communication network in accordance with embodiments of the present invention. The system may comprise the apparatus 800 illustrated in FIG. 8, the configuration manager apparatus 900 illustrated in FIG. 9, and the one or more network management devices 805. According to embodiments, the network apparatus 800, the configuration manager apparatus 900 and the network management device 804 are communicatively connected to each other as shown in FIG. 10. The connections between the apparatuses/devices are not necessarily limited to direct physical connections. Each connection may be wireless communicative connection. Further, the connection may be just a logical connection. According to embodiments, the network apparatus 800 may receive information (e.g. configuration instructions) from the configuration manager apparatus 900. The network apparatus 800 may perform various processing operations for processing obtained data in a pre-configured manner, and then transmit the results of the processing operations to the network management device 804. The network management device 804 may transmit a request to the configuration manager 900 for a certain configuration of the apparatus 800, or for certain types of information to be provided by the apparatus 800. In response to such a request, the configuration manager 900 may adjust its configuration instructions.

According to embodiments, the configuration manager apparatus 900 comprising a second computer processor, a second memory and a second network interface and configured to generate and transmit the configuration instructions to the apparatus 800.

According to embodiments, the network management device 804 may be configured to receive the results of the processing operations from the apparatus (e.g. the apparatus 800 in FIG. 8) and perform one or more network management actions based on the received results of the processing operations. The one or more network management actions may include one or more of: resource scaling; network slice admission control; predicting scalability of physical and virtual network resources; fault recovery for infrastructure, network slice instance or service instance; network slice provisioning; network slice modification; mobility management in a network slice instance; mobility management for users belonging to a service instance; cross-PLMN mobility analysis; traffic steering in a network slice instance or service instance; load balancing in a network slice instance or service instance; network slice-specific performance assurance; QoS analysis; content cache instantiation for a network slice instance, service instance or user; and content cache migration for a network slice instance, service instance or user.

Figure 11:
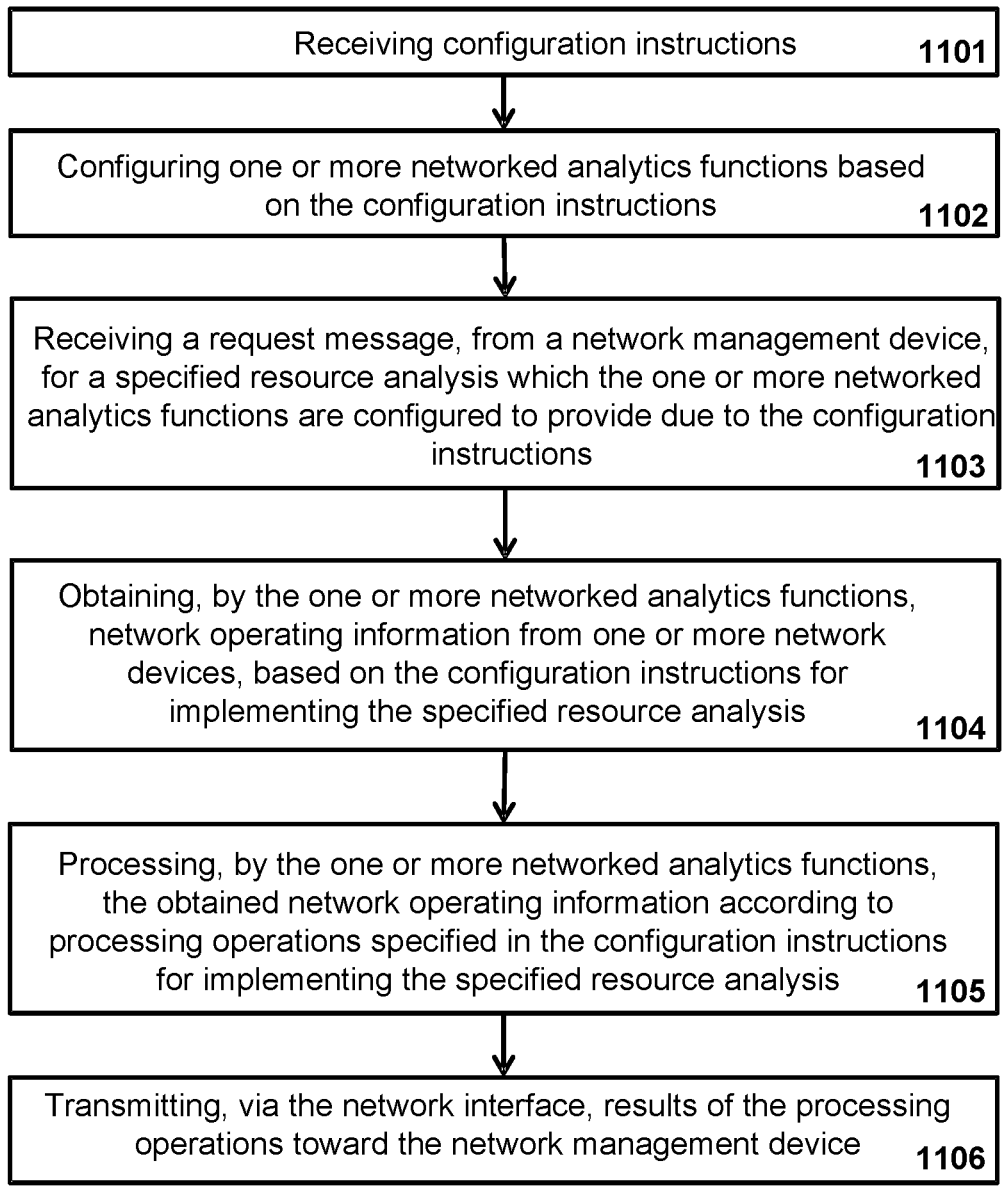
FIG. 11 is a flow diagram illustrating a method of data analytics management in a communication network in accordance with embodiments of the present invention.

FIG. 11 illustrates a method of data analytics management in a communication network in accordance with embodiments of the present invention. The method includes 1101 receiving configuration instructions (e.g. from a configuration manager), for example specifying the information as listed above. The method also includes 1102 configuring one or more networked analytics functions (e.g. DAM functions such as but not necessarily limited to MDAFs) based on the configuration instructions. The method further includes 1103 receiving a request message, from a network management device (e.g. InfM, CSM, CFM, OSS), for a specified resource analysis which the one or more networked analytics functions are configured to provide due to the configuration instructions. The method further includes 1104 obtaining, by the one or more networked analytics functions, network operating information from one or more network devices, based on the configuration instructions for implementing the specified resource analysis. The method further comprises 1105 processing, by the one or more networked analytics functions, the obtained network operating information according to processing operations specified in the configuration instructions for implementing the specified resource analysis. The method further comprises 1106 transmitting, via the network interface, results of the processing operations toward the network management device.

Management Data Analytical Services (MDAS) is described for example in TS 28.550. As used herein, Data Analytics Management (DAM) includes but is not necessarily limited to MDAS. For example, whereas currently proposed MDAS implementations may be limited to use in management plane applications, DAM is not necessarily so limited. DAM may also provide further analytical capabilities over MDAS. Therefore, when the term "DAM" is used herein (including in the Drawings), this term can be replaced with "MDAS." Similarly, when the term "MDAS" is used herein (including in the Drawings), it should be understood that, where suitable, the associated aspects of the invention can also be implemented with the term "MDAS" replaced with "DAM." For example, Domain MDAS (see e.g. TS 28.550) can correspond to a Domain DAM as described herein; central MDAS (see e.g. TS 28.550) can correspond to a Centralized DAM as described herein.

DAM entities can have a service based or interface architecture with or without hierarchy among entities. DAM entities can be provided and organized on a per-domain (e.g. NSI, NSSI) basis. DAM can also be provided by different vendors and operators. Embodiments of the present invention provide for DAM procedures for facilitating DAM inter-operation and standardization, for example. Embodiments of the present invention provide for procedures for DAM-related job creation.

Embodiments of the present invention provide for procedures for creating and modifying DAM jobs from a network management perspective. The DAM jobs are tasks or operations assigned to DAM entities. The DAM jobs are configured and performed in order to obtain, process and provide data for data analytics purposes. The procedures presented herein may be applicable to a variety of DAM architectures, including service-based or interface architectures with or without a hierarchical arrangement of DAM entities.

Embodiments of the present invention are applicable in a constituent hierarchy based DAM architecture. For example, in such an architecture, there may be different DAM entities deployed at the NSI level, NSSI level, and NF level. The DAM entities deployed at lower (e.g. NF) levels may be configured by and report to DAM entities at higher (e.g. NSI) levels. Embodiments of the present invention are applicable in a functionality based DAM architecture. For example, in such an architecture, there may be different DAM entities deployed for performance management (PM DAM) and fault management (FM DAM). Embodiments of the present invention are applicable in a DAM architecture incorporating both constituent hierarchy and functionality-based architectural elements. For example, the constituent hierarchy based DAM architecture can include functionality based DAMs at some or all levels, e.g., NSI PM DAM, NSSI PM DAM, NF PM DAM.

Embodiments of the present invention are applicable in DAM architectures employing a global DAM entity which interacts with other DAM entities. The global DAM may be owned by a customer or service provider. The global DAM may manage the other DAMs to at least some extent. For instance, the global DAM may be configured to request services from other DAMs, however, the global DAM may be unable to allocate physical resources for the other DAMs' computational needs (that function may be performed by the respective other DAM provider(s)).

Accordingly, embodiments of the present invention may be tailored to a variety of different DAM architectures. A corresponding variety of DAM procedures is thus described herein and encompassed by embodiments of this invention.

Embodiments of the present invention are responsive to a DAM service request. The request may include a KPI that require various functionality based DAMs to be involved. These DAMs may be specified in the request, or derived by another DAM device such as a global DAM device or peer DAM device.

Figure 12A:
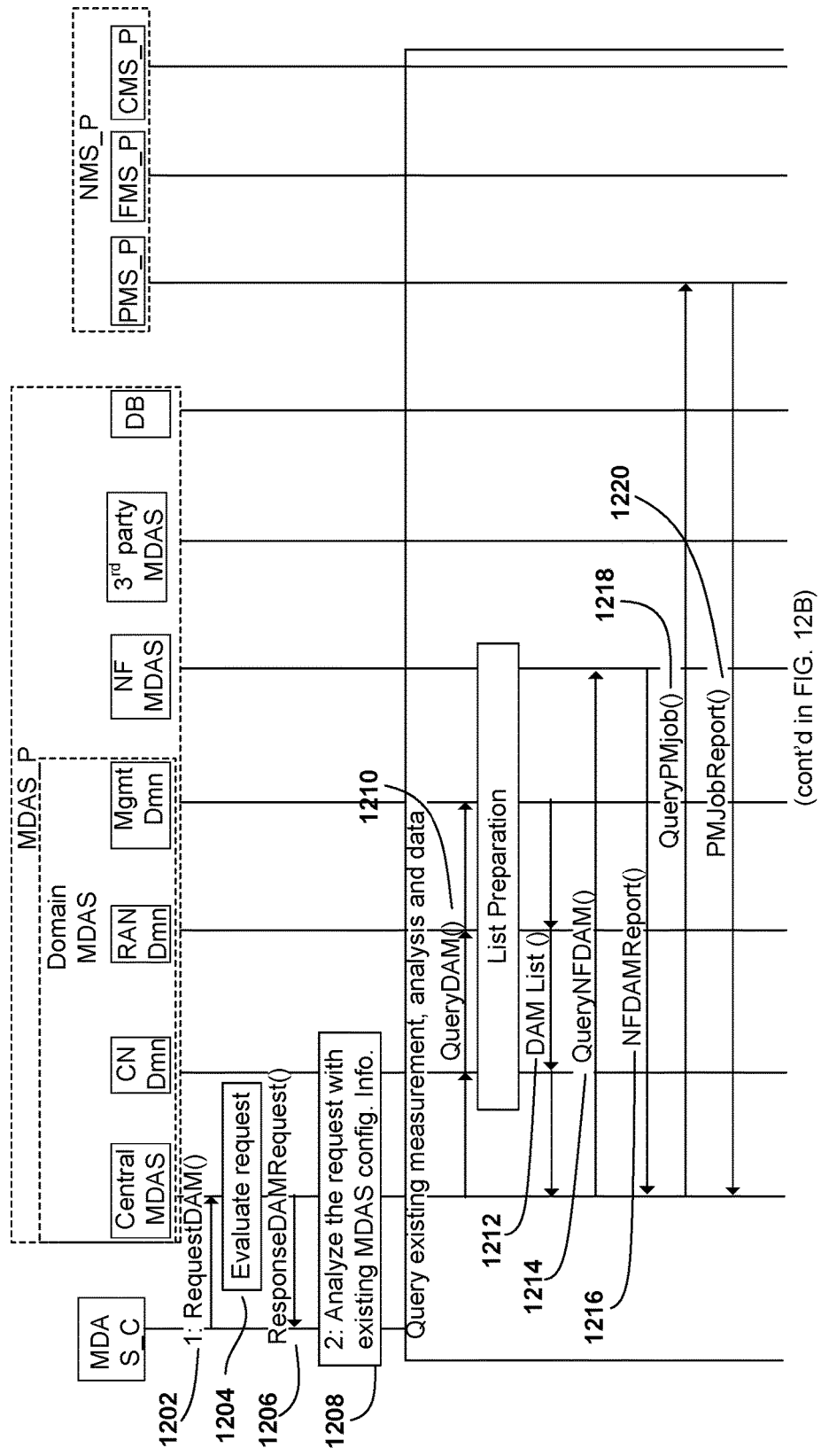
FIGS. 12A and 12B show a flow diagram illustrating operations for DAM job creation, in accordance with an embodiment of the present invention.
Figure 12B:
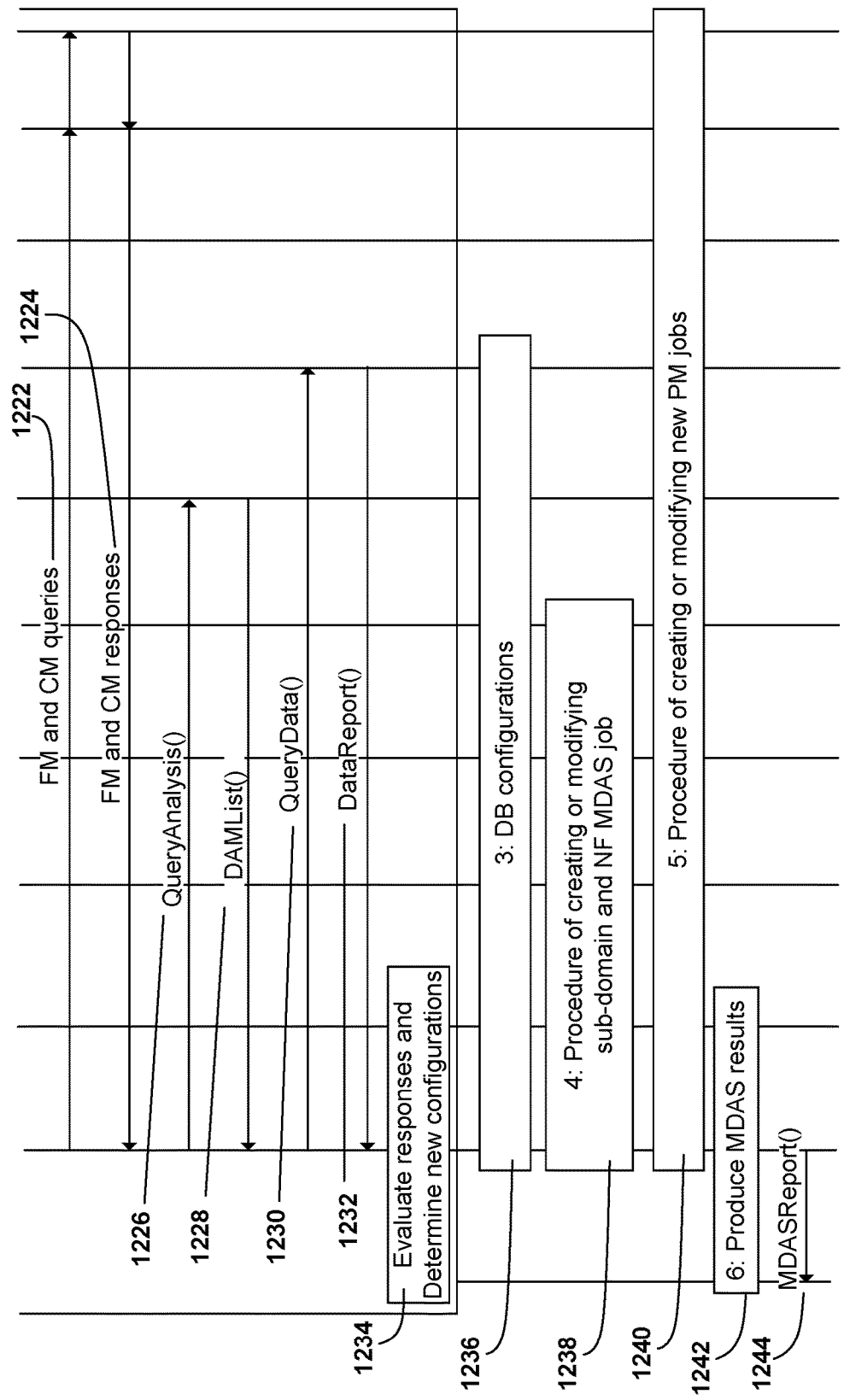

Having reference now to FIGS. 12A and 12B, embodiments of the present invention provide for a method and apparatus for DAM job creation, which is described below as a collection of high-level procedures. Although FIGS. 12A and 12B uses both terms "MDAS" and "DAM," it should be noted that these terms can be used interchangeably. FIGS. 12A and 12B illustrates an embodiment of the corresponding method 1200. The method and apparatus may also include performing the DAM job following its creation. The method may be performed by, and the apparatus may be, a first DAM device, such as a DAM provider (DAM_P) apparatus, a central or coordinating sub-apparatus of the DAMP apparatus, or a domain DAM apparatus.

The method 1200 includes receiving a request message indicative of the DAM job. Accordingly, an MDAS customer (MDAS_C) sends an MDAS request to MDAS provider (MDAS_P) in the form of a RequestDAM( ) message 1202. In some embodiments the MDAS_P may consist of one centralized entity (dashed box 1250) with the functionalities of the illustrated constituent MDAS devices within the dashed box 1250. In other embodiments, MDAS_P may have a hierarchical architecture including a central MDAS device, domain MDAS devices, NF MDAS devices, $3^{rd}$ party MDAS devices, databases (DB), or a combination thereof, as illustrated. The domain MDAS devices may reside in the core network (CN) domain, radio access network (RAN) domain, the management (Mgmt) domain, or a combination thereof. The Mgmt Domain MDAS can also have sub-entities based on DAM purpose. For example, the Mgmt Domain MDAS can include some or all of: performance management (PM) MDAS, fault management (FM) MDAS, and configuration management (CM) MDAS. In some embodiments, Domain MDAS within MDAS_P can be a network data analytics function (NWDAF), a RAN DAM provider, or a domain management system MDAS. Databases (DB) can be either distributed (domain specific) or centralized e.g., in a public land mobile network (PLMN). Finally, the 3rd party MDAS provider can be a transport network (TN) MDAS provider.

The MDAS request in the form of the RequestDAM( ) message 1202 may be made at a variety of levels, e.g., at NSSI, NSI, or NF levels. The level depend on the authorization of the MDAS_C. The RequestDAM( ) message 1202 can include at least the following data analytics input attributes: Domain level (NSI, NSSI etc.); DAM time aspect (long term, average, instantaneous); Specific data to be collected; Requested analysis; Purpose—PM, FM etc.

Following receipt, the request is evaluated 1204. Evaluation 1204 includes determining whether or not the requested DAM service can be provided. That is, contents of the request message are evaluated by MDAS_P or Central MDAS thereof. A response indicative whether the DAM job can be accommodated can be transmitted to MDAS_C in the form of a ResponseDAMRequest( ) message 1206.

If the requested MDAS is already available the MDAS_P or Central MDAS may send a previously prepared report, for example within of following the ResponseDAMRequest( ) message 1206.

Evaluation 1204 further includes determining an authorization level of the customer (MDAS_C). The authorization level may be pre-determined, or the authorization level may be determined dynamically (updated) based on the request, SLA etc.

Evaluation 1204 may further include evaluation of other aspects, such as but not necessarily limited to: Pricing considerations such as a price-for service and a determination of whether the price is acceptable, Computational power considerations such as demand and availability, and an openness and exposure level.

Subsequently, MDAS_P analyzes 1208 the request. The initial analysis can be performed, at least initially, by the most central entity/function of the MDAS_P (e.g. Central MDAS). Then the analysis can be decomposed by the central entity into analysis jobs which are sent to other entities, e.g., domain MDAS entities, for execution. The analysis 1208 evaluates the request with respect to the existing MDAS configuration. The existing MDAS configuration can include existing measurements being performed, analysis being performed, data available, etc. Such measurements, analysis and data may exist to accommodate previous or concurrent DAM requests. The analysis 1208 may determine requirements, such as data acquisition and processing requirements for accommodating the request. Additionally or alternatively, such requirements may be specified in the RequestDAM( ) message.

The analysis 1208 may indicate whether or not existing DAM configurations are sufficient for accommodating the DAM job. For example, the analysis may include evaluating whether current data collection and processing configurations of the DAM, and associated network devices, is sufficient for satisfying the request. If not sufficient, the analysis may determining additional configuration requirements for achieving such sufficiency.

The analysis 1208 can include querying other network devices, such as other DAM/MDAS functions/entities (e.g., by using QueryDAM( ) messages 1210, QueryNFDAM( ) messages 1214, or both), as well as 3rd party MDAS_P devices to obtain an indication (e.g. in list form) of provided DAM services. The analysis 1208 can include querying DBs (external to MDAS_P or internal to MDAS_P) to obtain available data, measurement history and other relevant information. The analysis can include querying network devices to obtain an indication of data available therefrom, the data for performing the DAM job. The indication may include the data itself, the availability of the data, or both.

The analysis 1208 can include querying one or more network management service providers or network slice management service providers, or fault management, configuration management or performance management entities thereof, to obtain an indication relevant data. The relevant data can include configuration information, measurements, reports, or a combination thereof. For example, the indication can be of existing and available performance management (PM) jobs containing the relevant data. The query may be in the form of a QueryPMjob( ) message 1218. The QueryPMjob( ) message may be sent to network (slice) management service providers. Additionally or alternatively, an operation listMeasurementJobs (M) message, as described in the 3GPP document entitled "3rd Generation Partnership Project; Technical Specification Group Services and System Aspects; Management and orchestration of networks and network slicing; Performance Management (PM); Stage 2 and stage 3 (Release 15)," July 2018, numbered TS 28.551 v 0.3.0 and hereinafter referred to as TS 28.551, may be used for this purpose.

When fault management entities are queried, the relevant data obtained by query may include an indication of one or more network entities experiencing faults. When configuration management entities are queried, the relevant data may include an indication of one or more existing or new network configurations. When performance management entities are queried, the indication of relevant data obtained by query may include an indication of existing and available performance management (PM) jobs containing said relevant data.

The analysis 1208 can include querying 1222 FM and CM entities. Queries to FM and CM can follow the operations in 3GPP SA5 standards.

The analysis 1208 can include querying $3^{rd}$ party MDAS devices, for example using a QueryAnalysis( ) message 1226. The analysis 1208 can include querying databases, for example using a QueryData ( ) message 1230.

The analysis 1208 is based on responses to the queries as described above, including query messages 1210, 1214, 1218, 1222, 1226, 1230. The responses include a DAMList( ) response 1212 to the QueryDAM( ) message 1210, a NFDAMReport( ) response 1216 to the QueryNFDAM( ) message 1214, a PMJobReport( ) response 1220 to the QueryPMjob( ) message 1218, FM and CM responses 1224 to the FM and CM queries 1222, a DAMList( ) response 1228 to the QueryAnalysis( ) message 1216, and a DataReport response 1232 to the QueryData( ) message 1230. Responses are typically sent by the same entity that received the respective query.

The responses 1212, 1216, 1220, 1224, 1228, 1232 are analyzed and/or evaluated 1234, by the MDAS_P or Central MDAS thereof, to determine if there is a need for new configurations, including DB creation, DB address distribution, PM job creation or modification, and MDAS job creation or modification. The need for new configurations may correspond to an indication that existing DAM configurations are insufficient for accommodating the DAM job. A determination can accordingly be made as to whether a reconfiguration of the one or more other network devices is required for providing data for performing the DAM job.

In some embodiments, the responses may include configuration information usable for interacting with the one or more other network devices and organizing and interpreting data provided thereby. For example, the configuration information may include information regarding when data will be provided, formats in which data will be provided, formats to be used for data retrieval messages, meaning of provided data, etc.

It should be noted that the query messages 1210, 1214, 1218, 1222, 1226, 1230 are not necessarily sent in the illustrated order. They can be sent in any sequence or partially or fully in parallel. Furthermore, not all queries are necessarily required in every case. It should also be noted that queries to domain MDAS devices can be sent to the domain MDAS entity, or to sub-entities within the domain MDAS entity.

In some embodiments, queries may additionally or alternatively be performed by MDAS_C if the customer has sufficient authorization and capability.

In some embodiments, MDAS_P acts or contains a centralized_DAM/MDAS device. In such embodiments, the request may be decomposed into multiple parts, for example including requests for domain specific analysis, infrastructure resources, statistics, response type IDs, etc. Each request part may be accommodated separately by data acquisition, processing, or both.

Subsequently to the analysis 1208 and attendant operations 1210 to 1234, where applicable, interaction with network devices can occur to cause device reconfigurations in support of performing the requested DAM job. The MDAS_P or Central MDAS can interact with one or more other network devices to cause said other network devices to obtain and transmit additional information toward the MDAS_P or Central MDAS. The additional information is used for accommodating the DAM job according to determined requirements.

In various embodiments, according to the above interaction, DB configurations are determined 1236, and if possible arranged. In some such embodiments, the MDAS_P or Central MDAS interacts with network devices to determine, arrange, or both determine and arrange one or more database configurations. The interaction may be with the databases themselves, with devices being directed to provide data to the databases, or a combination thereof. The databases are thus configured to facilitate communication of data, via one or more databases, toward the MDAS_P or Central MDAS, for use in performing the DAM job. In a highly centralized MDAS_P architecture or an open network where sub-domains are visible to upper layers, this operation can be performed by central MDAS in some embodiments.

In various embodiments, according to the above interaction, sub-domain MDAS jobs are created or modified 1238. The created jobs depend on the analysis results described above, and the request from the customer. In some such embodiments, the MDAS_P or Central MDAS interacts with one or more sub-domain DAM devices, one or more network function (NF) DAM entities, or both, to create or modify one or more subordinate DAM jobs for providing data for use in performing the DAM job. In a highly centralized MDAS_P architecture or an open network where sub-domains are visible to upper layers, this operation can be performed by central MDAS in some embodiments.

In various embodiments, according to the above interaction, and depending on the need, new PM jobs can be created, or existing PM jobs can be modified 1240. If PM jobs involve different domains, an MDAS_P function/entity related to that domain can request the PM job creation/modification. In some such embodiments, the MDAS_P or Central MDAS interacts with a performance management device to create or modify one or more performance management (PM) jobs for providing data for use in performing the DAM job.

Subsequent and responsive to the above-described configuration operations, data can be collected from network entities, such as databases, other DAM/MDAS devices, PM, FM and CM functions, etc. The data can be collected and processed by the MDAS_P or Central MDAS in order to perform the DAM job. MDAS results are thus produced 1242 based on collected data and analysis.

Next, report messages comprising analysis results are transmitted. A prepared MDAS report 1244 is delivered to the customer. If data analysis is periodic or continuous, reporting can be repeated as many times as needed. Alternatively, operation 1222 may include a DB creation or configuration for the MDAS_C to access the results for which MDAS_C is authorized. In this case, the MDASReport( ) message may include the address of this DB and any other necessary configurations. In some embodiments, MDAS_C can provide its own DB for storing results, which can be populated by MDAS_P or the Central MDAS. It is noted that MDAS_C can be another network (slice) management entity or the same NSM_P. Accordingly, report messages, which may be database write messages or direct reporting messages, are produced and transmitted. The report messages include results of an analysis of the collected data in furtherance of performing the DAM job.

It is noted that the above embodiment may provide signaling and messaging that enables provisioning of MDAS satisfying the MDAS customer's request. The presented solution is applicable to centralized, hierarchical, or service-based DAM architectures. The MDAS customer can be an internal or external entity.

Having reference now to FIG. 13, embodiments of the present invention provide for a method and apparatus for sub-domain DAM job creation, which is described below as a collection of high-level procedures. As with FIGS. 12A and 12B, although FIG. 13 uses both terms "MDAS" and "DAM," it should be noted that these terms can be used interchangeably.

Figure 13A:
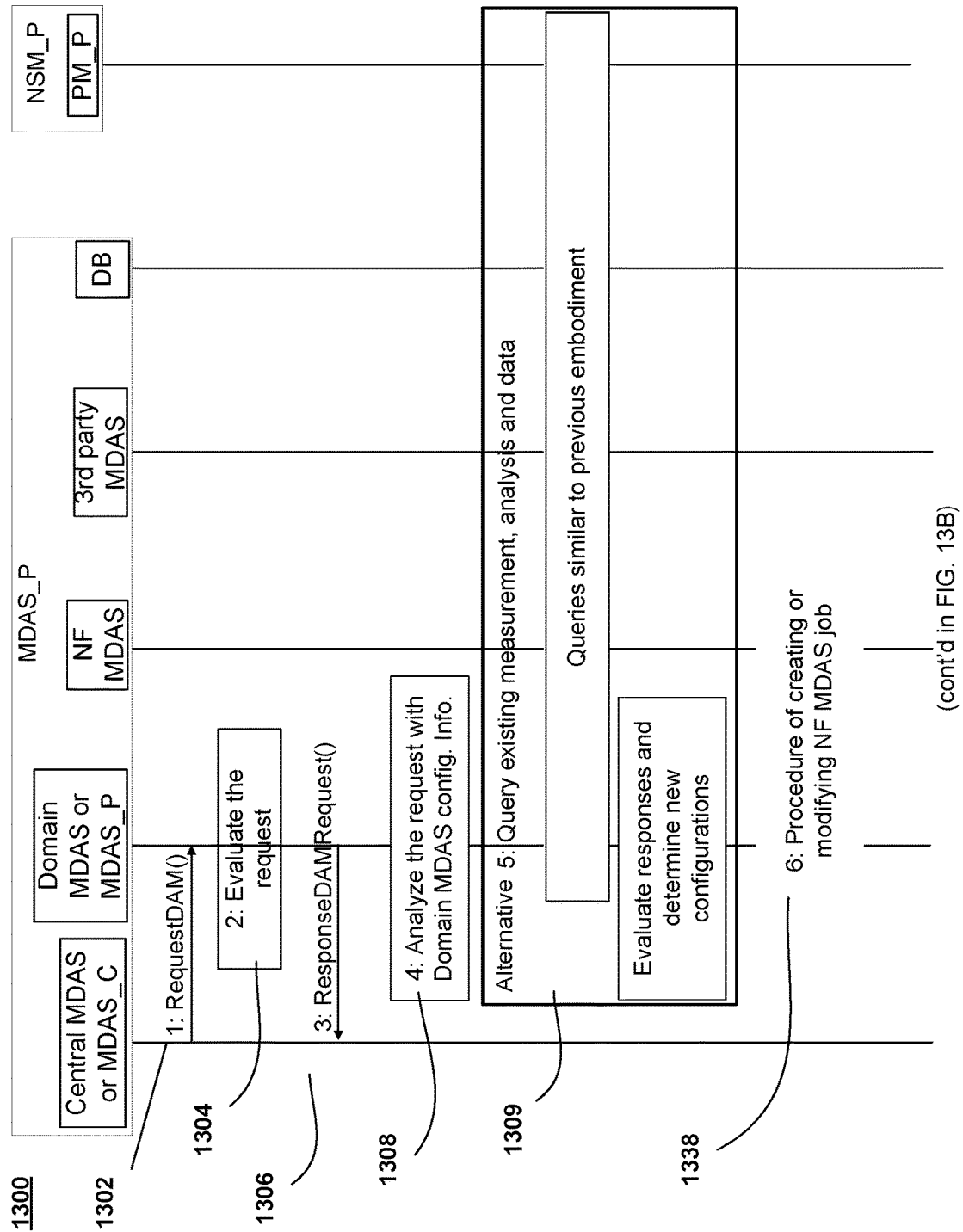
FIGS. 13A and 13B show a flow diagram illustrating operations for sub-domain DAM job creation, in accordance with an embodiment of the present invention.
Figure 13B:
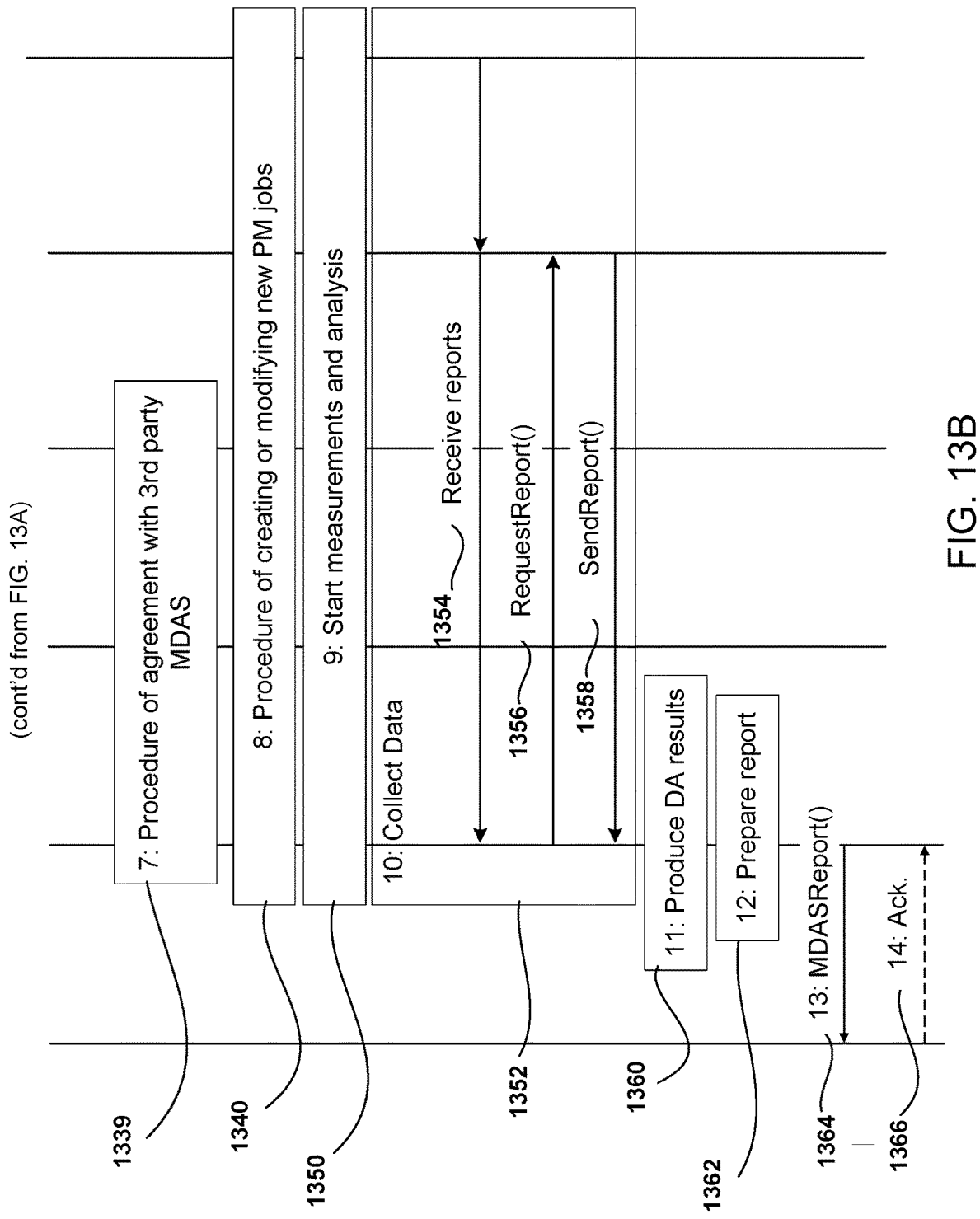

A number of procedures in FIG. 13 are similar to procedures in FIGS. 12A and 12B. These procedures are provided above to support hierarchical DAM architectures. As such, details of various operations set forth with respect to FIG. 13 may be the same as details for the corresponding operations set forth with respect to FIGS. 12A and 12B. If the DAM architecture is hierarchical, NF MDAS job creation can be viewed as a request for jobs. It is noted that for the creation of domain MDAS/DAM jobs, it is possible to communicate with the NSSMF. It is also noted that, according to FIG. 13, various actions are performed by the Domain MDAS that were performed in FIGS. 12A and 12B by MDAS_P or Central MDAS.

According to the method 1300 illustrated in FIG. 13, the domain MDAS or MDAS_P receives an MDAS request in the form of the RequestDAM( ) message 1302. This is similar to operation 1202 of FIGS. 12A and 12B. Following receipt, the request is evaluated 1304. This is similar to operation 1204 of FIGS. 12A and 12B. A response indicative whether the DAM job can be accommodated can be transmitted to Central MDAS or MDAS_C in the form of a ResponseDAMRequest( ) message 1306. This is similar to operation 1206 of FIGS. 12A and 12B. Domain MDAS or MDAS_P also analyzes 1308 the request, along with domain MDAS configuration information. This is similar to operation 1308 of FIGS. 12A and 12B. Domain MDAS or MDAS_P then queries 1309 supporting and associated devices to determine existing measurements, analysis and data. These queries can include operations similar to operations 1210 to 1234 of FIGS. 12A and 12B. Sub-domain MDAS jobs are created or modified 1338 under direction of Domain MDAS or MDAS_P. This is similar to operation 1238 of FIGS. 12A and 12B. Further, an agreement can be reached with a $3^{rd}$ party MDAS device via procedure 1339, which involves message passing. These messages can be used to perform one or more of: determining authorization level of the MDAS_P as a customer of the $3^{rd}$ party MDAS (provider), querying available reports and analysis capability of the $3^{rd}$ party MDAS; and communicating SLAs and negotiation messages. The $3^{rd}$ party MDAS device may request data from MDAS_P, e.g., for use in its analysis. The agreement can configure the $3^{rd}$ party MDAS device to provide requested data. Also, new PM jobs can be created, or existing PM jobs can be modified 1340, under direction of Domain MDAS or MDAS_P. This is similar to operation 1240 of FIGS. 12A and 12B.

Subsequently, measurement and analysis operations are started 1350 and all created measurement and analysis jobs are considered active. Analysis may be from sub-domains, NF MDAS, and third party MDAS devices, for example.

Subsequently, data collection begins and data is collected 1352 by domain MDAS or MDAS_P, from other devices such as NF MDAS, 3rd party MDAS, DBs, and NSM_P/PM_P. Data may be received directly from the management plane based on one or more of: Subscriptions; and Data reports such as PM reports. In some embodiments, a DAM job may be decomposed into NF log jobs. The NF MDAS/DAM can be a Local_NF_Log. A request/response based query may be used to understand NF log capabilities.

According to data collection operations 1352, data may be collected via receipt of one-time or periodic reports 1354, or by retrieval from databases using RequestReport( ) query messages 1356 and SendReport( ) response messages 1358. The databases may act to store data collected by one device, for subsequent retrieval by the same device or another device. A report ID may be used to access to the report in the database. SendReport( ) may be an authorization, or access grant, or the report itself. According to data collection operations 1352, in some embodiments, data may be read from collecting network functions, such as AMF, NWDAF, and NSSF.

After the required data and analysis are collected, data analytics services (e.g. of Domain MDAS or MDAS_P) can produce results in operation 1360. This can involve composing domain specific analysis.

After producing results, an MDASReport( ) 1364 is prepared and transmitted to the customer (Central MDAS or MDAS_C), either directly or via a database. This is similar to operation 1244 of FIGS. 12A and 12B. If communicated via a database, the MDASReport( ) message includes the address of this DB and any other necessary configurations. In some embodiments, the customer may respond with an acknowledgement message 1366 to indicate successful reception of results.

The procedure illustrated in FIG. 13 systematizes sub-domain MDAS job creation for MDAS service providers. MDAS service providers can belong to a variety of domains. The DAM system may or may not have a hierarchical architecture.

Figure 14A:
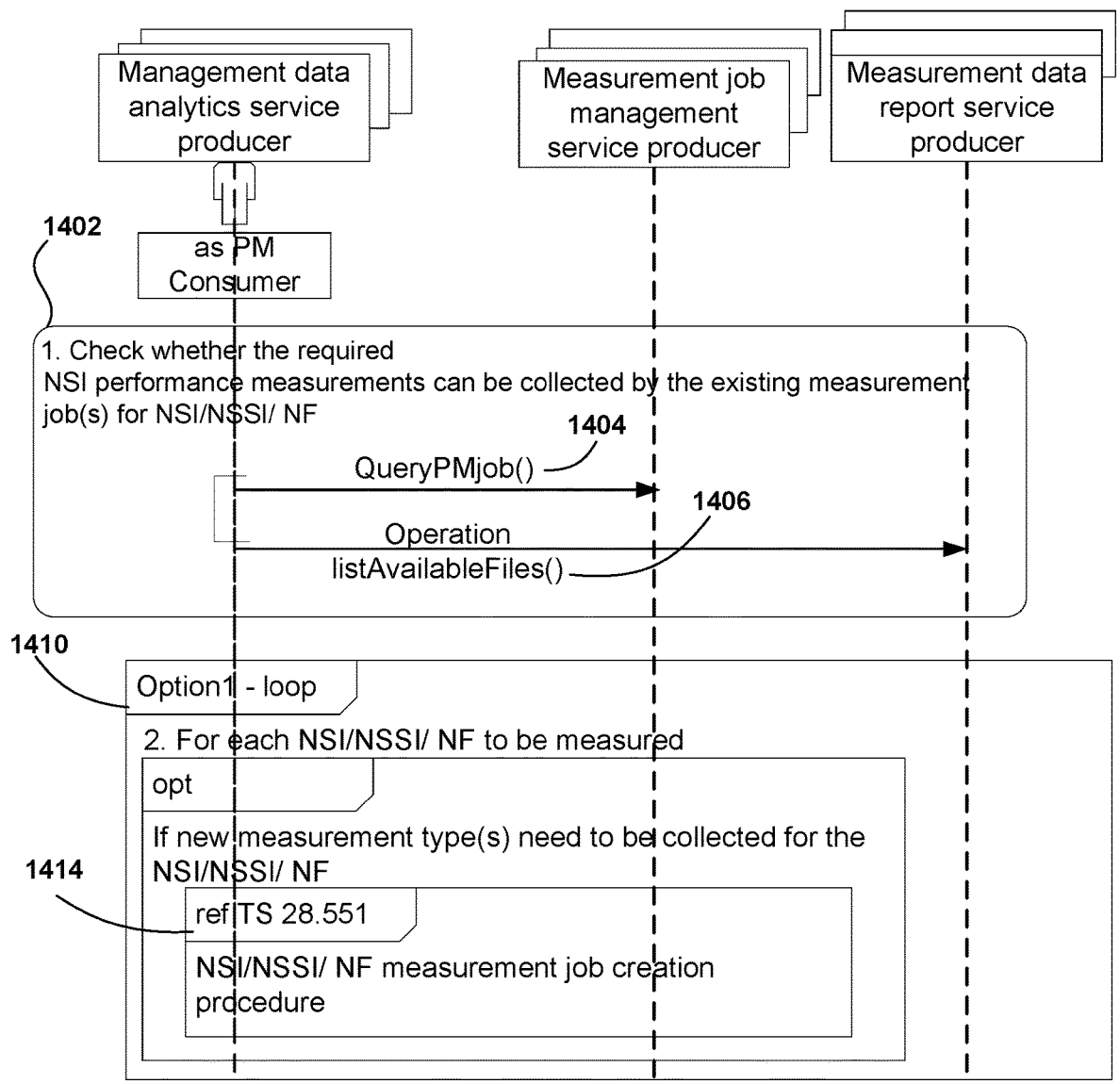
FIGS. 14A and 14B show a flow diagram illustrating operations for performance management job creation in support of a DAM job, in accordance with an embodiment of the present invention.
Figure 14B:
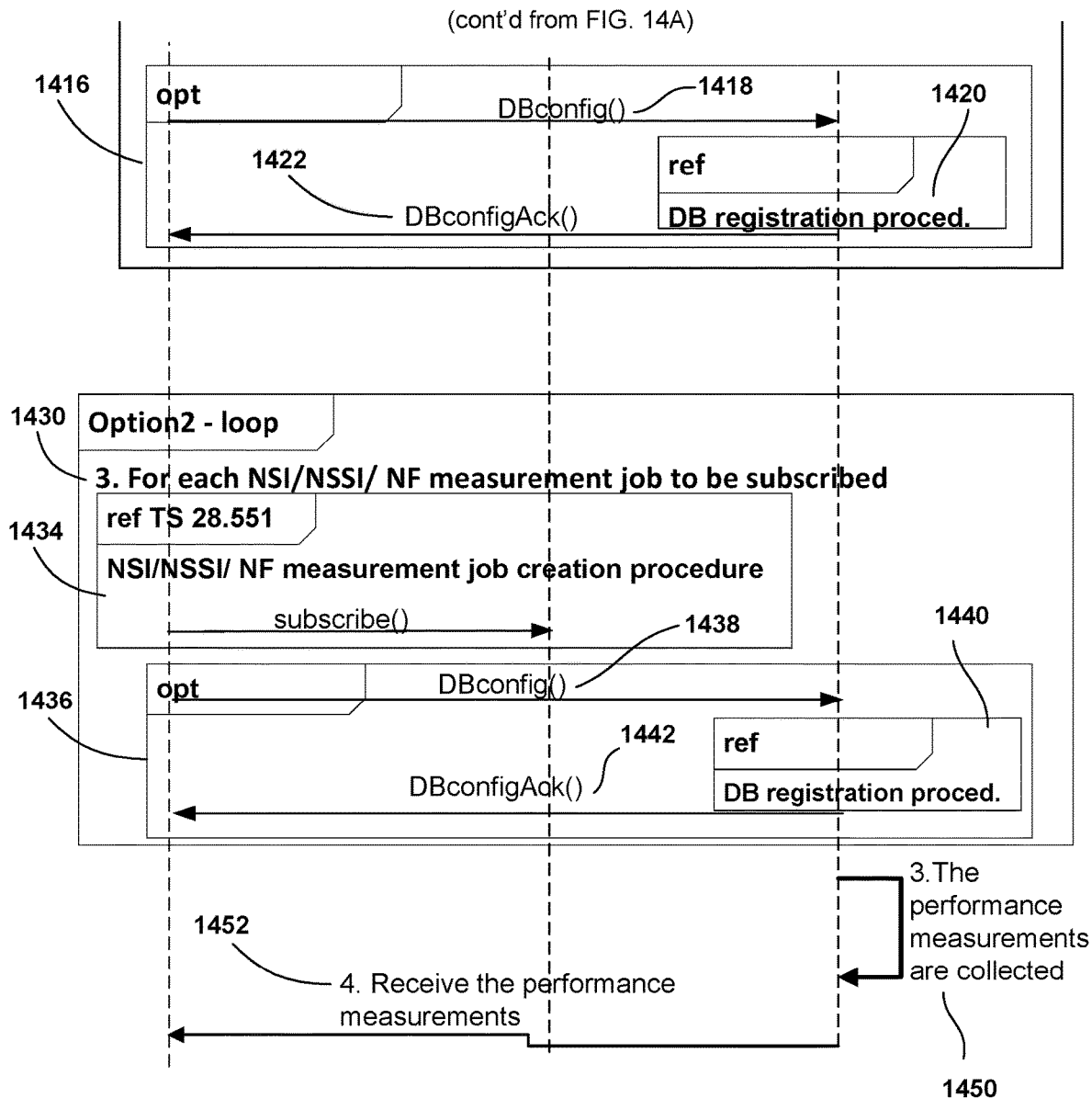

Having reference now to FIGS. 14A and 14B, embodiments of the present invention provide for a method and apparatus for creating performance management (PM) jobs, in support of a DAM job, that follows the illustrated procedure 1400. The PM jobs are created by MDAS_P, with MDAS_C acting as a consumer as in Annex B of TS 28.551.

As illustrated, MDAS_P, acting as a PM service customer, checks 1402 whether the existing PM services are sufficient to produce required analysis. If the existing PM configuration information is not sufficient or is outdated, or is invalid for another reason, MDAS_P queries PM jobs from the PM job service producer by transmitting a QueryPMjob( ) message 1404. MDAS_P can also check the existing measurement reports by using a listAvailableFiles( ) operation 1406 (as described for example in TS 28.551), including transmission of an associated message. MDAS_P will use the information regarding existing measurement jobs to determine which measurement jobs are required to be created by the procedures below. That is, if a measurement job already exists, MDAS_P will avoid re-creating it. Rather, MDAS_P may subscribe to such existing measurement jobs as detailed below with respect to operation group 1430. In other words, the PM customer may determine the existing PM jobs, subscribe to those existing PM jobs that are required for current DAM job purposes, and initiate creation of PM jobs that are not currently existing but that are also required for current DAM job purposes.

It is noted that MDAS_P can be from a variety of domains (e.g. NSI, NSSI, or NF). In some embodiments, a lower-level domain (e.g. NF) would not be able to request a higher domain measurement job. For example, in such embodiments, NF DAM may be unable to request a job from NSI PM.

In operation group 1410, MDAS_P performs related operations or procedures for each NSI/NSSI/NF measurement job to be produced. In some cases, the PM job creation operation for MDAS purposes can be completed here. Alternatively, the job creation operation may continue as described below to ensure all measurements are created and collected accurately. In more detail, for each NSI, NSSI, NF to be measured, if new measurement types are required to be collected, a measurement job creation procedure 1414, for example as described in TS 28.551 is performed.

Optionally, MDAS_P can also initiate one or more database configuration operations 1416 by transmitting a DBconfig( ) message 1418 to a measurement data report service producer, which initiates a database registration procedure 1420 and optionally transmits an acknowledgement in the form of a DBconfigAck( ) message 1422 to MDAS_P.

In operation group 1430, MDAS_P performs related operations or procedures to subscribe to one or more existing measurement job, if required. In some embodiments, the existing measurement jobs may be modified to save results in a different database. In more detail, for each existing NSI, NSSI, NF to be subscribed to, a measurement job creation procedure 1434, for example as described in TS 28.551 is performed, in which a subscription message is transmitted to the appropriate measurement job management service provider.

Optionally, MDAS_P can also initiate one or more database configuration operations 1436 by transmitting a DBconfig( ) message 1438 to a measurement data report service producer, which initiates a database registration procedure 1440 and optionally transmits an acknowledgement in the form of a DBconfigAck( ) message 1442 to MDAS_P.

In some embodiments, The PM report service provider collects the performance measurements 1450. In some embodiments, the entities can be configured to save results in previously determined DBs. MDAS_P (or DAM_P) can determine such configurations during job creation in operation group 1410.

In some embodiments, MDAS_P (or DAM_P) may receive the performance measurements 1452 directly. Alternatively, MDAS_P (or DAM_P) can configure the report service provider to send reports to other MDAS_P entities. This may be useful for example in a DAM hierarchical architecture scenario, or in scenario involving 3rd party analytics providers. As another alternative, MDAS_P (or DAM_P) may configure the report service provider to send reports to one or more pre-determined DBs. In this case, MDAS_P (or DAM_P) receives an optional acknowledgement or message indicating successful reception and saving of measurement reports. These messages may be received once at the first data collection, or periodically, or at reception of each report. As yet another alternative, MDAS_P/DAM_P can configure other entities to access the DBs where reports are stored. Messages initiating such configurations can be transmitted during the procedures 1400.

Embodiments related to the procedures 1400 may be used to systematize PM job creation for MDAS service providers. MDAS service providers can belong to a variety of domains, and the MDAS (or DAM) entities may or may not have a hierarchical architecture.

Messages usable to carry out data analytics service provisioning, according to an embodiment of the present invention, are described below. It is noted that some or all of the messages may be defined for a particular implementation, and that message formatting, including definitions of input and output parameters, may vary as would be readily understood by a worker skilled in the art. Messages are created and transmitted by certain apparatuses in the network, and received and processed by other apparatuses in the network.

Message RequestDAM( ), support for which may be mandatory, is transmitted for example from MDAS_C (or DAM_C) to MDAS_P (or DAM_P). This message is used to request provisioning of a DAM job.

Message ResponseDAMRequest( ), support for which may be mandatory, is transmitted for example from MDAS_P (or DAM_P) to MDAS_C (or DAM_C). This message is used to respond to a request provisioning of a DAM job, for example to acknowledge the request, and indicate if it is accepted or rejected. If the results of the DAM job are immediately available, these results may be transmitted with this message, for example in an accompanying MDASReport( ) message.

Message MDASReport( ) (or alternatively DAMReport( )), support for which may be mandatory, is transmitted for example from MDAS_P (or DAM_P) to MDAS_C (or DAM_C). This message is used to convey results of the DAM job.

Input parameters for RequestDAM( ), ResponseDAMRequest( ) and MDASReport( ) are specified in Table 3. In the tables, M denotes support for a parameter is mandatory, and O denotes support for the parameter is optional:

TABLE 3

| Parameter | Qualifier | Cardinality | Content | Description |
|---|---|---|---|---|
| MgmtDomain | M | 1 | String | NSI, NSSI, NF, an element etc. |
| NetworkDomain | M | 1 | String | RAN, CN etc. |
| AnalysisType | M | 1 | String or number | Load, throughput etc. |
| Analysis Time | O | | String or number | Continuous, periodic etc. |
| AnalysisFreq | O | | String or number | Average, one-time etc. |
| ReportLoc | O | | String | Report to a data storage or report directly |
| DSAddress | O | | number | IP address of the preferred data storage location |
| DSInfo | O | | String or number | Other information on the preferred data storage |
| Purpose | O | | String or number | Purpose of the DA, such as PM, FM, provisioning etc. |
| OtherFields | O | | String or number | Any other information to request an appropriate DAM |

Output parameters for ResponseDAMRequest( ) are specified in Table 4:

TABLE 4

| Parameter | Qualifier | Cardinality | Content | Description |
|---|---|---|---|---|
| AcknowledgeDAM | M | 1 | response | Initial acknowledgement |

Output parameters for MDASReport( ) are specified in Table 5:

TABLE 5

| Parameter | Qualifier | Cardinality | Content | Description |
|---|---|---|---|---|
| MgmtDomain | M | 1 | string | NSI, NSSI, NF, an element etc. |
| NetworkDomain | M | 1 | string | RAN, CN etc. |
| AnalysisType | M | 1 | String or number | Load, throughput etc. |
| AnalysisTimeStamp | M | 1 | String or number | Time stamp for analysis results |
| AnalysisReport | O | | String or number | Analysis results |

TABLE 5-continued

| Parameter | Qualifier | Cardinality | Content | Description |
|---|---|---|---|---|
| AnaylsisReportID | O | 1 | String or number | Ex: If analysis results are to be read from a DB, this ID may be used for query |

Message QueryDAM( ), support for which may be mandatory, is transmitted for example from an MDAS_P in a NSI domain to an MDAS_P in a NSSI domain. This message is used to query other functions to obtain a list of provided DAM services, available data, etc. Message QueryNFDAM( ) may be similarly provided.

Message DAMList( ), support for which may be mandatory, is transmitted for example from an MDAS_P in a NSI domain to an MDAS_P in a NSSI domain. This message is used to respond to a QueryDAM( ) message, for example by providing the requested list of provided DAM services, or by referring to a database location.

Input parameters for QueryDAM( ) and DAMList( ) ResponseDAMRequest) are specified in Table 6:

TABLE 6

| Parameter | Qualifier | Cardinality | Content | Description |
|---|---|---|---|---|
| MgmtDomain | M | 1 | String | NSI, NSSI, NF, an element etc. |
| NetworkDomain | M | 1 | String | RAN, CN etc. |
| AuthLevel | O | | String or number | Indicate authorization level |
| DAMType | O | | String or number | Search for a specific analysis (e.g., delay, rate, failure prediction) |
| OtherParam | O | | String or number | Any other search criteria |

Output parameters for QueryDAM( ) and DAMList( ) ResponseDAMRequest( ) are specified in Table 7:

TABLE 7

| Parameter | Qualifier | Cardinality | Content | Description |
|---|---|---|---|---|
| DAMFiles | M | 1 | list | Only list content that the customer has authorization for |

Message QueryPMJob( ), support for which may be mandatory, is transmitted for example from MDAS_P (or DAM_P) to PM_Service_P (i.e. a performance management service provider.) This message is used to obtain information regarding existing and available PM jobs.

Message PMJobReport( ), support for which may be mandatory, is transmitted for example from PM_Service_P to MDAS_P (or DAM_P). This message is used to respond to a QueryPMJob( ) message, in order to report the available PM jobs, or refer to an associated database location.

Input parameters for QueryPMJob( ) and PMJobReport( ) are specified in Table 8:

TABLE 8

| Parameter | Qualifier | Cardinality | Content | Description |
|---|---|---|---|---|
| MgmtDomain | M | 1 | String | NSI, NSSI, NF, an element etc. |
| NetworkDomain | M | 1 | String | RAN, CN etc. |
| AuthLevel | O | | String or number | Indicate authorization level |
| PMServiceCheck | O | | String or number | Search for a specific measurement (e.g., delay, throughput) |
| PMReportCheck | O | | String or number | If the PM report exists for a specific PM service |
| OtherParam | O | | String or number | Any other search criteria |

Output parameters for QueryPMJob( ) and PMJobReport( ) are specified in Table 9:

TABLE 9

| Parameter | Qualifier | Cardinality | Content | Description |
|---|---|---|---|---|
| PMReport | M | 1 | list | Only list content that the customer has authorization for |

Message QueryAnalysis( ), support for which may be mandatory, is transmitted for example from MDAS_C (or DAM_C) to a 3$^{rd}$ party MDAS_P. This message is used to query the 3$^{rd}$ Party MDAS (or DAM) device to obtain an indication of analytical support available therefrom.

Message DAMList( ), support for which may be mandatory, is transmitted for example from a 3$^{rd}$ party MDAS_P to MDAS_C (or DAM_C). This message is used to respond to messages such as the QueryAnalysis( ) message, to provide a list of requested content.

Input parameters for QueryAnalysis( ) and DAMList( ) are specified in Table 10:

TABLE 10

| Parameter | Qualifier | Cardinality | Content | Description |
|---|---|---|---|---|
| MgmtDomain | M | 1 | String | NSI, NSSI, NF, an element etc. |
| NetworkDomain | M | 1 | String | RAN, CN etc. |
| DAMList | O | | String | Request a list |
| AuthLevel | O | | String or number | Indicate authorization level |
| OtherParam | O | | String or number | Any other search criteria |

Output parameters for QueryAnalysis( ) and DAMList( ) are specified in Table 11:

TABLE 11

| Parameter | Qualifier | Cardinality | Content | Description |
|---|---|---|---|---|
| DAMList | M | 1 | list | Only list content that the customer has authorization for |

TABLE 11-continued

| Parameter | Qualifier | Cardinality | Content | Description |
|---|---|---|---|---|
| DAMType | O | | Number or string list | If list is not properly produced, send types separately |
| DAMIndicator | O | | Number | If the specific analysis is actively being done or not active but can be done |
| DAMResult | O | | Number or string | If the results are available, and can be shared |

Message QueryData( ), support for which may be mandatory, is transmitted for example from MDAS_C (or DAM_C) or DB_C (a database customer) to MDAS_P or DB_P (a database provider). This message is used to query a database for information contained therein.

Message DataReport( ), support for which may be mandatory, is transmitted for example from MDAS_P (or DAM_P) or DB_P (a database provider) to MDAS_C (or DAM_C) or DB_C (a database consumer). This message is used to respond to a QueryData( ) message, by providing stored data to the querying device.

Input parameters for QueryData( ) and DataReport( ) are specified in Table 12:

TABLE 12

| Parameter | Qualifier | Cardinality | Content | Description |
|---|---|---|---|---|
| MgmtDomain | O | 1 | String | NSI, NSSI, NF, an element etc. |
| NetworkDomain | O | 1 | String | RAN, CN etc. |
| DataList | M | | String | Request with a list of data to be known. Option to query all (only will work for allowed data) |
| AuthLevel | O | | String or number | Indicate authorization level |
| OtherParam | O | | String or number | Any other search criteria |

Output parameters for QueryData( ) and DataReport( ) are specified in Table 13:

TABLE 13

| Parameter | Qualifier | Cardinality | Content | Description |
|---|---|---|---|---|
| DataList | M | 1 | list | Only list content that the customer has authorization for. Can be empty. |
| DataType | O | | Number or string list | If list is not properly produced, send types separately |

It is noted that the above-described methods (i.e. carrying out the described procedures) and apparatuses (i.e. configured to carry out the described procedures), can be used in fifth generation (5G) wireless networks and beyond. Further, such methods and apparatuses, can also be used in a variety of networks network utilizing data analytic management engines.

According to some embodiments, there is provided a data analytics management entity providing resource related network analytics. According to other embodiments, there is provided a configuration management entity that configures DAM function for InfM, CSM and CFM related analytics. According to other embodiments, there is provided a system and method for receiving resource related data analytics request, collecting relevant PM/FM/CM data. According to other embodiments, DAM job creation, and related procedures and messaging are provided. DAM job creation and feasibility checking of DAM jobs, along with associated message flows, has been described above. Query management and DAM job procedures have also been described. Furthermore, DAM functions for resource-related analytics have been described. Furthermore, configuration management for configuring analytics for InfM, CSM and CSM have been described. In some embodiments, there is provided a data analytics management (DAM) function for 5G networks and its corresponding resource-related analytics. In some embodiments, there is provided a configuration manager configuring the DAM function to provide analytics for InfM, CSM, and CFM. In some embodiments, there is provided a method for configuring DAM functions and calculating and obtaining network analytics, and associated method flows.

According to some embodiments, and as will be readily understood from the preceding discussion, a DAM is configured to perform resource related analytics, for example involving processing input information related to network resource availability or utilization, and providing a numerical or qualitative indication regarding same. For example, the DAM may generate and provide radio resource utilization analysis, delay analysis, or a combination thereof to the InfM.

Figure 15:
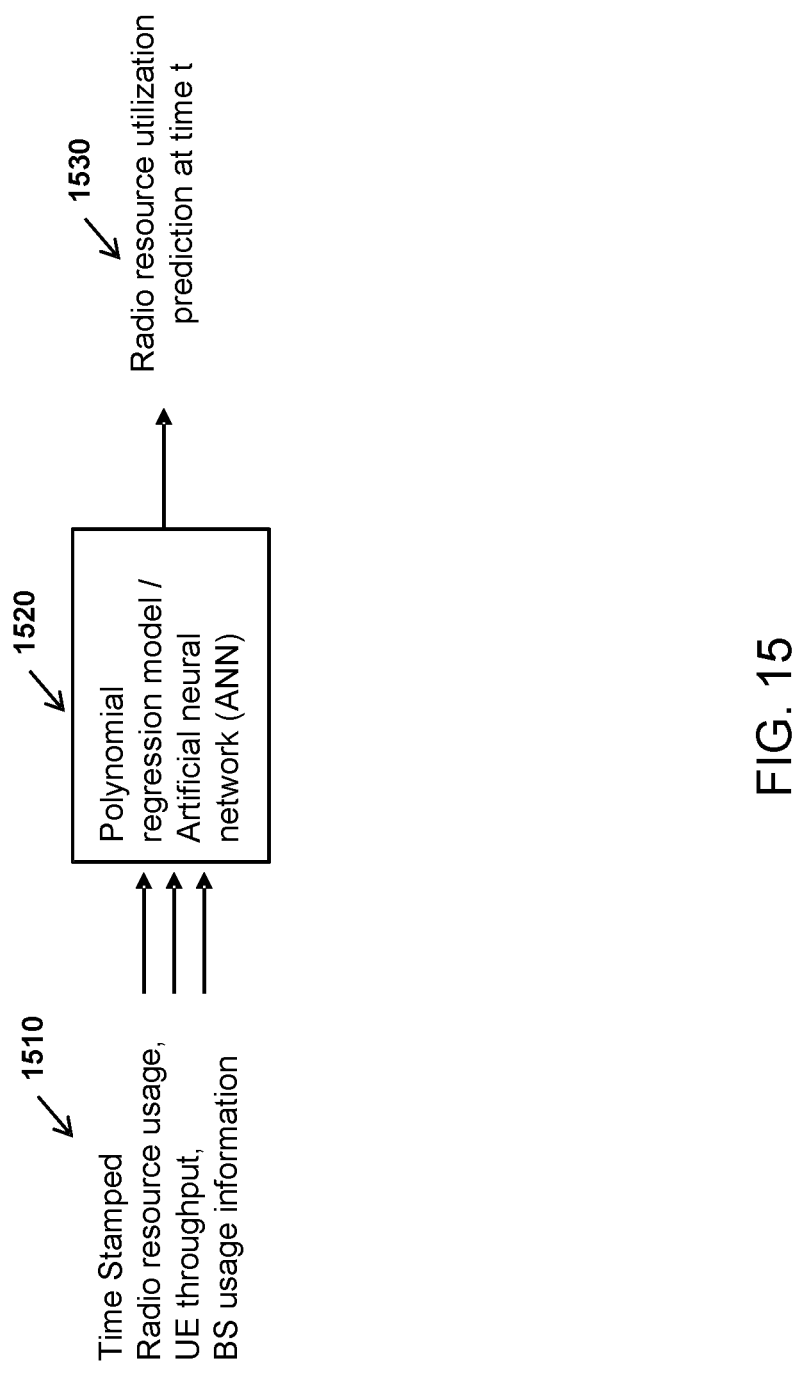
FIG. 15 illustrates a model such as a machine learning model operating to provide resource related analytics, according to an embodiment of the present invention.

In one particular example embodiment, as illustrated in FIG. 15, the DAM may receive input information 1510 such as time-stamped radio resource usage information, UE communication throughput information, and base station usage information. This input may be provided to and processed by a model 1520 such as a polynomial regression model, an artificial neural network (ANN) model, or another machine learning model. The model may refer to a numerical processing routine executed by a computer processor according to instructions stored in computer memory. The output 1530 of the model is a radio resource utilization prediction at one or more specified times or time intervals.

Figure 16:
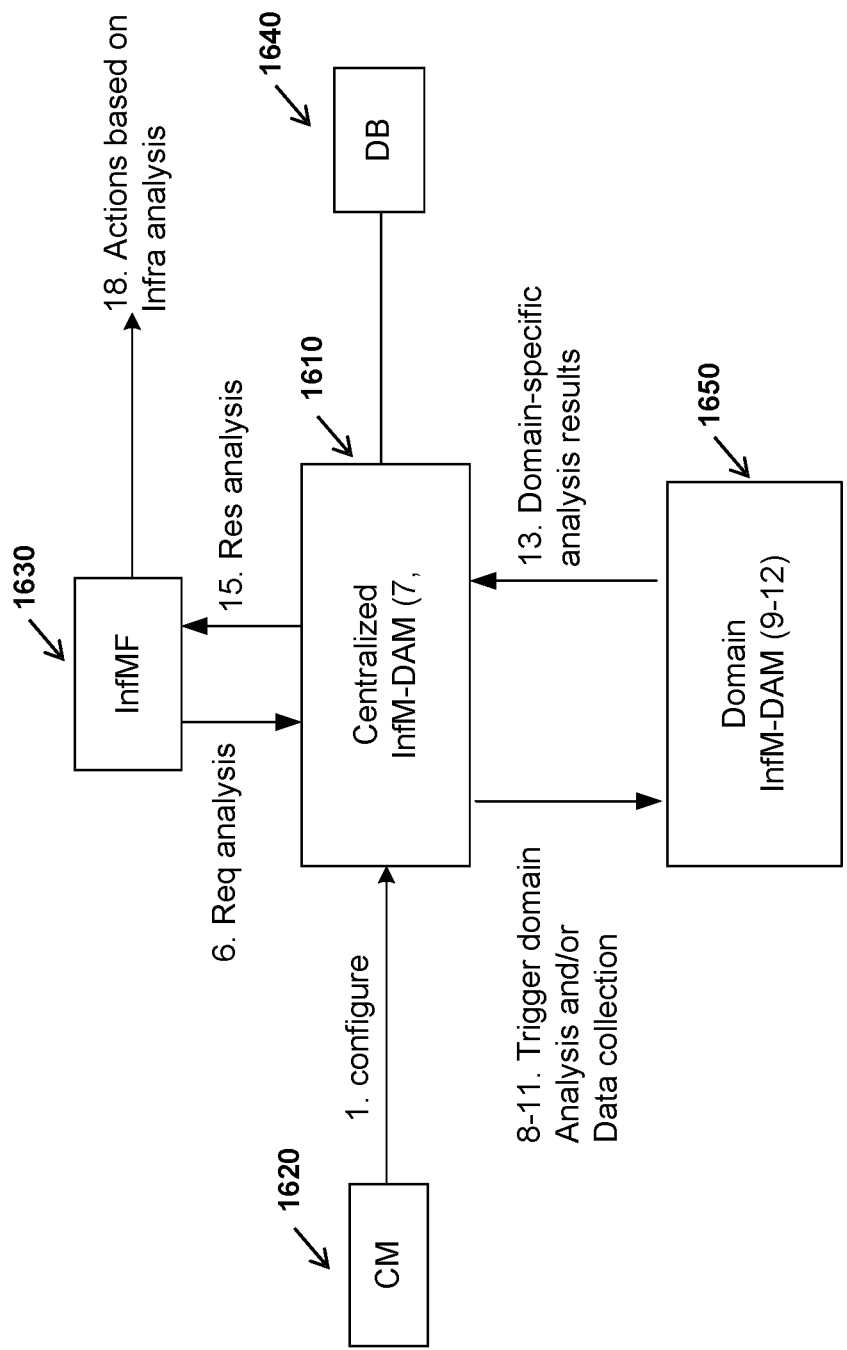
FIG. 16 illustrates interaction between a centralized InfM-DAM and surrounding entities, including a CM, InfMF, database and domain-level InfM-DAM, according to an embodiment of the present invention.

As another example, the DAM may provide a RAN resource utilization prediction to the InfM according to the following process. FIG. 16 illustrates the interaction between a centralized InfM-DAM 1610 and surrounding entities, including a CM 1620, InfMF 1630 database DB 1640 and domain-level InfM-DAM 1650. According to the interaction, the CM first configures the centralized InfM-DAM. At a subsequent time, the InfMF requests and analysis from the centralized InfM-DAM. The centralized InfM-DAM performs an analysis (e.g. using a machine learning model or other processing routine). The centralized InfM-DAM requests, where necessary, domain level analysis or data collection from the domain-level InfM-DAM, which then responds with the requested information. Data can also be collected by the centralized InfM-DAM from the database DB. The collected data is processed and the results are passed back to the InfMF, which then performs actions based on the results.

In more detail of the centralized InfM-DAM operation, in a first phase, radio resource information collection is performed. First, for each radio resource in the system, total downlink and uplink PRB usage information is obtained. This may involve querying a previous DAM report. Obtaining the PRB usage may be performed using the following pseudo-code:

```
QueryDAM(NF#1, 'RAN', 1, 'PRBUsage') %Query previous DAM report
DAMList('PRBUsageNF#1.txt') % report(s) of PRB usage in
QueryPMjob(NF#1, 'RAN', 1, 'RRU.PrbTotDl')
PMJobReport('RRU.PrbTotDlReport')
```

Next, statistical information (e.g. a statistical distribution) indicative of downlink and uplink usage may be obtained. Furthermore, an indication of the total available downlink and uplink PRBs can be obtained.

Next, for each base station in the system, the average downlink and uplink throughput can be obtained, for example using the pseudo-code:

```
QueryData(NF#2, 'DLThroughput')
DataReport(DataList, DataType)
```

The parameter "DataList" may contain relevant IDs and addresses of entities.

Furthermore, the information indicative of a statistical distribution of downlink and uplink throughput in that base station can be obtained. Furthermore, an indication of a station resource usage can be obtained.

Given the above obtained information and indication of RAN resource utilization can be obtained. The following formula may be used to provide such an indication based on the obtained data as mentioned above:

$$RAN\_\{utilization\} =$$
$$w\_1 * (used\_radio\_resources)/(assigned\_radio\_resources) +$$
$$w\_2 * (experienced\_avg\_UE\_Th)/(agreed\_avg\_UE\_Th) +$$
$$w\_3 * (BS\_resource\_usage)/(BS\_resources)$$

$$RAN_{utilization} = w_1 \frac{used\ radio\ resources}{assigned\ radio\ resources} +$$
$$w_2 \frac{experienced\ avg\ UE\ Th}{agreed\ avg\ UE\ Th} + w_3 \frac{BS\ resource\ usage}{BS\ resources}.$$

In the above equation, $RAN_{utilization}$ refers to the RAN resource utilization prediction, $w_1$, $w_2$ and $w_3$ are weights, used radio resources and assigned radio resources refer to determined quantities of radio resources as described above, experienced avg UE Th and agreed avg UE Th refer to average observed UE throughput and agreed average UE throughput in the SLA and BS resource usage and BS resources refer to actual utilized and available base station resources, respectively.

In a second phase, a RAN_DAM function may be invoked to build a regression model for RAN resource utilization prediction. The regression model can receive as input data timestamps information such as radio resources in the system, UE throughput in the system, and base station usage in the system. The regression model can provide as output a RAN utilization utility. The regression model may be a regression-based machine learning model, such as a neural network model.

In a third phase, the analysis (the prediction) is obtained. A GET analysis routine may support this, which may be an HTTP-style command prompting return of the analysis/prediction results. This may be supported for example using the following pseudocode:

```
QueryAnalysis(NSSI, RAN, '1-10', 2)
DAMList('1-5', 'Usage', 'ActiveActiveDoneCannotdoPossible')
```

Figure 17:
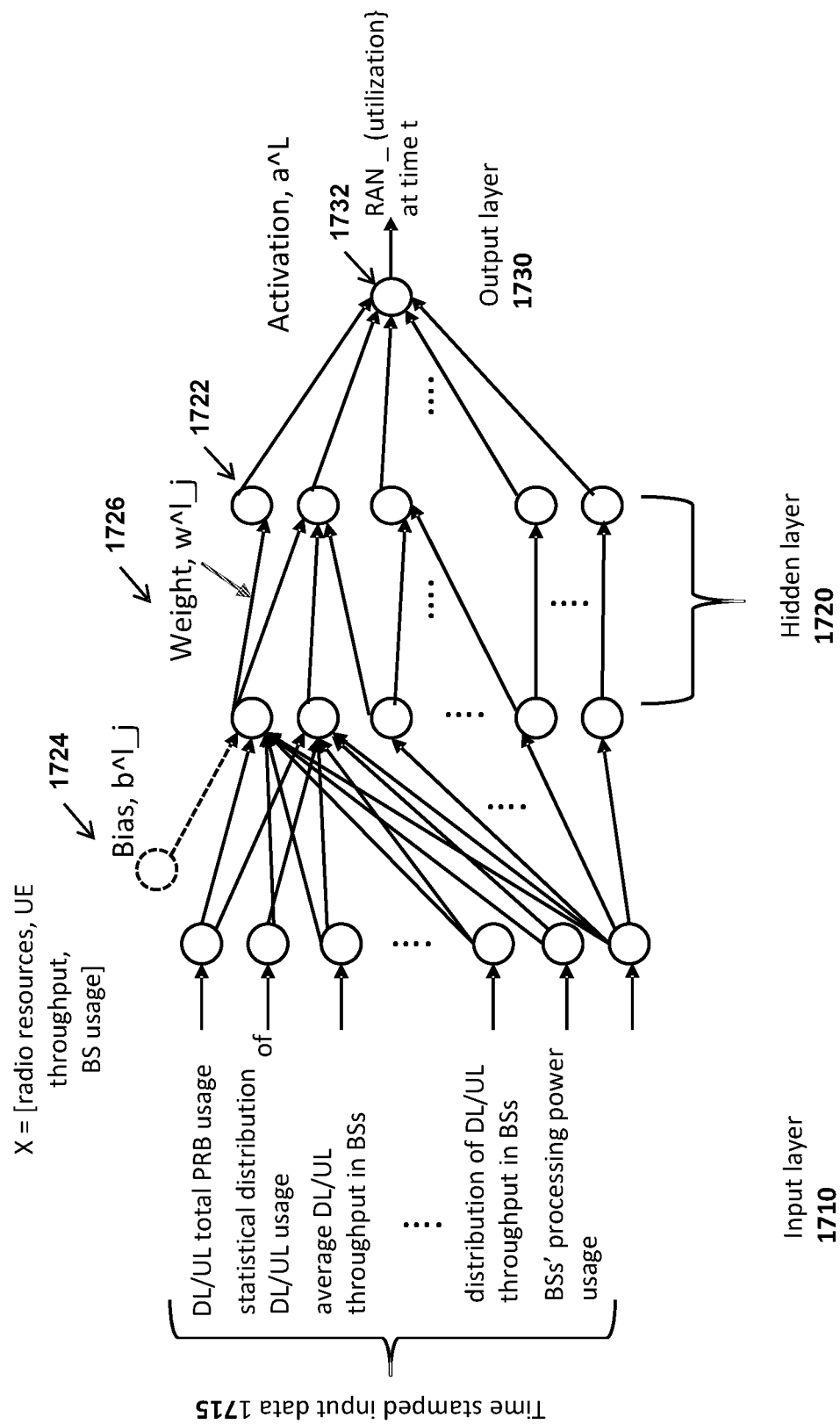
FIG. 17 illustrates an example neural network which can be operated to provide RAN resource utilization predictions, according to an embodiment of the present invention.

FIG. 17 illustrates an example neural network which can be operated to provide RAN resource utilization predictions, according to an embodiment of the present invention. The neural network includes an input layer 1710 which receives time stamped input data 1715, such as downlink and uplink total PRB usage data, statistical downlink and uplink usage data, average downlink and uplink throughput in base stations, distributions of downlink and up link throughput in base stations, and a base station processing power usage. Hidden layers 1720 of the neural network can be used to process the data, and include nodes 1722, biasing nodes 1724, and connection weights 1726, as would be readily understood by a person skilled in the art. An output layer 1730 of the neural network includes a node 1732 which provides a prediction of RAN utilization at a given time or time interval. The neural network can be trained or otherwise configured to predict RAN resource utilizations at particular times, based on available and provided input data.

Example operating details for the neural network, such as update weights and neural network biases, may be provided as follows, according to an embodiment of the present invention.

For the feed-forward network aspect, output from the $j^{th}$ neuron at layer l may be provided according to:

$$a_j^l = \sigma(\Sigma_k w_{jk}^l a_k^{l-1} + b_j^l).$$

In vector form, this is represented as $a^l = \sigma(w^l a^{l-1} + b^l)$.

For the back propagation aspect, a quadratic cost function may be:

$$C = \tfrac{1}{2}\|y - a^L\|^2 = \tfrac{1}{2}\Sigma_j (y_j - a_j^L)^2.$$

The error at neuron j at layer l can be given as:

$$\delta_j^l = \frac{\partial C}{\partial z_j^l}$$

or in matrix form: $\delta^l = \nabla_a C \cdot \sigma'(z^l)$.

The error in $\sigma^l$ in terms of error in the next layer l+1, $\sigma^{l+1}$ is given by:

$$\delta^l = ((w^{l+1})^T \delta^{l+1}) \cdot \sigma'(z^l).$$

Biases b in the neural network can be updated via:

$$\frac{\partial C}{\partial b_j^l} = \delta_j^l$$

$$b \to b - \eta \frac{\partial C_0}{\partial b}.$$

Weights w in the neural network can be updated via:

$$\frac{\partial C}{\partial w_{jk}^l} = a_k^{l-1} \delta_j^l$$

$$w \to w - \eta \frac{\partial C_0}{\partial w}.$$

The neural network can be configured to perform according to the specified numerical relationships, in order to generate predictions of RAN utilization based on the input data. Details of neural network operation in general would be readily understood by a person skilled in the art.

In accordance with embodiments of the present invention, there is provided an apparatus comprising: a computer processor, a memory and a network interface. The apparatus is configured to receive, via the network interface, configuration instructions. The apparatus is configured to interact, via the network interface, with one or more network devices to obtain network operating information therefrom based on the configuration instructions. The apparatus is configured to perform an analysis, for example as specified in the configuration instructions. Performing the analysis may include, for example, processing, using the computer processor, the obtained network operating information. Performing the analysis can include processing, by the computer processor, the obtained network operating information according to processing operations specified in the received configuration instructions. The apparatus is configured to transmit, via the network interface, results of the processing operations toward one or more network management devices or another networked apparatus, based on the configuration instructions. In some embodiments, the apparatus may be further configured to store some or all of the obtained network operating information, some or all of the results of the processing operations, or both, in a database, the database specified by the configuration instructions.

In various embodiments of the present invention, the configuration instructions may specify at least: an identification of one or more of network slices; an identification of one or more network devices supporting one or more of the network slices; an aspect of the one or more of network slices for which operating information, for example network operating information (e.g. associated with the network slice), is to be obtained; an analysis (e.g. a type of analysis) to be performed, for example by the processing operations; and a response mode indicative of conditions under which the results of the processing operations are to be transmitted toward the one or more network slice management devices.

In various embodiments, the configuration instructions may further specify one or more of: an identification of network resources holding the one or more network devices; an identification of communication parameters; and statistics to be generated and transmitted in the results of the processing operations. The configuration instructions may be received from a configuration manager apparatus. The configuration instructions may be provided as part of a request for a data analytics service to be provided by the apparatus.

In various embodiments, the aspect of the network for which the network operating information is to be obtained may include one or more of: a network infrastructure type, a network infrastructure instance, a network slice instance, a network slice subnet instance, a service instance, a network location, a network customer, and an application supported by the network.

In various embodiments, the one or more network devices may include at least one of: a physical network function; a virtual network function; a domain-specific management and orchestration device; and another apparatus configured to interact with network devices to obtain and process network operating information based on further configuration instructions. In various embodiments, the one or more network devices may belong to a single network domain and the results of the processing operations pertain to said single network domain, optionally wherein the single network domain is one of: a network function domain; a radio access network domain; a transport network domain; and a core network domain. In various embodiments, the one or more network devices may belong to a plurality of network domains and the results of the processing operations pertain to at least one of the plurality of network domains, optionally wherein the plurality of network domains include one or more of: a network function domain; a radio access network domain; a transport network domain; and a core network domain. In various embodiments, the one or more network devices may support a network slice instance or a network slice subnet instance specified in the configuration instructions, and the results of the processing operations pertain to the network slice instance or a network slice subnet instance.

In various embodiments, the processing operations may include at least one of: determining resource availability; determining resource utilization; determining an infrastructure modification or management decision for improving network operations; determining quality of service metrics; determining a packet count; determining a probability of a content request; determining a content provisioning delay; and determining a probability of a content cache miss.

In various embodiments, the network operating information may include at least one of: session level data; network slice level data; network slice subnet level data; network function level data; and infrastructure data.

In various embodiments, the one or more network management devices may include at least one of: an operation support system; a network slice management function; a network slice subnet management function; an infrastructure manager; a customer service manager; and a content forwarding manager.

In accordance with embodiments of the present invention, the apparatus set forth above may further comprise a plurality of separate sub-apparatuses each comprising a respective computer processor, a respective memory and a respective network interface and operatively coupled via a communication network. Each of the plurality of sub-apparatuses may be configured to interact, via the respective network interface, with some or all of the one or more network devices to obtain respective network operating information therefrom based directly or indirectly on the configuration instructions. Each of the plurality of sub-apparatuses may be configured to perform an analysis, for example as specified in the configuration instructions. Performing the analysis may include, for example, processing, using the respective computer processor, the obtained respective network operating information. Performing the analysis can include processing, by the respective computer processor, the obtained respective network operating information according to respective processing operations based directly or indirectly on the configuration instructions. Each of the plurality of sub-apparatuses may be configured to transmit, via the respective network interface, results of the respective processing operations toward another one of the sub-apparatuses, or one or more network management devices, based directly or indirectly on the configuration instructions.

In various embodiments of the present invention, a first one of the sub-apparatuses may be configured to generate and transmit further configuration instructions to a second one of the sub-apparatuses. The second one of the sub-apparatuses may be configured to interact with some or all of the one or more network devices to obtain a portion of the network operating information therefrom based on the further configuration instructions. The second one of the sub-apparatuses may be configured to perform an analysis, for example as specified in the received further configuration instructions. Performing the analysis may include, for example, processing the obtained respective network operating information. Performing the analysis can include processing the obtained portion of the network operating information according to further processing operations specified in the received further configuration instructions. The second one of the sub-apparatuses may be configured to transmit results of the further processing operations toward the first one of the sub-apparatuses, based on the further configuration instructions. the first one of the sub-apparatuses receives and handles said results of the further processing operations as the obtained respective network operating information.

In various embodiments, a first one of the sub-apparatuses may be configured to obtain and process respective network operating information pertaining to a first network domain, network slice instance or network slice subnet instance. A second one of the sub-apparatuses may be configured to obtain and process respective network operating information pertaining to a second, different network domain, network slice instance or network slice subnet instance. A third one of the sub-apparatuses may be configured to obtain and process the results of the respective processing operations from the first one of the sub-apparatuses and the second one of the sub-apparatuses.

In various embodiments, the interacting with one or more network devices to obtain network operating information, the processing of the obtained network operating information, and the transmission of the results of the processing operations toward the one or more network management devices may be performed in response to a request by at least one of the one or more network management devices or another entity on behalf thereof.

In accordance with other embodiments of the present invention, there is provided a configuration manager apparatus comprising: a computer processor, a memory and a network interface. The apparatus is configured to generate configuration instructions using the computer processor and transmit configuration instructions via the network interface to a separate apparatus. The configuration instructions cause the separate apparatus to: interact with one or more network devices to obtain network operating information therefrom based on the configuration instructions; process the obtained network operating information to perform an analysis, for example according to processing operations specified in the received configuration instructions; and provide results of the processing operations to one or more network management devices or another networked apparatus, based on the configuration instructions.

In various embodiments of the present invention, the configuration instructions may specify at least: an identification of one or more of network slices; an identification of one or more network devices supporting one or more of the network slices; an aspect of the one or more of network slices for which operating information is to be obtained; a type of analysis to be performed by the processing operations; and a response mode indicative of conditions under which the results of the processing operations are to be transmitted toward the one or more network slice management devices.

In accordance with other embodiments of the present invention, there is provided a system comprising the apparatus configured to receive and execute configuration instructions as set forth above, a configuration manager apparatus having another computer processor, memory and a network interface and configured to generate and transmit the configuration instructions to the apparatus, and a network management device configured to receive the results of the analysis (e.g. due to processing operations) from the apparatus and perform one or more network management actions based on the received results of the analysis (e.g. associated processing operations).

In various embodiments of the present invention, the one or more network management actions may include one or more of: resource scaling; network slice admission control; predicting scalability of physical and virtual network resources; fault recovery for infrastructure, network slice instance or service instance; network slice provisioning; network slice modification; mobility management in a network slice instance; mobility management for users belonging to a service instance; cross-PLMN mobility analysis; traffic steering in a network slice instance or service instance; load balancing in a network slice instance or service instance; network slice-specific performance assurance; QoS analysis; content cache instantiation for a network slice instance, service instance or user; and content cache migration for a network slice instance, service instance or user.

In accordance with embodiments of the present invention, there is provided a method in a communication network. The method includes receiving configuration instructions, for example specifying the information as listed above. The method includes configuring one or more networked analytics functions based on the configuration instructions. The method includes receiving a request message, from a network management device, for a specified resource analysis which the one or more networked analytics functions are configured to provide due to the configuration instructions. The method includes obtaining, by the one or more networked analytics functions, network operating information from one or more network devices, based on the configuration instructions for implementing the specified resource analysis. The method includes processing, by the one or more networked analytics functions, the obtained network operating information to implement the specified resource analysis. In some embodiments, the processing may be performed according to processing operations specified in the configuration instructions for implementing the specified resource analysis. The method includes transmitting, via the network interface, results of the processing operations toward the network management device. In some embodiments, the method may further include transmitting a notification, from one or more of the networked analytics functions, a configuration manager apparatus providing the configuration instructions, or a combination thereof, toward the network management device, the notification indicative of availability of the one or more networked analytics functions and optionally a request message format for use in obtaining information from the one or more networked analytics functions.

In various embodiments, the network management device may be one of: an operation support system; a network slice management function; a network slice subnet management function; an infrastructure manager; a customer service manager; and a content forwarding manager.

In various embodiments, configuring the one or more networked analytics functions may comprise configuring a centralized network analytics function and causing the centralized network analytics function to configure one or more domain-specific network analytics functions. Configuring the one or more networked analytics functions comprises providing the configuration instructions directly from a configuration manager apparatus to a centralized network analytics function and to one or more domain-specific network analytics functions for configuration thereof. The one or more networked analytics functions may comprise a centralized network analytics function and one or more domain-specific network analytics functions, the method further comprising decomposing the request message into sub-request messages and providing the sub-request messages to corresponding ones of the one or more domain-specific network analytics functions.

In various embodiments, each of the one or more domain-specific network analytics functions may be configured to process domain-specific network operating information to obtain a respective processing result and provide said respective processing result to the centralized network analytics function, and wherein the centralized network analytics function is configured to process the respective processing results together to generate the results of the processing operations.

In various embodiments, at least one of the one or more networked analytics functions may be configured to process the request message, or a sub-request message based thereon, to determine log requirements for particular ones of one or more network devices, and to request logs from said particular ones of one or more network devices based on the determined log requirements, thereby obtaining said network operating information.

In various embodiments of the present invention, the configuration instructions may specify at least: an identification of one or more of network slices; an identification of one or more network devices supporting one or more of the network slices; an aspect of the one or more of network slices for which operating information is to be obtained; a type of analysis to be performed by the processing operations; and a response mode indicative of conditions under which the results of the processing operations are to be transmitted toward the one or more network slice management devices.

In accordance with embodiments of the present invention, there is provided a method in a communication network. The method may include receiving configuration instructions. The method may include configuring one or more networked analytics functions based on the configuration instructions. The configuring may cause the one or more network analytics functions to subsequently: accept a request message, from a network management device, for a specified resource analysis which the one or more networked analytics functions are configured to provide due to the configuration instructions; obtain, by the one or more networked analytics functions, network operating information from one or more network devices, based on the configuration instructions for implementing the specified resource analysis; process, by the one or more networked analytics functions, the obtained network operating information according to processing operations specified in the configuration instructions for implementing the specified resource analysis; and transmit, via the network interface, results of the processing operations toward the network management device.

In accordance with embodiments of the present invention, there is provided a method of creating and performing a Data Analytics Management (DAM) job. The method includes performing the following operations by a first DAM device, which may be a DAM provider (DAM_P) apparatus, a central or coordinating sub-apparatus of the DAM_P apparatus, or a domain DAM apparatus. The method includes receiving a request message indicative of the DAM job. The method optionally includes generating and transmitting a response to the request message based on an evaluation of contents of the request message by the first DAM device, the response indicative whether the DAM job can be accommodated. The method includes, if an analysis of contents of the request message indicates that existing DAM configurations are insufficient for accommodating the DAM job: interacting with one or more other network devices to cause said other network devices to obtain and transmit additional information toward the first DAM device, the additional information for accommodating the DAM job according to determined requirements; and collecting data from the one or more other network entities to perform the DAM job. The method includes producing and transmitting one or more report messages comprising results of an analysis of the collected data in furtherance of performing the DAM job.

In some embodiments, the method may further include querying, by the first DAM device, the one or more other network devices to obtain an indication of data available from said one or more other network devices for performing the DAM job. The querying may include one or more of: querying one or more other DAM entities to obtain an indication of provided DAM services, databases containing relevant data, or a combination thereof; querying one or more network management service providers or network slice management service providers, or fault management, configuration management or performance management entities thereof, to obtain an indication relevant data; and querying one or more databases to obtain an indication of data, remaining capacity, or a combination thereof, available therefrom. The one or more other DAM entities include one or more of: domain DAM entities; network function (NF) DAM entities; and $3^{rd}$ party DAM entities. The relevant data may include configuration information, measurements, reports, or a combination thereof. The method may further include analyzing query responses to determine whether a reconfiguration of the one or more other network devices is required for providing data for performing the DAM job. The method may further include querying the one or more other network devices to obtain configuration information usable for interacting with the one or more other network devices and organizing and interpreting data provided thereby.

In some embodiments, the method may further include interacting with the one or more other network devices to determine, arrange, or both determine and arrange one or more database configurations, the database configurations facilitating communication of data, via one or more databases, toward the first DAM device, the data for use in performing the DAM job. The method may further include interacting with one or more sub-domain DAM devices, one or more network function (NF) DAM entities, or both, to create or modify one or more subordinate DAM jobs for providing data for use in performing the DAM job. The method may further include interacting with a performance management device to create or modify one or more performance management (PM) jobs for providing data for use in performing the DAM job.

In accordance with embodiments of the present invention, there is provided a method of creating a Data Analytics Management (DAM) job. The method includes, by a DAM provider apparatus or sub-apparatus thereof, receiving and processing one or more of: a RequestDAM( ) message; a DAMList( ) message; a NFDAMReport( ) message; a PMJobReport( ) message; a DAMList( ) message; a DataReport( ) message; and a SendReport( ) message. These messages are described in the description above.

In accordance with embodiments of the present invention, there is provided a method of creating a Data Analytics Management (DAM) job. The method includes, by a DAM provider apparatus or sub-apparatus thereof, generating and transmitting one or more of: a ResponseDAMRequest( ) message; a QueryDAM( ) message; a QueryNFDAM( ) message; a QueryPMjob( ) message; a QueryAnalysis( ) message; a QueryData( ) message; a RequestReport( ) message; and a MDASReport( ) message. These messages are described in the description below.

In accordance with embodiments of the present invention, there is provided an apparatus comprising a computer processor, a memory and a network interface and configured to carry out one or more of the above-described methods.

Figure 18:
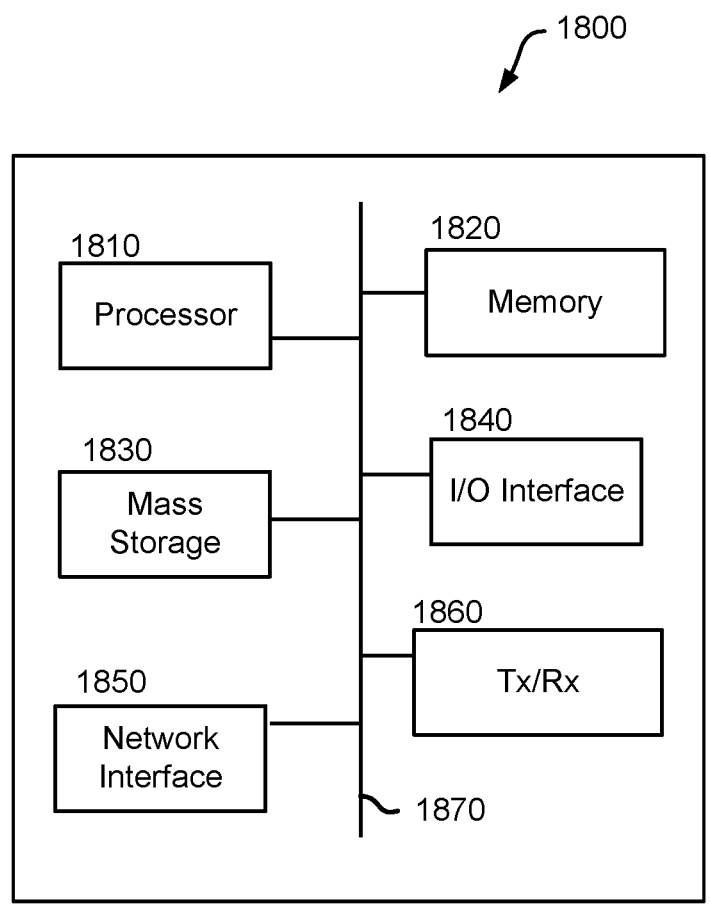
FIG. 18 is a schematic diagram of an electronic device, accordance with embodiments of the present invention.

FIG. 18 illustrates an exemplary block diagram of a processing system 1000 that may be used for deploying or instantiating components of the wireless communication network, such as the DAM, configuration manager, InfM, CSM and CFM entities. As shown in FIG. 18, processing system 1800 includes a processor 1810, memory 1820, non-transitory mass storage 1830, I/O interface 1840, network interface 1850, and transceiver 1860, all of which are communicatively coupled via bi-directional bus 1870. The processing system 1800 further includes input terminals and output terminals, for receiving inputs and outputs, respectively, from other network components (not shown). The processing system may operate directly to support entities such as the DAM or configuration manager. Alternatively the processing system may operate indirectly to support such entities. For example, one or more resource virtualization layers may be provided offering computer processing resources, memory resources, and network communication resources, which are ultimately provided at least in part by the processing system. Multiple such processing systems may cooperate to support embodiments of the present invention.

The memory 1820 may include any type of non-transitory memory such as static random access memory (SRAM), dynamic random access memory (DRAM), synchronous DRAM (SDRAM), read-only memory (ROM), any combination of such, or the like. The mass storage element 1830 may include any type of non-transitory storage device, such as a solid state drive, hard disk drive, a magnetic disk drive, an optical disk drive, USB drive, or any computer program product configured to store data and machine executable program code. According to certain embodiments, the memory 1820 or mass storage 1830 may have recorded thereon statements and instructions executable by the processor 1810 for performing any of the aforementioned method steps described above.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus comprising: a computer processor, a memory and a network interface and configured to:
   receive, via the network interface, configuration instructions specifying one or more of:
      an identification of one or more of network slices;
      an identification of one or more network devices supporting one or more of the network slices; and
   the configuration instructions additionally specifying one or more of:
      a type of analysis to be performed by processing operations; and
      a response mode indicative of conditions under which results of the processing operations are to be transmitted toward the one or more network slice management devices;
   interact, via the network interface, with one or more network devices to obtain network operating information therefrom based on the configuration instructions;
   process, by the computer processor, the obtained network operating information according to processing operations specified in the received configuration instructions, the processing operations providing resource related analytics; and
   transmit, via the network interface, results of the processing operations toward one or more network management devices or another networked apparatus, based on the configuration instructions.

2. The apparatus of claim 1, wherein the processing operations provide a prediction of resource availability at a specified time, for use by an infrastructure manager apparatus.

3. The apparatus of claim 1, wherein the configuration instructions are provided as part of a request for a data analytics service to be provided by the apparatus, and wherein the configuration instructions further specify one or more of: an identification of network resources holding the one or more network devices, the one or more network devices belonging to a single network domain; an identification of communication parameters; and statistics to be generated and transmitted in the results of the processing operations.

4. The apparatus of claim 1, the configuration instructions further specifies an aspect of the one or more of network slices for which operating information is to be obtained; and wherein said aspect of the network for which the operating information is to be obtained includes one or more of: a network infrastructure type; a network infrastructure instance; a network slice instance, a network slice subnet instance, a communication service instance, a network location, a network customer, and an application supported by the network.

5. The apparatus of claim 1, wherein the one or more network devices include at least one of: a physical network function; a virtual network function; a domain-specific management and orchestration device; and another apparatus configured to interact with network devices to obtain and process network operating information based on further configuration instructions.

6. The apparatus of claim 1, wherein the processing operations include at least one of: determining resource availability; determining resource utilization; determining an infrastructure modification or management decision for improving network operations; determining quality of communication service metrics; determining a packet count; determining a probability of a content request; determining a content provisioning delay; and determining a probability of a content cache miss.

7. The apparatus of claim 1, wherein the network operating information includes at least one of: session level data; network slice level data; network slice subnet level data; network function level data; and infrastructure data.

8. The apparatus of claim 1, wherein the one or more network management devices include at least one of: an operation support system; a network slice management function; a network slice subnet management function; an infrastructure manager; a customer service manager; and a content forwarding manager.

9. The apparatus of claim 1, wherein the one or more network devices belong to a plurality of network domains including one or more of: a radio access network domain; a transport network domain; and a core network domain, and the results of the processing operations pertain to at least one of the plurality of network domains.

10. The apparatus of claim 1, wherein the one or more network devices support a network slice instance or a network slice subnet instance specified in the configuration instructions, and the results of the processing operations pertain to the network slice instance or a network slice subnet instance.

11. The apparatus of claim 1, wherein the apparatus comprises a plurality of separate sub-apparatuses each comprising a respective computer processor, a respective memory and a respective network interface and operatively coupled via a communication network, wherein each of the plurality of sub-apparatuses is configured to:
   interact, via the respective network interface, with some or all of the one or more network devices to obtain respective network operating information therefrom based directly or indirectly on the configuration instructions;
   process, by the respective computer processor, the obtained respective network operating information according to respective processing operations based directly or indirectly on the configuration instructions; and
   transmit, via the respective network interface, results of the respective processing operations toward another one of the sub-apparatuses, or one or more network management devices, based directly or indirectly on the configuration instructions.

12. A method in a communication network, comprising:
   configuring one or more networked analytics functions with specific configuration parameters to implement one or more network analytics operations related to resources used by a network slice;

receiving a request message, from a network management device, for a specified resource analysis which the one or more networked analytics functions are configured to provide;

obtaining, by the one or more networked analytics functions, network operating information from one or more network devices for implementing the specified resource analysis;

processing, by the one or more networked analytics functions, the obtained network operating information according to processing operations for implementing the specified resource analysis; and transmitting, via the network interface, results of the processing operations toward the network management device.

13. The method of claim 12, wherein the network management device is one of: an operation support system; a network slice management function; a network slice subnet management function; an infrastructure manager; a customer service manager; and a content forwarding manager.

14. The method of claim 12, wherein configuring the one or more networked analytics functions comprises configuring a centralized network analytics function and causing the centralized network analytics function to configure one or more domain-specific network analytics functions.

15. The method of claim 12, wherein configuring the one or more networked analytics functions comprises providing the configuration parameters directly from a configuration manager apparatus to a centralized network analytics function and to one or more domain-specific network analytics functions for configuration thereof.

16. The method of claim 12, further comprising transmitting a notification, from one or more of the networked analytics functions, a configuration manager apparatus providing the configuration parameters, or a combination thereof, toward the network management device, the notification indicative of availability of the one or more networked analytics functions.

17. The method of claim 16, wherein the notification is indicative of a request message format for use in obtaining information from the one or more networked analytics functions.

18. The method of claim 12, wherein the one or more networked analytics functions comprises a centralized network analytics function and one or more domain-specific network analytics functions, the method further comprising decomposing the request message into sub-request messages and providing the sub-request messages to corresponding ones of the one or more domain-specific network analytics functions.

19. The method of claim 18, wherein each of the one or more domain-specific network analytics functions is configured to process domain-specific network operating information to obtain a respective processing result and provide said respective processing result to the centralized network analytics function, and wherein the centralized network analytics function is configured to process the respective processing results together to generate the results of the processing operations.

20. The method of claim 12, wherein at least one of the one or more networked analytics functions is configured to process the request message, or a sub-request message based thereon, to determine log requirements for particular ones of one or more network devices, and to request logs from said particular ones of one or more network devices based on the determined log requirements, thereby obtaining said network operating information.

21. The method of claim 12, wherein the configuration parameters specify at least:

an identification of one or more of network slices;

an identification of one or more network devices supporting one or more of the network slices;

an aspect of the one or more of network slices for which operating information is to be obtained;

a type of analysis to be performed by the processing operations; and a response mode indicative of conditions under which the results of the processing operations are to be transmitted toward the one or more network slice management devices.

22. The method of claim 12, further comprising:

if an analysis of contents of the request message indicates that existing configurations are insufficient for accommodating the specified resource analsyis:

interacting with one or more network devices, additional network analytic functions, or a combination thereof, to cause said network device, additional network analytic functions, or combination thereof to obtain and transmit additional information, the additional information for accommodating the specified resource analysis; and collecting data from the one or more network devices, additional network analytic functions, or combination thereof to perform the specified resource analysis.

23. The method of claim 22, wherein the network device, network analytic functions, or combination thereof include one or more of a data analytics provider, a central or coordinating sub-apparatus of the data analytics provider, or a domain data analytics provider.

* * * * *